(12) United States Patent
Cataldo

(10) Patent No.: US 7,259,714 B1
(45) Date of Patent: Aug. 21, 2007

(54) UNIQUE SPACE TIME ADAPTIVE SYSTEM (USS)

(76) Inventor: Thomas J. Cataldo, 19 Ramita La., Commack, NY (US) 11725

( * ) Notice: Subject to any disclaimer, the term of this patent is extended or adjusted under 35 U.S.C. 154(b) by 0 days.

(21) Appl. No.: 11/415,735

(22) Filed: May 1, 2006

Related U.S. Application Data

(60) Provisional application No. 60/677,576, filed on May 4, 2005.

(51) Int. Cl.
  *G01S 7/487* (2006.01)
  *G01S 7/483* (2006.01)
  *G01S 13/52* (2006.01)
  *G01S 13/00* (2006.01)

(52) U.S. Cl. .................. 342/159; 342/89; 342/90; 342/91; 342/94; 342/104; 342/107; 342/109; 342/113; 342/115; 342/118; 342/160; 342/162; 342/175; 342/195

(58) Field of Classification Search .......... 342/82–103, 342/159–164, 25 R–25 F, 104–115, 118, 342/134–145, 175, 189–197
See application file for complete search history.

(56) References Cited

U.S. PATENT DOCUMENTS

| | | | | |
|---|---|---|---|---|
| 4,068,231 | A * | 1/1978 | Wilmot | 342/90 |
| 4,074,264 | A * | 2/1978 | Wilmot | 342/90 |
| 4,290,066 | A * | 9/1981 | Butler | 342/100 |
| 4,323,898 | A * | 4/1982 | Barnes et al. | 342/90 |
| 5,124,710 | A * | 6/1992 | Debuisser | 342/90 |
| 5,150,426 | A * | 9/1992 | Banh et al. | 342/90 |
| 5,262,785 | A * | 11/1993 | Silverstein et al. | 342/162 |
| 5,311,188 | A * | 5/1994 | Meijer et al. | 342/90 |
| 5,602,760 | A * | 2/1997 | Chacon et al. | 342/159 |
| 5,612,700 | A * | 3/1997 | Tucker | 342/90 |
| 5,745,071 | A * | 4/1998 | Blackmon et al. | 342/90 |
| 5,748,140 | A * | 5/1998 | Schober | 342/90 |
| 5,748,143 | A * | 5/1998 | Melvin et al. | 342/162 |
| 6,259,396 | B1 * | 7/2001 | Pham et al. | 342/90 |
| 6,292,592 | B1 * | 9/2001 | Braunreiter et al. | 342/90 |
| 6,750,805 | B1 * | 6/2004 | Cameron | 342/90 |
| 6,756,935 | B1 * | 6/2004 | Cameron et al. | 342/90 |

(Continued)

OTHER PUBLICATIONS

N.D. Gupta et al., "Reconfigurable Computing for Space-Time Adaptive Processing"; paper published for DARPA contract F30602-97-2-0297; no date given.*

*Primary Examiner*—Bernarr E. Gregory
(74) *Attorney, Agent, or Firm*—Alfred M. Walker; Frank Tolin; Mark E. Bender

(57) ABSTRACT

A method of detecting radar returns and measuring their parameters with or without clutter present and no clutter cancellation employed which includes transmitting at least one pulse; processing the returns surpassing a threshold detected in one range azimuth bin and by processing and separating out the returns based on their different range and azimuth. Another method includes transmission of many pulses and has minimum of one channel return surpassing detected threshold, which is detected in one range Doppler bin. The method also includes processing and thereby separating out the returns based on their different radial velocity and or azimuth and comparing the returns to a database of expected returns and adaptively processing returns that do not correspond to the expected returns. The method identifies the non-corresponding returns as indicative of at least one of clutter, land sea interface, clutter discretes and antenna sidelobe returns each without utilizing clutter cancellation.

13 Claims, 14 Drawing Sheets

U.S. PATENT DOCUMENTS 6,888,492 B1 * 5/2005 Voles .......................... 342/90
6,894,639 B1 * 5/2005 Katz ........................... 342/90
6,911,933 B1 * 6/2005 Mutz et al. ................ 342/25 B
7,079,072 B1 * 7/2006 Abatzoglou .................. 342/90

* cited by examiner

FIGURE 1
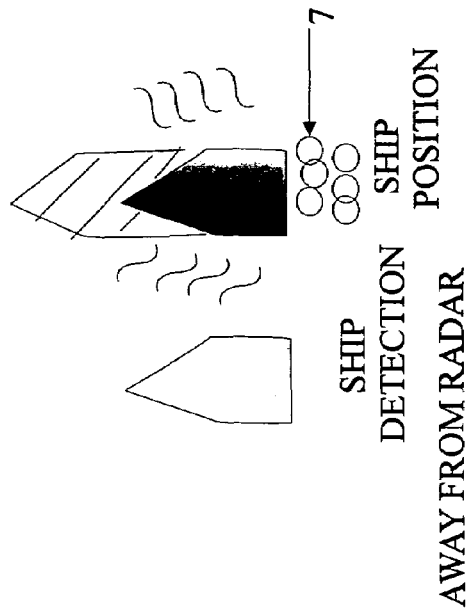
FIGURE 1A
SHIP POSITION TOWARD RADAR
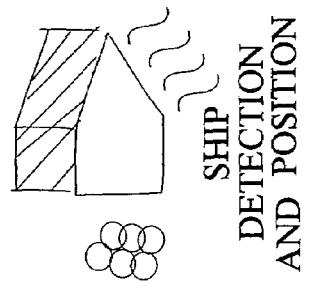
FIGURE 1B
SHIP DETECTION AWAY FROM RADAR
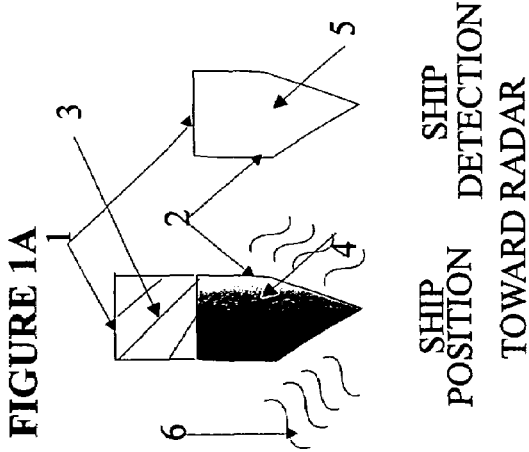
FIGURE 1C
LEFT TANGENTIAL VELOCITY
SHIP DETECTION AND POSITION
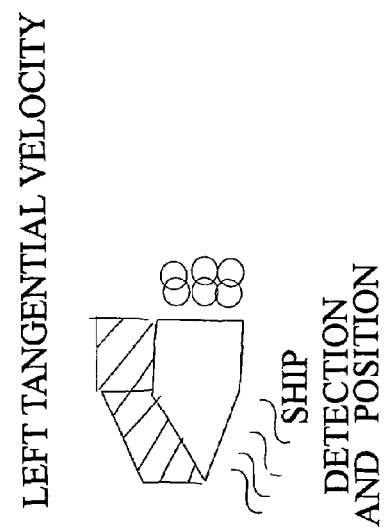
FIGURE 1D
RIGHT TANGENTIAL VELOCITY
SHIP DETECTION AND POSITION A- HEIGHT OF AIRBORNE VEHICLE
B- SLANT RANGE TO SHIP -D
C -SLANT RANGE OF SHIP SHADOW
D-SHIP HEIGHT ABOVE OCEAN
E- AIRBORNE RADAR VEHICLE
F- ANGLE OF SLANT RANGE SHADOW TO THE SEA
R- SHADOW HEIGHT
SOLUTION FOR HEIGHT OF SHIP-D=C* SIN F
WHERE SINE F=A/(R+C)

Fig.4

REFERENCE FIGURE 1

| SHIP AZIM. $\phi_A$ | SHIP DET. $\phi_D$ | SHIP VEL $\phi_D-\phi_R$ | LENGTH OF SHIP | WIDTH OF SHIP | HEIGHT OF SHIP | CHANGE IN TIME AND PROC. AGAIN | ENHANCE- MENTS |
|---|---|---|---|---|---|---|---|
| 4 | 5 | | 2 | 1 | PROPORT- IONAL TO 3 | CALC. UN- AMB. VEL. AND TANG. VELOCITY | BOW WAVE DETECTIONS AND WAKE DETECTIONS |

Fig. 5

CHART OF OVER OCEAN SYSTEM

| ANTENNA SYSTEM | DESCR-IPTION | BLACK HOLE AND SHADOW DETCTION | SHIP DETECT-ION POINT | BOW WAVE DETE-CTION | STERN WAKE DETEC-ION | DIFFERENCE IN TIME PROCESSING |
|---|---|---|---|---|---|---|
| ONE TRANSMIT-ONE RECEIVE MANY PULES ONE CHANNEL | Ms>mo Two or more looks | DETERM RANGE, VEL, AZIM., AND SHIP PARAMET. | SAME AS LEFT ADJACENT | AID IN DETERM-INING SHIP PARAM-ETERS | AID IN DETERM-INING SHIP PARAM-ETERS | AID IN DETERM. SHIP PARAM-ETERS AND DETERMINING UNAMBIGUOUS VELOCITY AND TANGENTIAL VEL |
| ONE TRANSMIT-ONE RECEIVE ONE PULSE MANY CHANNELS | Ms>mo Or mo is significant Two or more looks | SAME AS ABOVE | SAME AS ABOVE | SAME AS ABOVE | SAME AS ABOVE | SAME AS ABOVE |
| ONE TRANS TWO OR MERE RECEIVE PLUS DPCA TECHNIQUE | Ms>mo Two or more looks | SAME AS ABOVE | SAME AS ABOVE | SAME AS ABOVE | SAME AS ABOVE | SAME AS ABOVE |

*MEASURE SEA CLUTTER IN AN AID IN ALL COMPONENTS OF THE SYSTEM
*MOTION COMPENSATION, ISODOP CORRECTION AND ARRAY FOCUSSING
*ISARS MAY PERFORMED AS A FURTHER ENHANCEMENT TO SHIP CLASSIFICATION

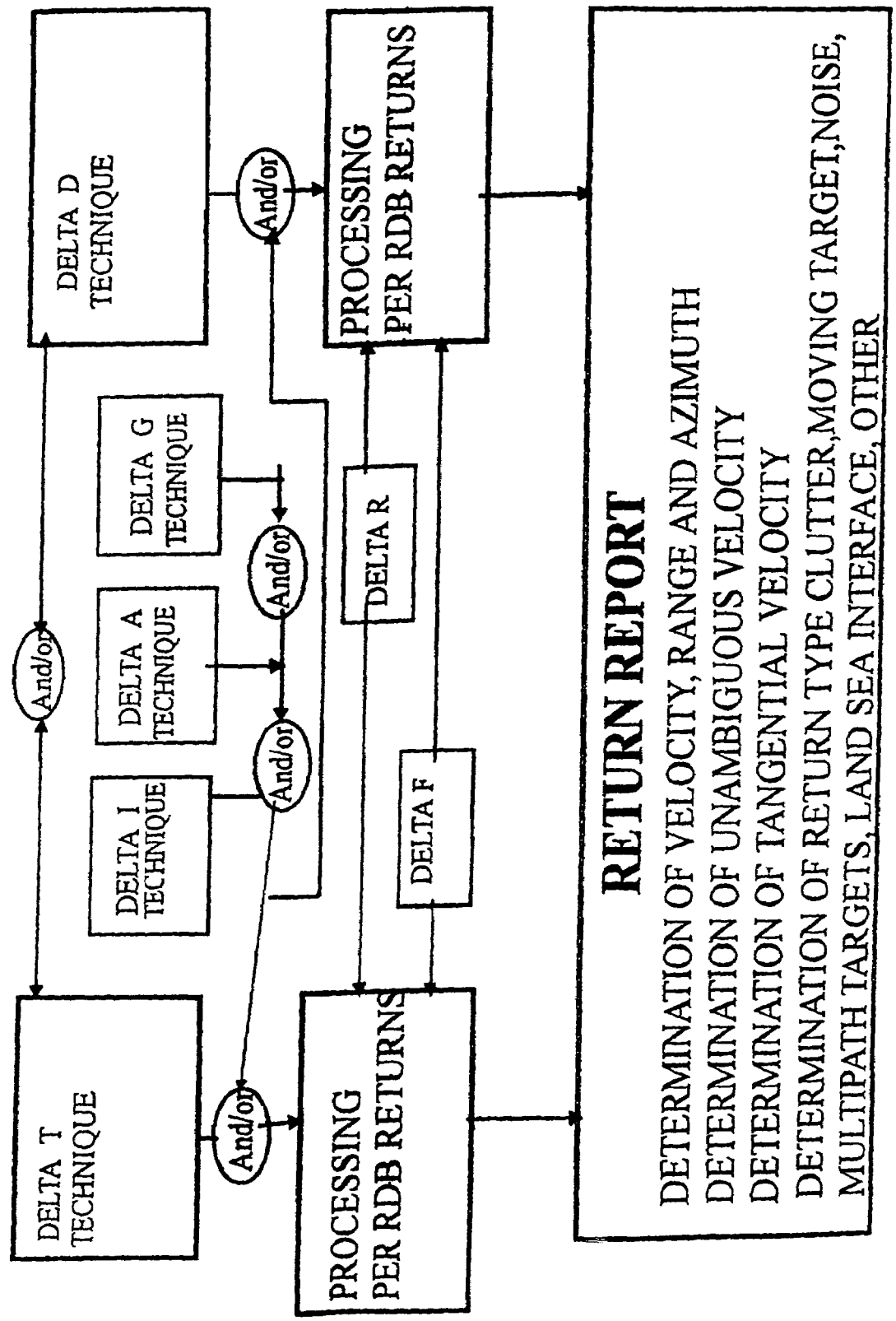

Fig. 7

ONE OR MORE CHANNELS-WITHOUT DPCA OR WITH DPCA

| T1-T2 | T2-T3 | T3-T4 | T5-T6 | T6-T7 |

$F1/R1 \text{----} e^{j\Phi_0} = M_0 X_0 e^{j\Phi_0} / M_0 X_0 \to e^{j\Phi_0} = M_0 e^{j\Phi_0} X_0 e^{j\Phi_0} / M_0 e^{j\Phi_0} X_0 \to e^{j\Phi_0} \quad \to e^{j\Phi_0} \quad \to e^{j\Phi_0}$

| T1-T2 | T2-T3 | T3-T4 | T5-T6 | T6-T7 |

$F2/R2 \text{--} e^{j\Phi_0} = X_{F0} M_0 X_0 e^{j\Phi_0} / X_{F0} M_0 X_0 \to e^{j\Phi_0} = X_{F0} M_0 e^{j\Phi_0} X_0 e^{j\Phi_0} / X_{F0} M_0 e^{j\Phi_0} X_0 \to e^{j\Phi_0} \quad \to e^{j\Phi_0} \quad \to e^{j\Phi_0}$

ADDITIONAL DPCA DELAY

| T1-T2 | T2-T3 | T3-T4 | T5-T6 | T6-T7 |

$F1/R1 \text{-----} e^{j\Phi_0} = M_0 X'_0 e^{j\Phi_0} / M_0 X'_0 \to e^{j\Phi_0} = M_0 e^{j\Phi_0} X'_0 e^{j\Phi_0} / M_0 e^{j\Phi_0} X'_0 \to e^{j\Phi_0} \quad \to e^{j\Phi_0} \quad \to e^{j\Phi_0}$

| T1-T2 | T2-T3 | T3-T4 | T5-T6 | T6-T7 |

$F2/R2 \text{--} e^{j\Phi_0} = X_{F0} M_0 X'_0 e^{j\Phi_0} / X_{F0} M_0 X'_0 \to e^{j\Phi_0} = X_{F0} M_0 e^{j\Phi_0} X'_0 e^{j\Phi_0} / X_{F0} M_0 e^{j\Phi_0} X'_0 \to e^{j\Phi_0} \quad \to e^{j\Phi_0} \quad \to e^{j\Phi_0}$

ANALOGOUS FOR F3/R3 AND F4/R4 ETC.

FOR EACH F1/R1 AND DIFFERENT TIMES ALL THE RESULTS = $e^{j\Phi_0}$

THE RESULTS SHOWN ARE FOR $e^{j\Phi_1}, e^{j\Phi_2}$, ETC. ALSO

IF EMPLOYING DPCA AND ANOTHER DPCA DELAY THE RESULTS ARE THE SAME AND THIS

IS TRUE FOR OTHER DPCA DELAYS

IF WE TAKE THE RATIO BETWEEN T1-T2 AND T2-T3 ETC. WE HAVE THE DETERMINATION OF XF0

THE SAME IS TRUE

THE SAME IS TRUE FOR XF1, XF2, ETC. FOR DIFFERENT DPCA DELAYS

THIS ALSO TRUE FOR XR0, XR1, XR2, ETC

Fig. 8

ΔD TECHNIQUE WITH ADDITIONAL TIME DELAYS

GROUPS OF TWO CHANNELS EMPLOYING A MINIMUM OF TWO CHANNELS EMPLOYING DPCA

|  D | D+1 | D+2 | D+3 | D+4 | |
|---|---|---|---|---|---|

$F1/R1 \cdots e^{j\theta_0} = M_0 A_0 e^{j\theta_0} / M_0 A_0 \rightarrow e^{j\theta_0} = M_0 e^{j\theta_0} A_0 e^{j\theta_0} / M_0 e^{j\theta_0} A_0 \rightarrow e^{j\theta_0} \rightarrow e^{j\theta_0} \rightarrow e^{j\theta_0}$ ETC
 = fnctn of $\theta_1, \theta_{2,etc}$ $F2/R2 \cdots e^{j\theta_0} = X_{F0} M_0 A_0 e^{j\theta_0} / X_{F0} M_0 A_0 \rightarrow e^{j\theta_0} = X_{F0} M_0 e^{j\theta_0} A_0 e^{j\theta_0} / X_{F0} M_0 e^{j\theta_0} A_0 \rightarrow e^{j\theta_0} \rightarrow e^{j\theta_0} \rightarrow e^{j\theta_0}$ ETC
 = fnctn of $\theta_1, \theta_{2,etc}$

ADDITIOMNAL TIME DELAY

|  D | D+1 | D+2 | D+3 | D+4 | |
|---|---|---|---|---|---|

$F1/R1 \cdots e^{j\theta_0} = M_0 e^{j\Phi_0} A_0 e^{j\theta_0} / M_0 e^{j\Phi_0} A_0 \rightarrow e^{j\theta_0} = M_0 e^{j\Phi_0} e^{j\theta_0} A_0 e^{j\theta_0} / M_0 e^{j\Phi_0} e^{j\theta_0} A_0 \rightarrow e^{j\theta_0} \rightarrow e^{j\theta_0} \rightarrow e^{j\theta_0}$ ETC
 = fnctn of $\theta_1, \theta_{2,etc}$ $F2/R2 \cdots$
$e^{j\theta_0} = X_{F0} M_0 e^{j\Phi_0} A_0 e^{j\theta_0} / X_{F0} M_0 e^{j\Phi_0} A_0 \rightarrow e^{j\theta_0} = X_{F0} M_0 e^{j\Phi_0} e^{j\theta_0} A_0 e^{j\theta_0} / X_{F0} M_0 e^{j\Phi_0} e^{j\theta_0} A_0 \rightarrow e^{j\theta_0} \rightarrow e^{j\theta_0} \rightarrow e^{j\theta_0}$ ETC
 = fnctn of $\theta_1, \theta_{2,etc}$

ANALOGOUS FOR F3/R3 AND F4/R4 ETC.

FOR EACH F1/R1 AND DIFFERENT DPCA DELAYS ALL THE RESULTS = $e^{j\theta_0}$

THE RESULTS SHOWN ARE FOR $e^{j\theta_1}, e^{j\theta_2}$, ETC. ALSO

IF EMPLOYING PAIR OF CHANNELS THE RESULTS ARE THE SAME

IF WE TAKE THE RATIO BETWEEN SAME DPCA DELAY WE HAVE THE DETERMINATION OF $X_{F0}$

THE SAME IS TRUE FOR $X_{F1}, X_{F2}$, ETC. FOR DIFFERENT DPCA DELAYS

THIS ALSO TRUE FOR $X_{R0}, X_{R1}, X_{R2}$, ETC

MOVER 1 DETECTED AT $\phi_{D1}$ AND $\phi_{R1}$ IS THE RADIAL VELOCITY THEN $\phi_{A1} = \phi_{D1} - \phi_{R1}$ IS THE AZIMUTH POSITION IS AT THE BORESIGHT OF THE ANTENNA MOVER 2 DETECTED AT $\phi_{D2}$ AND $\phi_{R2}$ IS THE RADIAL VELOCITY THEN $\phi_{A2} = \phi_{D2} - \phi_{R2}$ IS THE AZIMUTH POSITION WHICH IS NOT AT THE BORESIGHT OF ANTENNA

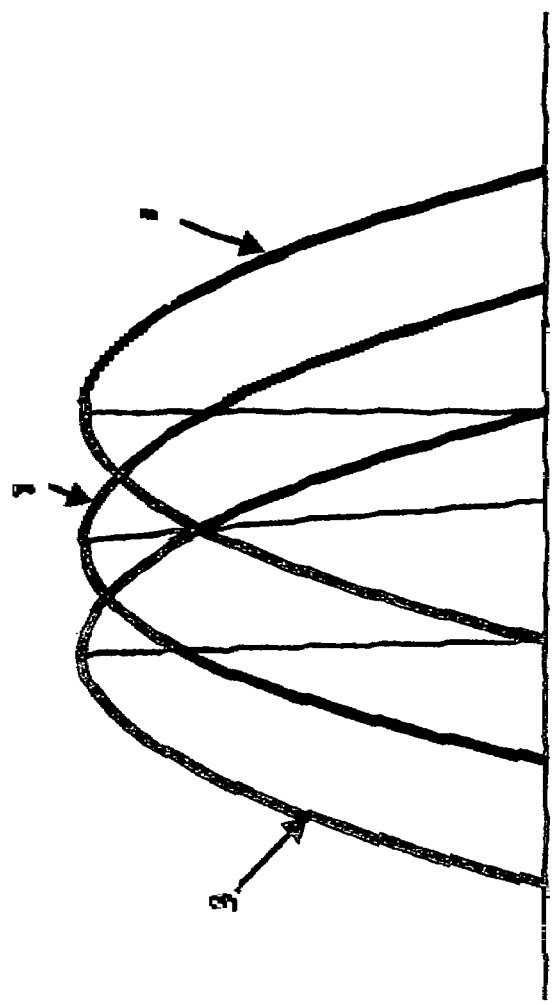
FIG.13
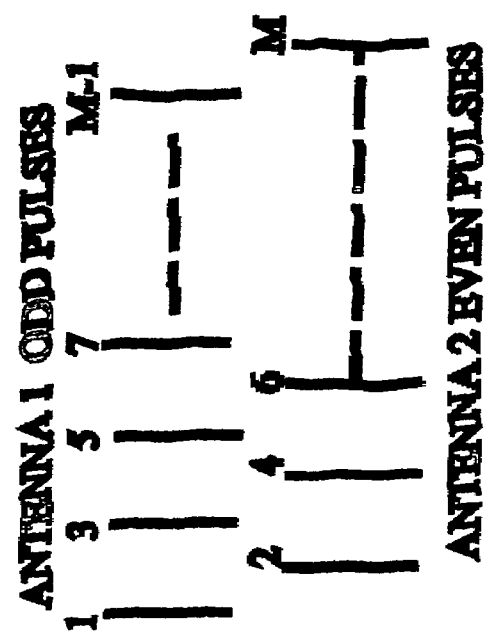

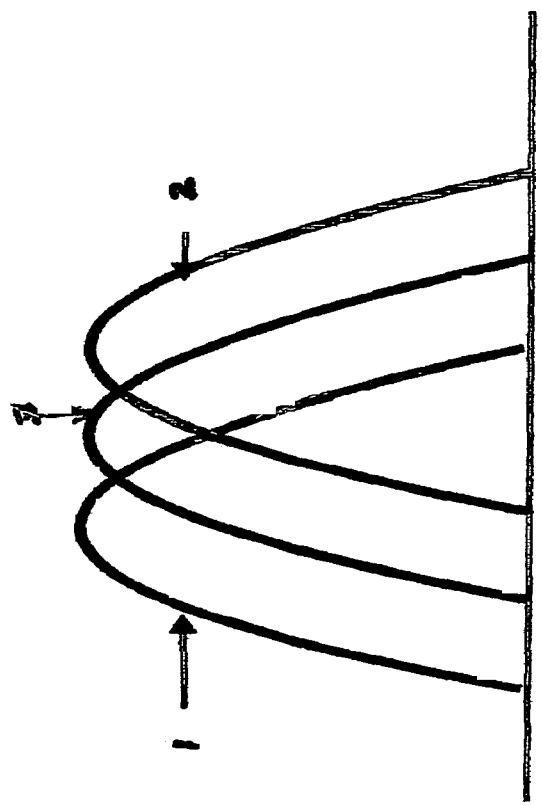
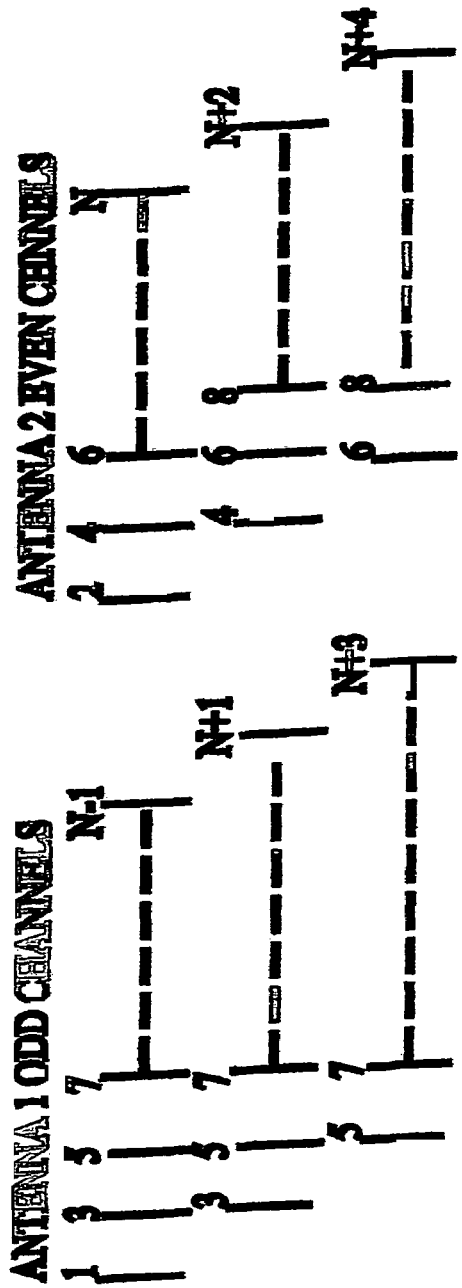
FIG 14

UNIQUE SPACE TIME ADAPTIVE SYSTEM (USS)

CROSS REFERENCE TO RELATED APPLICATIONS

This application claims the benefit, Under 35 U.S.C. § 119(e), of U.S. Provisional Application No. 60/677,576, filed May 4, 2005, which is hereby incorporated by reference.

BACKGROUND OF THE INVENTION

1. Field of Invention

The field of the invention relates generally to radars and more specifically to a radar mounted on a moving platform employing an electronic scanned array with a transmission array and receive array (channel) or arrays (channels).

2. Description of the Related Art

In the field of this invention, detecting radar returns as moving targets and rejecting others such as clutter and others has been a challenge for many years. Obtaining a moving object's velocity, azimuth, and measurement of its parameters have been an objective of many radar systems. In relatively recent years with the increased processing and storage of improved integrated circuits, space time adaptive processing ("STAP") has become more practical.

U.S. Pat. No. 5,563,601 (the "'601 patent") issued Oct. 8, 1996 and entitled TWO PORT CLUTTER SUPPRESSION INTERFEROMETRY SYSTEM FOR RADAR DETECTION OF MOVING TARGETS is incorporated, in it's entirety, by reference herein. The '601 discloses, in part, a two port radar system for detecting and measuring range, azimuth and velocity of radar returns. This patent utilizes the detection of shadows to locate the targets azimuth and not employing any other technique in combination with it and it is meant for land clutter and not sea clutter.

U.S. Pat. No. 6,633,253 (the '253 patent") issued and entitled DUAL SYNTHETIC APERTURE RADAR SYSTEM is incorporated, in its entirety, by reference herein. The '253 patent discloses, in part, a system which utilizes an electronic scanned array with two receive channels (arrays) on an airborne platform. The system employs displaced phase center antenna (DPCA) techniques to cancel clutter and detect moving targets and measures its range, velocity and azimuth accurately.

SUMMARY

The UNIQUE SPACE TIME ADAPTIVE SYSTEM (USS) system is unique in a number of ways. For example, it does not require clutter cancellation of any kind and it may employ as few as one channel or as little as one pulse. It is as accurate or more accurate as any known STAP system, hardware and dwell time and processing are a minimum. It utilizes a combination of techniques, but basically employs single or two or more equal receive arrays or pulses with or without DPCA methodology, detects returns and measures their velocity, azimuth and range. It also takes different looks in time to measure differences with time, for purpose of determining radial velocity unambiguously and tangential and vertical tangential velocity.

In one embodiment, a system utilizes one, two, or more equal receive channels processed with "M" pulses of time data. In another embodiment, the system implements as few as one or two pulses of time data and has "N" channels of data employed and processed.

Both systems will detect a return or number of returns in the same range doppler or range azimuth bin such as clutter, target, noise, jamming, etc and identify them out measure there three dimensional position and velocity. This is performed without employing any clutter cancellation of any kind.

The returns are processed to detect returns and detect moving targets of interest and reject unwanted returns such as clutter, sidelobes, movers, multipath returns, others.

USS does not require clutter cancellation therefore there is no clutter covariance matrix or training data involved or knowledge aided information. Channel matching is not required. USS has the ability to handle more returns than clutter and target per range doppler bin (RDB) or range azimuth bin (RAZ) and determine there range, velocity and azimuth accurately. Thresholding and post processing of the returns will determine if returns are clutter, moving target, antenna sidelobes, filter sidelobes, multipath returns, etc. It has the ability to handle ground moving targets, high speed targets, ship detection and identification in a unique and simplified manner.

BRIEF DESCRIPTION OF DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1—depicts top views of some of the positions that ships may be as relative to the radar and the position the ship is detected and the actual ship position;

FIG. 1A—depicts the Ship moving towards the radar;

FIG. 1B—depicts the Ship heading away from the radar;

FIG. 1C—depicts the Ship to the left of and perpendicular to the radar;

FIG. 1D—depicts the Ship to the right of and perpendicular to the radar;

FIG. 4—depicts an embodiment of a Ship Parameter Measurement Chart—in accordance with the invention;

FIG. 5—depicts an embodiment of a Chart of Proposed Systems and Characteristics in accordance with the invention;

FIG. 6—depicts an illustrative of techniques for all systems such as over ocean, over land, and in the air;

FIG. 7—depicts an embodiment of a Delta T technique with additional DPCA delays in accordance with the invention;

FIG. 8—depicts an embodiment of a Delta D technique with additional time delays in accordance with the invention;

Figure 12:
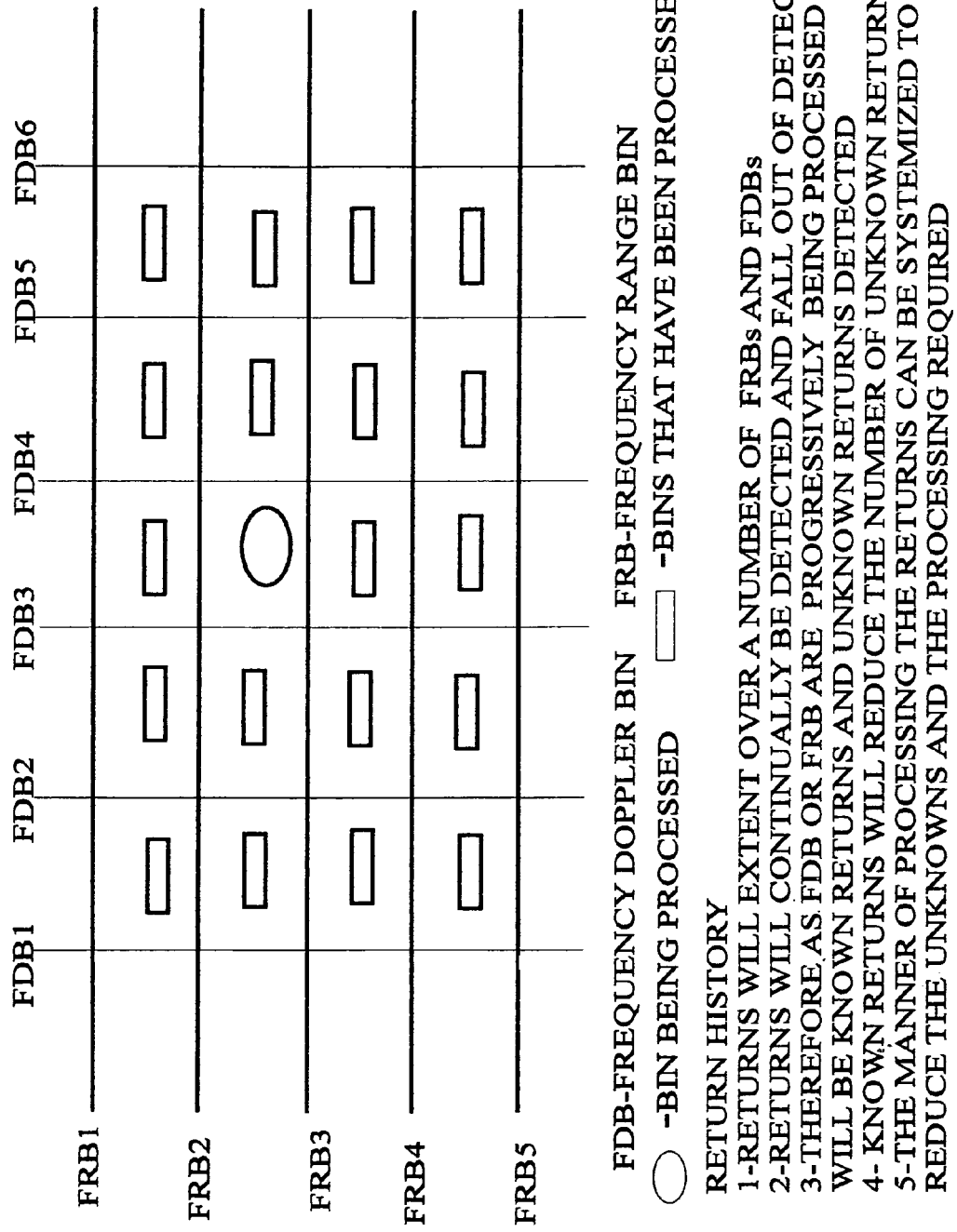

and aperture change synchronized with interleaved data in accordance with the invention;

FIG. 12 depicts examples of processing returns with the association of returns processed in adjacent range and/or doppler bins in accordance with the invention;

FIG. 13 depicts an illustrative single aperture system with interleaved pulses with change in aperture in accordance with the invention; and FIG. 14 depicts an illustrative single aperture system with no interleaved pulses with change in aperture in accordance with the invention.

DETAILED DESCRIPTION

I. A—Basic Concept of a Unique Space Time Adaptive Radar System (USS)

It is to be noted that the description of this disclosure are illustrative and cannot show all possible implementations that may be employed from the information in the disclosure by a person of ordinary skill in the state of the art. Therefore this disclosure is illustrative and not limited of the scope of the proposed invention and not limited in the scope of the role in obtaining the objective of this disclosure.

USS processing system is applicable to all frequencies. The system is able to utilize all radio frequencies limited on the low end by the size of the antenna and on the high end by the practical limitations of short waves.

Illustrated in the patent application is a one dimensional array. The implementation may also be with two dimensional arrays as well.

II. B Basic Operations, Equations and Methodology Fundamental to all of the Systems Employed in this Disclosure A—Fundamental Techniques Employed:

The mathematical fundamental equations, the radar analysis and the computer simulation for all systems to obtain the objective of the disclosure are presented. The techniques are as follows:

1) Basic System is with one aperture, one PRF and one transmission frequency. If the ambiguous range and or velocity are to be increased another PRF and/or transmission frequency is implemented in the second aperture. The basic techniques that are employed are the following:
 a) Change in time ($\Delta T$)
 b) Change in delay ($\Delta D$)
 c) Change in frequency ($\Delta F$)
 d) Change in range ($\Delta R$)
 e) Interleaved pulses ($\Delta I$)
 f) Groups of data ($\Delta G$)
 g) Change in channel ($\Delta C$)
 h) Change in aperture ($\Delta A$)
 i) Simultaneous beams (antennas) ($\Delta S$)
 j) And/or any combinations of the techniques above and correlated IIC—USS Section 1—Processing multiple returns (greater than three) employ a number of techniques to reduce processing such as known clutter reduces number of unknown returns by one, association of known returns close to processed returns may reduce number of unknown returns by one or more and analytic solution which performs well with three or less unknown returns, and the candidate phi technique which will correlate with the other techniques.

As the number of expected returns increases, the solution is attainable but more difficult and complicated. To aid in this problem any prior knowledge such as clutter is present, we know one of the returns has "0" or near "0" velocity and/or an association technique where adjacent RDBs processed indicates the return under test velocity of some or more of its returns. An analytic technique has been developed but greatly facilitated by previous techniques.

2—$\Delta F$ processing is performed as a check on the azimuth, it takes another sample(s) in frequency close to initial sample and process this data the same as the initial sample and should have the same solutions for velocity of returns but the resulting returns amplitude and phase change gives the indication of where the peaks of the returns resides and therefore accurate azimuth determination. Also if addition data is processed it should remain the same 3—$\Delta R$ processing is performed to determine the range more accurately, it takes another sample in range close to initial sample and process this data the same as initial sample and should have the same solutions for velocity of returns but the resulting returns amplitude and phase change gives the indication of where the peaks of the returns resides and therefore the accurate range determination Also if addition data is processed it should remain the same 4—$\Delta H$ processing. If implementing a planar array, processing as performed on the first linear array is done on the other linear arrays, the same or close to same solutions for $\Phi_O$ and $\Phi_1$ (radial velocity of first and second return) and $\Phi_{40}$ and $\Phi_{41}$ (azimuth of first and second returns). Also if addition data is processed it should remain the same.

Taking next the solutions for M0 and M1 for processing each linear array solves for the change in phase of M0 and M1, since the amplitude changes and is proportional to the height of the return.

If the returns are considered far field and the vertical spacing of the arrays are $\lambda/2$ and $\lambda$ is the wavelength and the angle the radar waves are making with the return is $\theta$, the sine $\theta$ is proportional to the height of return divided by the slant range. The phase differences between the linear arrays is $\lambda/2 *$ sine $\theta * \pi/180$ in radians will give the height of the return where sine $\theta = H/R$ and $H = R *$ sine $\theta$ (H-height and R-range). The phase difference will give the height of the return (illustrated in FIGS. 3 and 4). The phase difference from linear array to linear array should be same or close to same.

In the multi pulse technique processing a significant time later the data is processed identically the difference in height(phase) will give the vertical tangential velocity together with the horizontal tangential velocity give the total tangential velocity vector and add that to unambiguous radial velocity gives the total three dimensional velocity vector.

5—Applying to all systems, if we obtain multiple looks at the return we will determine the unambiguous radial velocity and tangential velocity and greater accuracy in determining the return range, velocity and azimuth.

Multilooks is defined as a look with data point 1 to N and delay the data a portion of the N point such as N/4 and adding N/4 points at the end and performing the same operations. This will result in the increased capability as stated.

When the data is delayed and reprocessed as the first set of data the returns radial motion will be measured by the number of range bins or part of a bin traveled in this time ($\Delta R/\Delta T$) gives the true velocity of the return and will resolve the unambiguous velocity, if any, of the return without resorting to another PRF and saves time. It will also be a check on the radial velocity.

The horizontal tangential velocity will also be determined which could not be determined before as a measure of ($\Delta D/\Delta T$) doppler bins moved in the time difference and the phase difference between linear arrays will give the height difference, $\Delta H/\Delta T$, hence vertical tangential velocity. Hence, the total velocity of the return is determined and not only the radial velocity, the ratio of the radial velocity to the horizontal and vertical tangential velocity will give the angle the return is pointing in space.

Multi-looks of the return will result in better parameter estimation of the return and estimation of the range, velocity and azimuth.

6—IMPLEMENTING ANOTHER PRF OR PRFs in the multipulse system adds additional capability in determining unambiguous radial velocity, ability to separate out the number of returns that are detected in the same RDB and determine there velocities, reduced clutter area competing in same RDB with other returns in both PRFs. Also other returns that occur in same PRF in one PRF do not occur in the same manner in the other PRF.

a. The clutter is present in one PRF is different in the other PRF and consequently the clutter common to the two PRFs may be reduced by as much as 50% and help significantly in determining the nature of returns by reducing the number of returns detected in one range bin by at least one. The returns will occur in the same range bin or close to same range bin when one PRF is followed by the other PRF. This occurs when the ambiguous velocity is greater than that due to the lower PRF.

b. When the last condition exists as in previous paragraph the clutter and returns in the first PRF occur in different doppler bins and have the ability in one PRF a much easier ability to process many returns than occur in the other RDB.

c. When one solution for velocity is determined in one PRF then knowing the PRFs the other radial velocity is determinable in the other PRF consequentially making it easier to determine the solution for velocities when four or more returns are detected in the same RDB.

d. When a return is detected in both PRFs the ability to determine the unambiguous velocity is increased significantly therefore the $\Delta R$ evaluation of obtaining the unambiguous velocity is much more accurate and effective.

e. All of the above makes the ability to determine the identification of returns when the number per RDB is high significantly more easily attainable. Of course more than two any number of PRFs may be implemented.

7—Post Detection Processing

Since as a result of processing we have to sort out the type of returns detected. This may be movers, clutter, multipath returns, antenna sidelobes, filter side lobes, land sea interface and others. This presents a challenge to mathematically analyze the returns and/or gave a data base that assist in categorizing the returns.

Isodop correction for the velocity of the return, focusing the array may be performed to enhance the accuracy of the system.

Motion compensation relative to the boresight of the antenna is assumed.

Add ISAR processing for further classification of the ship when the parameters are processed.

8—DPCA principles are applied in a number of techniques. To illustrate the principles and the equations involved an example will be presented.

Antenna length—eleven feet
TRANSMISSION ARRAY—ELEVEN FEET
Number of receive arrays—two of 5.5 feet each
PRF—1000 HZ
Velocity of platform—500 feet/second
Number of pulses—64

For DPCA compensation due to array two not traveling the ideal distance of 2.75 feet in time equivalent of the distance is a phase in the frequency domain. Expressing this in equation form we have the following:

If there is no delay between array 1 and array 2 this is a distance equal to 2.75 feet. This distance in time equivalent equals 2.75 feet/500 feet/sec (velocity of the platform) which is 5.5 milliseconds (D/2V).

$\Phi_{CO}=2\pi F\ T$ where $T=D/2V$ and $F=F_R K/N$ where $F_R$ is the PRF and N is the number of PRIs
$=2\pi F_R K/ND/2V=\pi F_R KD/NV$ where K is the filter number is the phase compensation $\Phi_{CO}$ is the phase compensation for DPCA OPERATION $\Phi_{CE}$ is the phase compensation error for DPCA OPERATION $\Phi_{CE}=\pi F_R KD/2NV$ The phase compensation error may now be calculated for each delay starting with no delay where time equal 5.5 milliseconds and substituting all parameters in the equation we get 9.8 degrees and for next time for succeeding pulse is 7.0 degrees and the next is 4.2 degrees and the next is 1.4 degrees. It is observed that the change in phase compensation ($\Delta K_{Do}$) is constant.

Since this is true regardless of change in increment since it is constant ($\Delta x$). The first phase compensation depends on time and position in filter of return. The phase compensation term is known ($K_{Do}$) but not the position in the filter (Yo).

9—Other Factors a. Ocean combined with overland. capability and employing the phase corrections and phase coefficient if necessary as explained in DSARS patent.

b. The mode of operation depends on many factors such as range, surveillance, tracking or spot light operation, sea state, etc.

c. Surveillance mode may be combined with spot image mode.

Wake and bow wave signatures of ships signatures as a function of their velocity and direction of the ship in help in classification of ships.

d. Surveillance mode could be a one antenna transmit and receive system.

e. High sea state conditions create shadow conditions that could be employed for better processing.

f. In the ocean the place where the ship actually exists there is no return have there azimuth at this location g. Surveillance plus spot image mode may be combined to reduce dwell time and obtain maximum information per unit time.

h. This technique may be extended to space borne operations

Problem Areas a) High clutter sea states are a big problem area and challenge to perform meaningful operations.

b) Long dwell time to perform accurate determinations. This is the reason for decreased spacing of doppler bins and increased sampling per range bin might ameliorate that condition.

c) Long range makes things very difficult.

d) Performing surveillance and tracking at the same time as classification of ships.

e). Operate without change in time operation for the surveillance mode.

10—Block Diagram of System

Figure 2:
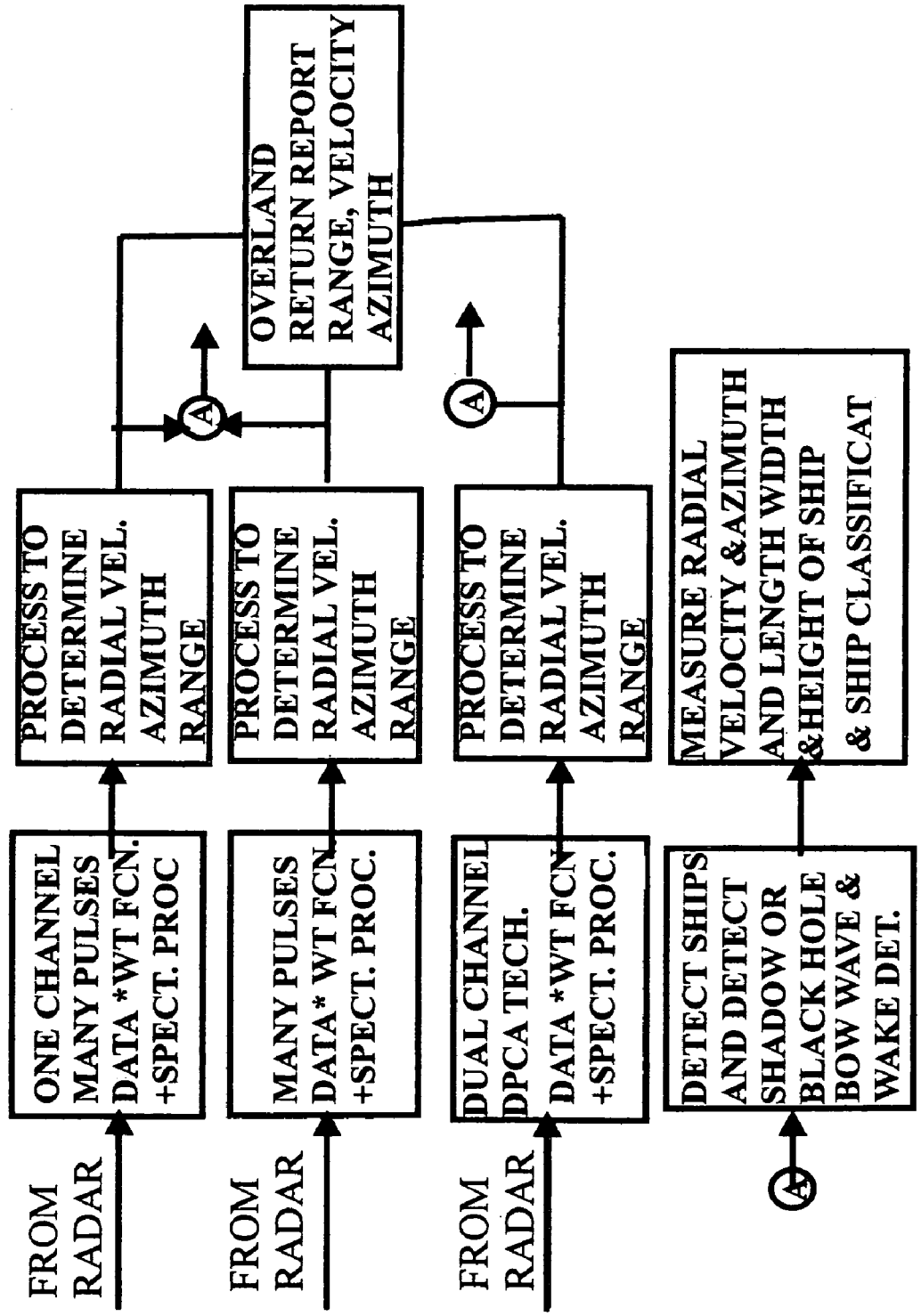
FIG. 2—depicts a high level block diagram in accordance with the invention.
Figure 3:
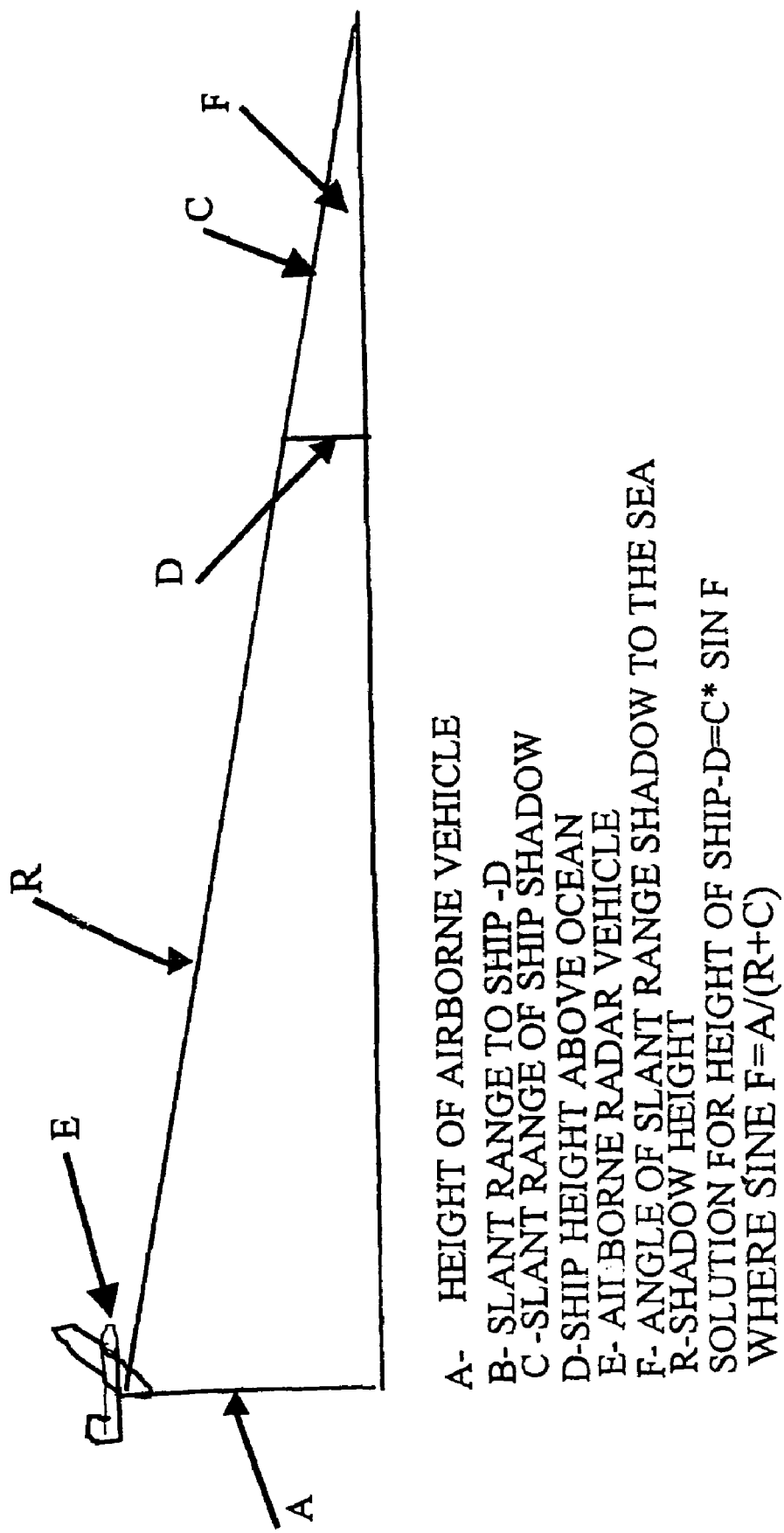
FIG. 3—depicts an embodiment of a chart for determination of the height of ships when detected and the solution of the height dependent on various factors.

For the over ocean capability this is a simplified system as illustrated in FIGS. 1 to 5. FIG. 1 shows different positions of ship and effects due to these positions. FIG. 2 illustrates some techniques employed. FIGS. 3 and 4 shows the height and shadow determinations. FIG. 5 depicts the techniques employed as well as different affects detected and evaluated indicating the basic data is received from the radar in digital form and stored and processed in any or selected techniques described in the disclosure. The data is spectrally processed and the detection of the ship is performed together with the detection of the shadow and black hole to determine the ships radial velocity, azimuth and range, as well as the measurement of the ship parameters to classify the ship with as much accuracy as possible.

The delay data is processed to determine radial velocity unambiguously and to determine the tangential velocities and the ship parameters more accurately.

11—The following analysis may be applied to all VSS systems especially over the ocean detection of ships as follows:

1—One Channel—Many Pulses—One Return Simple Solution

The equations are as follows:

$$V_0 = M_0 \quad \text{channel 1 time 1} \quad V'_0 = M_0 X_0 \quad \text{channel 2 time 1}$$

$$V_1 = M_0 e^{j\Phi_{D0}} \quad \text{channel 1 time 2} \quad V'_1 = M_0 X_0 e^{j\Phi'_{D0}} e^{j\theta_0} \quad \text{channel 2 time 2}$$

$$e^{j\Phi_{D0}} = V_1/V_0 \quad \Phi_{D0} = \Phi'_{D0} \quad e^{j\Phi'_{D0}} e^{j\theta_0} = V'_1/V'_0$$

$$e^{j\theta_0} = (V'_1/V'_0)/(V_1/V_0) : \theta_0 = \Phi_0 + \Delta K_{D0} X_0$$

$M'_0/M_0$ Where the ratio of the amplitude at aperture 1 to aperture 2 as a function of azimuth is determined a prior by taking antenna measurements or real measure relatively high amplitude clutter only data. Like equations above will give curve of ratio of outputs-vs-azimuth.

Where the definition of terms are as follows:

$V_0$—is the return of first aperture output $V'_0$—is the return of second aperture output $V_1$—is the return of first aperture output delayed $V'_1$—is the return of second aperture output delayed $\Phi_{D0}$—is the phase of the first aperture proportional to its velocity plus azimuth $\Phi'_{D0}$—is the phase of the second aperture proportional to its velocity plus azimuth The phase of $M'_0/M_0$ is $\Phi_{D0}/2$ proportional to its phase of its velocity plus azimuth. The phase $\Phi_0 = \Phi_{D0} - \Phi_{A0}$ will give the phase proportional to radial velocity.

$\Phi_0$—phase of return proportional to radial velocity $\Phi_{D0}$—phase of return proportional to radial velocity plus azimuth $\Phi_{A0}$—phase of return proportional to azimuth 12—One Pulse—Many Channels—One Return Simple Solution The equations are as follows:

$$V_0 = M_0 \quad V'_0 = M'_0$$

$$V_1 = M_0 e^{j\Phi_{D0}} \quad V'_1 = M'_0 e^{j\Phi'_{D0}}$$

$$e^{j\Phi_{D0}} = V_1/V_0 \quad e^{j\Phi'_{D0}} = V'_1/V'_0$$

$$\Phi_{D0} = \Phi'_{D0}$$

Where the definition of terms are as follows:

$M'_0/M_0$ Where the ratio of the amplitude at aperture 1 to aperture 2 as a function of azimuth is determined a prior by taking antenna measurements or real measure relatively high amplitude clutter only data. Like equations above will give curve of ratio of outputs-vs-azimuth.

Where the definition of terms are as follows:

$V_0$—is the return of first aperture output $V'_0$—is the return of second aperture output $V_1$—is the return of first aperture output delayed $V'_1$—is the return of second aperture output delayed $\Phi_{D0}$—is the phase of the first aperture proportional to its velocity plus azimuth $\Phi'_{D0}$—is the phase of the second aperture proportional to its velocity plus azimuth The phase of $M'_0/M_0$ is $\Phi_{D0}$ proportional to its phase of its velocity plus azimuth. The phase $\Phi_0 = \Phi_{D0} - \Phi_{A0}$ will give the phase proportional to radial velocity.

$\Phi_0$—phase of return proportional to radial velocity $\Phi_{D0}$—phase of return proportional to radial velocity plus azimuth $\Phi_{A0}$—phase of return proportional to azimuth $V_0$—is the return of first pulse output $V_1$—is the return of second pulse output $\Phi_{A0}$—is the phase of the return proportional to its velocity 13a—TWO CHANNEL—MANY PULSES—ONE RETURN—delta D technique where M1 return much larger than other returns for example a ship return in the ocean or in a shadow area employing DPCA methodology.

$$(1) V_0 = M_0 \quad \text{channel 1 time 1} - M \text{ delay 0} \quad (1)$$

$$V_1 = M_0 X_o \quad \text{channel 2 time 1} - M \text{ delay 0} \quad (2)$$

$$V_2 = M_0 X_o e^{j\theta_0} \quad \text{channel 2 time 2} - M + 1 \text{ delay 1} \quad (3)$$

$$X_o = 1/W_{MO} = A_{MO} e^{(\Psi_{MO} + K_{D0} Y_0)} = A_0 \quad (4)$$

$$A_0 e^{j\theta_0} = V_2/V_1 A_0 e^{j(\Phi_0 - \Delta K_{D0} X_0)} \quad (5)$$

$$A_{MO} = |V_2/V_1| : (6') e^{j\theta_0} = \text{phase of } V_2/V_1 \quad (6)$$

$$\theta_0 = \Phi_0 - \Delta K_{D0} X_0 \quad (7)$$

Solve equation (7) for $\theta_0$ is known and $X_0$ are unknown and therefore from the peak of where the return is detected which is $\Phi_{D0}$ and therefore $X_0$ and $\Phi_0$ has been determined and phase $\Phi_{A0} = \Phi_{D0} - \Phi_0$ will give the phase proportional to azimuth.

M1—Return

With clutter only returns, it could be utilized for producing the curve ratio between apertures-vs-azimuth.

V0—first channel output at time 1

V1—second channel output at time 1

AM0—Channel balancing amplitude factor $\Psi_{M0}$—Channel balancing phase factor KD1—Phase coefficient to correct for detection of return not at center of doppler bin X0—Distance return detected from center of doppler bin WM0—Factor that makes channel two equal to channel 1

$\Phi_0$—phase of return proportional to radial velocity $\Phi_{D0}$—phase of return proportional to radial velocity plus azimuth $\Phi_{A0}$—phase of return proportional to azimuth 13b Two Channel—Many Pulses—One Return—$\Phi_{D0}$ Technique The equations are as follows:

$V_0 = M_0$     channel 1 time 1    $V'_0 = M_0 X_0$     channel 2 time 1

$V_1 = M_0 e^{j\Phi_{D0}}$   channel 1 time 2    $V'_1 = M_0 X_0 e^{j\Phi'_{D0}}$    channel 2 time 2

$e^{j\Phi_{D0}} = V_1/V_0$    $\Phi_{D0} = \Phi'_{D0}$      $e^{j\Phi'_{D0}} e^{j\theta_0} = V'_1/V'_0$ $e^{j\theta_0} = (V'_1/V'_0)/(V_1/V_0) : \theta_0 = \Phi_0 + \Delta K_{D0} X_0$ 14a—Two Pulse—Many Channels—One Return—Delta C Technique Employing DPCA Methodology.

$V_0 = M_0$     pulse 1 channel 1 – N delay 0             (1)

$V_1 = M_0 X_o$     pulse 2 channel 1 – N delay 0          (2)

$V_2 = M_0 X_o e^{j\theta_0}$   pulse 2 time 2 – N + 1 delay 1       (3)

$X_o = 1/W_{M0} = A_{M0} e^{(\Psi_{M0} + K_{D0} X_0)} = A_0$                     (4)

$A_0 e^{j\gamma_0} = V_2/V_1 = A_0 e^{j(\Phi_{A0} - \Delta K_{D0} X_0)}$                  (5)

$A_{M0} = |V_2/V_1| : (6') e^{j\gamma_0} = $ phase of $V_2/V_1$        (6)

$\gamma_0 = \Phi_{A0} - \Delta K_{D0} X_0$                                            (7)

Solve equation (7) for $\gamma_0$ is known and $X_0$ are unknown and therefore from the peak of where the return is detected which is $\Phi_{D0}$ and therefore $\Phi_{A0}$ and $\Phi_0$ has been determined and phase $\Phi_0 = \Phi_{D0} - \Phi_{A0}$ will give the phase proportional to radial velocity M1—Return With clutter only returns, it could be utilized for producing the curve ratio between apertures-vs-azimuth.

V0—first pulse output at channel 1

V1—second pulse output at channel 1

AM0—Channel balancing amplitude factor $\Psi_{M0}$—Channel balancing PHASE factor KD0—Phase coefficient to correct for detection of return not at center of doppler bin X0—Distance return detected from center of doppler bin WM0—Factor that makes phase channel two equal to channel 1

$\Phi_0$—phase of return proportional to radial velocity $\Phi_{D0}$—phase of return proportional to radial velocity plus azimuth $\Phi_{A0}$—phase of return proportional to azimuth 14 b Two Channel—Many Pulses—One Return—$\Phi_{D0}$ Technique The equations are as follows:

$V_0 = M_0$     pulse 1 channel 1 – N    $V'_0 = M_0 X_0$     PULSE 2 channel 1 – N $V_1 = M_0 e^{j\Phi_{D0}}$   pulse 1 channel 2 – N + 1   $V'_1 = M_0 X_0 e^{j\Phi'_{D0}}$   PULSE 2 channel 2 – N + 1

$e^{j\Phi_{D0}} = V_1/V_0$    $\Phi_{D0} = \Phi'_{D0}$      $e^{j\Phi'_{D0}} e^{j\gamma_0} = V'_1/V'_0$ $e^{j\gamma_0} = (V'_1/V'_0)/(V_1/V_0) : \gamma_0 = \Phi_{A0} + \Delta K_{D0} X_0$ Solve for $\gamma_0$ is known and $X_0$ are unknown and therefore from the peak of where the return is detected which is $\Phi_{D0}$ and therefore $\Phi_{A0}$ and $\Phi_0$ has been determined and phase $\Phi_0 = \Phi_{D0} - \Phi_{A0}$ will give the phase proportional to radial velocity The same definition of terms as in 19a.

15—Implementing Another Transmission Frequency

Against broadband jamming change the transmission frequency to avoid jamming but not enough to change the implementation.

III—Basic Equations and Methodology

Detection of wanted returns and reject unwanted returns such as clutter. In previous STAP approaches where a number of pulses (M) of a particular PRF and a number channels (N-receive arrays) are implemented.

Considering that channels returns differs in both elevation and azimuth pattern (magnitude as well as phase), employing a minimum number of channels reduces the channel matching problem and reduces the storage and processing requirements significantly since the number of channels proposed to be a few as one instead of the usual ten or more. It proposes to perform as well or better than any of the known STAP systems.

Also considering as in most proposed STAP implementations some form of clutter cancellation are employed such as clutter covariance matrix or training data or knowledge aided clutter detection for non homogeneous data or high discretes of clutter for better detection of returns of interest. Returns of interest have to be thresholded above the clutter residue which may be significant and lead to many false alarms and/or missed detections. In the proposed USS no cancellation of clutter is required and all the above clutter reductions are eliminated. Consequentially when thresholding for possible meaningful returns they are not competing with clutter and simpler to detect and measure their radial velocity and azimuth very accurately.

This STAP methodology employs two or more channels, process the pulse data (slow data) first into its frequency spectrum and consequently localize clutter into its own range doppler bin (RDB) together with any other returns that may be detected in that same RDB such as target, thermal noise, and others.

The subsequent processing of each RDB will separate out returns doppler wise and since clutter has zero (0) radial velocity and other returns in the same (RDB) will have different velocities. From determining the velocities of the returns the azimuths will be calculated therefore no additional channels are required.

The knowledge aided STAP will be involved to determine from the detected returns in the RDB which are clutter, targets of interest, sidelobe returns, land sea interface, thermal noise, etc. The knowledge aided STAP will be not be involved in canceling clutter but in determining the returns of interest so they may be detected and there parameters measured and determine the nature of the return.

The following sections will be an analysis of various techniques with their mathematical development to accomplish these ends. It is assumed the data in time has been processed by FFT into their individual RDBs where there exist in the cases of interest clutter (0-velocity) and other returns (non "0" velocity). Initially two (2) returns will be developed; it may be clutter and moving target or two moving targets or more returns.

Two or three more returns in one RDB will be considered but more than three returns can be processed and determine the nature of the returns.

III—A Two Channels at a Time-"M"-Pulses in Time Data-Two Returns-$\Phi_D$ Technique The analysis may be performed with a one antenna transmit and two (channel) receive system. This system is called $\Delta T$ methodology where the data will be delayed one or more time increments in channel 1 and 2 as required for a solution. We will consider two returns clutter and target and the "M" pulse data (time data) has been spectrum processed into its individual RDBs and each will be treated as follows:

Each set of data, each time the data point is delayed it is multiplied by a suitable weighting function and its spectrum is obtained with such as FFT. In processing a particular RDB where we have two returns we have the following equations:

$$V_{00} = M_0 + M_1 \quad \text{Channel 1 Pulse data } 1 - M \text{ Delay } 0 \quad (1)$$

$$V_{01} = M_0 e^{j\Phi_{D0}} + M_1 e^{j\Phi_{D1}} \quad \text{Channel 1 Pulse data } 2 - M + 1 \text{ Delay } 1 \quad (2)$$

$$V_{02} = M_0 e^{j2\Phi_{D0}} + M_1 e^{j2\Phi_{D1}} \quad \text{Channel 1 Pulse data } 3 - M + 2 \text{ Delay } 2 \quad (3)$$

$$V_{03} = M_0 e^{j3\Phi_{D0}} + M_1 e^{j3\Phi_{D1}} \quad \text{Channel 1 Pulse data } 4 - M + 3 \text{ Delay } 3 \quad (4)$$

Above equations are for two returns where $V_{00}$—is the return in the RDB channel 1 being processed at time 1

$V_{01}$—is the return in the RDB channel 1 being processed at time 2

$V_{02}$—is the return in the RDB channel 1 being processed at time 3

$V_{03}$—is the return in the RDB channel 1 being processed at time 4

$M_0$—is the first return vector $M_1$—is the second return vector $\Phi_{D0}$—is the phase of the first return where the phase is proportional to the phase due to radial velocity plus that due to the azimuth of the return.

$\Phi_{D1}$—is the phase of the second return where the phase is proportional to the radial velocity plus that due to the azimuth of the return It is noted with each delay in time of the data the vectors of the returns phase is increased proportional to the delay which represents the phase of the return proportional to velocity and that due to its azimuth position in the antenna beam. Zero velocity returns such as clutter will have phase shift equal to zero due to its velocity but one due to its azimuth position in the antenna beam and other returns will have phase shifts directly proportional to their radial velocity and one due to its azimuth position in the main beam. When returns are detected in the same RDB the sum of their phases ($\Phi_{D0}$ or $\Phi_{D1}$) (frequency) are detected in the same in RDB but are different in phase value and it is on this basis the returns are analyzed, processed and separated out.

Taking equations (1) and (2) and treating $M_0$ and $M_1$ as the variables and solving for $M_0$ and $M_1$ we have:

$$M_0 = (V_{00} e^{j\Phi_{D1}} - V_{01})/(e^{j\Phi_{D1}} - e^{j\Phi_{D0}}) \quad (1')$$

$$M_1 = (V_{00} - V_{01} e^{j\Phi_{D0}})/(e^{j\Phi_{D1}} - e^{j\Phi_{D0}}) \quad (2')$$

Taking equations (2) and (3) and treating $M_0 e^{j\Phi_{D0}}$ and $M_1 e^{j\Phi_{D1}}$ as the variables and solving for $M_0 e^{j\Phi_{D0}}$ and $M_1 e^{j\Phi_{D1}}$ we have:

$$M_0 e^{j\Phi_{D0}} = (V_{01} e^{j\Phi_{D1}} - V_{02})/(e^{j\Phi_{D1}} - e^{j\Phi_{D0}}) \quad (1'')$$

$$M_1 e^{j\Phi_{D1}} = (V_{01} - V_{02} e^{j\Phi_{D0}})/(e^{j\Phi_{D1}} - e^{j\Phi_{D0}}) \quad (2'')$$

Equation (2'')/Equation (2') or Equation (1'')/Equation (1') are the following:

$$e^{j\Phi_{D0}} = (V_{01} e^{j\Phi_{D1}} - V_{02})/(V_{00} e^{j\Phi_{D1}} - V_{01}) \quad (3')$$

$$e^{j\Phi_{D1}} = (V_{02} - V_{01} e^{j\Phi_{D0}})/(V_{01} - V_{00} e^{j\Phi_{D0}}) \quad (4')$$

Equation (3') or Equation (4') is easily solved for $\Phi_{D0}$ and $\Phi_{D1}$ which are proportional to the total phase of return 0 and return 1 respectively. If return "Mo" is clutter then $\Phi_0 = 0$ corresponding to clutter having zero (0) velocity.

Now employing equations (1) and (2) and solving for $M_0$ and $M_1$ knowing $\Phi_{D0}$ and $\Phi_{D1}$ we are now are to find $\Phi_0$ and $\Phi_1$ which are proportional to velocity of return 0 and return 1 respectively. $M_0$ and $M_1$ are returns that are detected in the same RDB.

Having the second channel data and performing the same operations as in channel 1 and the equations are as follows:

$V'_{00} = M_0 X_{01} + M_1 X_{11}$   Channel 2 Pulse data $1 - M$ Delay 0   (1')

$V'_{01} = M_0 X_{01} e^{j\Phi'_{D0}} + M_1 X_{11} e^{j\Phi'_{D1}}$   Channel 2 Pulse data $2 - M + 1$ Delay 1   (2')

$V'_{02} = M_0 X_{01} e^{j2\Phi'_{D0}} + M_1 X_{11} e^{j2\Phi'_{D1}}$   Channel 2 Pulse data $3 - M + 2$ Delay 2   (3')

$V'_{03} = M_0 X_{01} e^{j3\Phi'_{D0}} + M_1 X_{11} e^{j3\Phi'_{D1}}$   Channel 2 Pulse data $4 - M + 3$ Delay 3   (4')

$X_{01} = e^{jD\Phi_{A0}} e^{jK_{D0}X_0} / W_{M0} = |1/A_{M0}| e^{j(K_{D0}X_0 - \Psi_{M0})}$ where $D = 0$ $X_{01} = e^{jK_{D0}X_0} / W_{M0} = |1/A_{M0}| e^{j(K_{D0}X_0\Psi_{M0})}$ $X_{11} = e^{jD\Phi_{A1}} e^{jK_{D0}X_1} / W_{M1} = |1/A_{M1}| e^{j(K_{D0}X_1 - \Psi_{M1})}$ where $D = 0$ $X_{11} = e^{jK_{D0}X_1} / W_{M1} = |1/A_{M1}| e^{j(K_{D0}X_1\Psi_{M1})}$ Solving equations (1') to (4') in the same manner as equations (1) to (4) we solve for $\Phi'_{D0}$ and $\Phi'_{D1}$ and $M_0 X_{01}$ and $M_1 X_{11}$. $\Phi'_{D0}$ and $\Phi'_{D1}$ solution should be the same as for $\Phi_{D0}$ and $\Phi_{D1}$ since in channel 2 we have the same returns detected in the same RDB with the same velocity components. solution for $M_0 X_{01}$ and $M_1 X_{11}$ in channel 2/solving for $M_0$ and $M_1$ in channel 1 yields $X_{01}$ and $X_{11}$ Having the second channel data delayed and performing the same operations as in channel 1 and 2 and the equations are as follows:

$V''_{00} = M_0 X_{02} + M_1 X_{12}$   CHANNEL 2 PULSE data $2 - M + 1$ Delay 1   (1'')

$V''_{01} = M_0 X_{02} e^{j\Phi''_{D0}} + M_1 X_{12} e^{j\Phi''_{D1}}$   CHANNEL 2 PULSE data $3 - M + 2$ Delay 2   (2'')

$V''_{02} = M_0 X_{02} e^{j2\Phi''_{D0}} + M_1 X_{12} e^{j2\Phi''_{D1}}$   CHANNEL 2 PULSE data $4 - M + 3$ Delay 3   (3'')

$V''_{03} = M_0 X_{02} e^{j3\Phi''_{D0}} + M_1 X_{12} e^{j3\Phi''_{D1}}$   CHANNEL 2 PULSE data $5 - M + 4$ Delay 4   (4'')

$X_{02} = X_{01} e^{j(\Phi_0 + \Delta K_{D0}\Delta X_0)} = X_{01} e^{j(\theta_0)} : X_{12} X_{11} e^{j(\Phi_1 + \Delta K_{D0}\Delta X_0)} = X_{11} e^{j(\theta_1)}$ $V''_{00} = M_0 X_{01} e^{j\theta_0} + M_1 X_{12} e^{j\theta_1}$   Channel 2 Pulse data $2 - M + 1$ Delay 1   (1''')

$V''_{01} = M_0 X_{01} e^{j2\theta_0} e^{j\Phi''_{D0}} + M_1 X_{12} e^{j2\theta_1} e^{j\Phi''_{D1}}$   Channel 2 Pulse data $3 - M + 2$ Delay 2   (2''')

$V''_{02} = M_0 X_{01} e^{j3\theta_0} e^{j2\Phi''_{D0}} + M_1 X_{12} e^{j3\theta_1} e^{j2\Phi''_{D1}}$   Channel 2 Pulse data $4 - M + 3$ Delay 3   (3''')

$V''_{03} = M_0 X_{01} e^{j4\theta_0} e^{j3\Phi''_{D0}} + M_1 X_{12} e^{j4\theta_1} e^{j3\Phi''_{D1}}$   Channel 2 Pulse data $5 - M + 4$ Delay 4   (4''')

Solving equations (1'') to (4'') the same manner as equations (1) to (4) we solve for $\Phi_{D0}$ and $\Phi_{D1}$ and $M_0 X_{01}$ and $M_1 X_{11}$. $\Phi''_{D0}$ and $\Phi''_{D1}$ solution should be the same.

solution for $M_0 X_{01} e^{j\theta_0}$ and $M_1 X_{11} e^{j\theta_1}$ in channel 2 delayed /solving for $M_0 X_{01}$ and $M_1 X_{11}$ in channel 2 yields $e^{j\theta_0}$ and $e^{j\theta_1}$ and $\theta_0 = \Phi_0 + \Delta K_{D0} X_0$ where $\theta_0$ is known and $X_0$ is unknown and therefore $\Phi_0$ has to be determined $\theta_1 = \Phi_1 + \Delta K_{D0} X_0$ where $\theta_1$ is known and $X_1$ is unknown and therefore $\Phi_1$ has to be determined If the location is taken at the center of the filter the error in determination of azimuth is plus or minus a half a RDB. If a more accurate determination is desired a point of frequency close to first filter is created and processed like that of first filter.

This gives the same $\Phi_0$ and $\Phi_1$ and different $M_0$ and $M_1$ and the ratio of the $M_0$ and $M_1$ should give a good estimate of where the position $\Phi_{D0}$ and $\Phi_{D1}$ is detected at in the RDB. From this an estimate of azimuth of both returns are determined. To get a more accurate determination another frequency may be processed or a slight change in the range processed and results correlated for best results.

From a second set of data a small known change in frequency from the first set of data. We assume there will be no change in the channel balancing terms $A_{M0}, \Psi_{M0}$ and $X_0$ and $\Phi_0$ which are the amplitude and phase term but an unknown DPCA term $\Delta K_{D0} X_0$ where $X_0$ is the unknown change in position of new filter and $\Delta K_{D0}$ DPCA known constant therefore the term is unknown. Performing the operations on the second set of data, the solutions are the same for $\Phi_1$ and $\Phi_0$ The returns change due to frequency change from $M_0$ to $M'_0$ where $X_{F0} = M'_0/M_0$ and $M_1$ to $M'_1$ where $X_{F1} = M'_1/M_1$. Therefore we have determined the ratio of the returns from which we estimate the position of the peak where is the first return and from that calculate the azimuth of the return. We can analogously perform that for the second return.

Reference: section I J on DPCA calculations will give the derivations of $\Phi_{A0}$, $\Phi_{D0}$, $\Phi_0$ and $\Phi_{A1}$, $\Phi_{D1}$, $\Phi_1$, and $\Delta K_{D0}$, $\Delta K_{D1}$, $\Delta x_0$, $\Delta x_1$, $X_0$, $X_1$, $\theta_0$, $\theta_1$ Solving for phase proportional to azimuth in both returns we have the following:

$\Phi_{AO} = \Phi_{D0} - \Phi_0$ and $\Phi_{A1} = \Phi_{D1} - \Phi_1$

Definition of terms not defined previously:

ALL "V" TERMS ARE MEASURED TERMS.—

X01—CHANNEL 2 TERM THAT makes relates channel 2 to channel 1 for return 1

X02—CHANNEL 2 TERM THAT makes relates channel 2 to channel 1 for return 2

$\Delta K_{D0}$—the difference factor for different delays for return 1 and 2

$X_0$—the position in filter for return 1

$\theta_0$—the difference in angle between different delayed data of return 1

$\theta_1$—the difference in angle between different delayed data of return 2

$\Phi_{A0}$—phase proportional to azimuth of return 1
$\Phi_{A1}$—phase proportional to azimuth of return 2

$A_{M0}$—Amplitude balancing term between channel 1 and 2 for return 1

$A_{M1}$—Amplitude balancing term between channel 1 and 2 for return 2

$\Psi_{M0}$—Phase balancing term between channel 1 and 2 for return 1

$\Psi_{M1}$—Phase balancing term between channel 1 and 2 for return 2

Comments and observations on technique:

1—All solutions $\Phi_{D0}$, $\Phi'_{D0}$, $\Phi''_{D0}$ should be equal and $\Phi_{D1}$, $\Phi'_{D1}$, $\Phi''_{D1}$ should be equal 2—Solving for M0 and M1 by this approach solves for the location of their peaks therefore they have a phase shift equal to zero at this point.

3—To solve for the channel balancing terms three sets of equations are required but for solving for velocity and azimuth only last two sets are required.

4—Correlate with other $\Delta$T-DPCA-technique in the following manner:
 a) same solution
 b) all variables are the same value such as M0, M1, ETC
 c) $\Delta$F, $\Delta$R and $\Delta$H results should have the same values and correlate Analogously a small change in range bin may be taken and we determine $X_{R0}$ and $X_{R1}$ which determines where the peak of the returns in range, this does not help in the evaluation in azimuth. If and evaluation in resolving velocity ambiguity with the taking of a meaningful delay in time and processing again. Thus we can determine the peak of each return in range and azimuth to obtain the maximum amplitude for each return for further use. The change in amplitude and phase of the range bin in conjunction with a delay in time gives an accurate determination of velocity which will resolve velocity ambiguity.

The change in amplitude and phase of the doppler bin in conjunction with a delay in time gives an accurate determination of horizontal tangential velocity.

The change in amplitude and phase in the different linear arrays of the doppler bin in conjunction with a delay in time gives an accurate determination of vertical tangential velocity.

Thus we have obtained the three dimensional positions and velocities of all returns.

B. Two channel "M" pulse data in time-three returns-$\Phi_D$ technique

The previous analysis was for two returns possible per RDB processed; this will be for three (3) returns per RDB.

$$V_{00} = M_0 + M_1 + M_2 \quad \text{Channel 1 Pulse data } 1 - M \text{ Delay } 0 \quad (1)$$

$$V_{01} = M_0 e^{j\Phi_{D0}} + M_1 e^{j\Phi_{D1}} + M_2 e^{j\Phi_{D2}} \quad \text{Channel 1 Pulse data } 2 - M + 1 \text{ Delay } 1 \quad (2)$$

$$V_{02} = M_0 e^{j2\Phi_{D0}} + M_1 e^{j2\Phi_{D1}} + M_2 e^{j2\Phi_{D2}} \quad \text{Channel 1 Pulse data } 3 - M + 2 \text{ Delay } 2 \quad (3)$$

$$V_{03} = M_0 e^{j3\Phi_{D0}} + M_1 e^{j3\Phi_{D1}} + M_2 e^{j3\Phi_{D2}} \quad \text{Channel 1 Pulse data } 4 - M + 3 \text{ Delay } 3 \quad (4)$$

All terms previously defined except the following:

$M_2$—Third return $\Phi_{D2}$—phase proportional to radial velocity plus azimuth of third return $\Phi_{A2}$—phase proportional to azimuth of third return $\Phi_2$—phase proportional to radial velocity of third return Taking equations (1) and (2) and (3) and treating $M_0$ and $M_1$ and $M_2$ as the variables and solving the determinant equation for $\Delta_0$ we have:

$$\Delta_0 = \begin{vmatrix} 1 & 1 & 1 \\ e^{j\Phi_{D0}} & e^{j\Phi_{D1}} & e^{j\Phi_{D2}} \\ e^{j2\Phi_{D0}} & e^{j2\Phi_{D1}} & e^{j2\Phi_{D2}} \end{vmatrix} = 1 \begin{vmatrix} e^{j\Phi_{D1}} & e^{j\Phi_{D2}} \\ e^{j2\Phi_{D1}} & e^{j2\Phi_{D2}} \end{vmatrix} - 1 \begin{vmatrix} e^{j\Phi_{D0}} & e^{j\Phi_{D2}} \\ e^{j2\Phi_{D0}} & e^{j2\Phi_{D2}} \end{vmatrix} + 1 \begin{vmatrix} e^{j\Phi_{D0}} & e^{j\Phi_{D1}} \\ e^{j2\Phi_{D0}} & e^{j2\Phi_{D1}} \end{vmatrix}$$

$$\Delta_0 = e^{j\Phi_{D1}} e^{j2\Phi_{D2}} - e^{j2\Phi_{D1}} e^{j\Phi_{D2}} - e^{j\Phi_{D0}} e^{j2\Phi_{D2}} + e^{j\Phi_{D2}} e^{j2\Phi_{D0}} + e^{j\Phi_{D0}} e^{j2\Phi_{D1}} - e^{j\Phi_{D1}} e^{j2\Phi_{D0}}$$

$$= \text{function of } \Phi_{D0}, \Phi_{D1} \text{ and } \Phi_{D2}$$

and solving for $\overline{M}_0 = M_0 * \Delta_0$ $$\overline{M}_0 = \begin{vmatrix} V_{00} & 1 & 1 \\ V_{01}e^{j\Phi_{D1}}e^{j\Phi_{D2}} \\ V_{02}e^{j2\Phi_{D1}}Ve^{j2\Phi_{D2}} & e^{j2\Phi_{D1}}e^{j2\Phi_{D2}} & e^{j2\Phi_{D1}}e^{j2\Phi_{D2}} \end{vmatrix} = V_{00}\begin{vmatrix} e^{j\Phi_{D1}}e^{j\Phi_{D2}} \\ e^{j2\Phi_{D1}}e^{j2\Phi_{D2}} \end{vmatrix} - V_{01}\begin{vmatrix} 1 & 1 \\ e^{j2\Phi_{D1}}e^{j2\Phi_{D2}} \end{vmatrix} + V_{02}\begin{vmatrix} 1 & 1 \\ e^{j\Phi_{D1}}e^{j\Phi_{D2}} \end{vmatrix}$$

$$\overline{M}_0 = V_{00}(e^{j\Phi_{D1}}e^{j2\Phi_{D2}} - e^{j\Phi_{D2}}e^{j2\Phi_{D1}}) - V_{01}(e^{j2\Phi_{D2}} - e^{j2\Phi_{D1}}) + V_{02}(e^{j\Phi_{D2}} - e^{j\Phi_{D1}})$$

$$= \text{function of } \Phi_{D1} \text{ and } \Phi_{D2}$$

(6)

and solving for $\overline{M}_1 = M_1 * \Delta_0$ $$\overline{M}_1 = \begin{vmatrix} 1 & V_{00} & 1 \\ e^{j\Phi_{D0}}V_{01}e^{j\Phi_{D2}} \\ e^{j2\Phi_{D0}}V_{02}e^{j2\Phi_{D2}} & e^{j2\Phi_{D0}}e^{j2\Phi_{D2}} & e^{j2\Phi_{D0}}e^{j2\Phi_{D2}} \end{vmatrix} = V_{00}\begin{vmatrix} e^{j\Phi_{D0}}e^{j\Phi_{D2}} \\ e^{j2\Phi_{D0}}e^{j2\Phi_{D2}} \end{vmatrix} - V_{01}\begin{vmatrix} 1 & 1 \\ e^{j2\Phi_{D0}}e^{j2\Phi_{D2}} \end{vmatrix} + V_{02}\begin{vmatrix} 1 & 1 \\ e^{j\Phi_{D0}}e^{j\Phi_{D2}} \end{vmatrix}$$

$$\overline{M}_1 = V_{00}(e^{j\Phi_{D0}}e^{j2\Phi_{D2}} - e^{j\Phi_{D0}}e^{j2\Phi_{D2}}) - V_{01}(e^{j2\Phi_{D2}} - e^{j2\Phi_{D0}}) + V_{02}(e^{j\Phi_{D2}} - e^{j\Phi_{D0}})$$

$$= \text{function of } \Phi_{D0} \text{ and } \Phi_{D2}$$

(7)

and solving for $\overline{M}_2 = M_2 * \Delta_0$ $$\overline{M}_2 = \begin{vmatrix} 1 & 1 & V_{00} \\ e^{j\Phi_{D0}}e^{j\Phi_{D2}}V_{01} \\ e^{j2\Phi_{D0}}e^{j2\Phi_{D1}}V_{02}e^{j2\Phi_{D0}} & e^{j2\Phi_{D1}}e^{j2\Phi_{D1}} & e^{j2\Phi_{D0}}e^{j2\Phi_{D1}} \end{vmatrix} = V_{00}e^{j\Phi_{D0}}e^{j\Phi_{D1}} - V_{01}\begin{vmatrix} 1 & 1 \\ \end{vmatrix} + V_{02}\begin{vmatrix} 1 & 1 \\ \end{vmatrix}$$

$$\overline{M}_2 = V_{00}(e^{j\Phi_{D0}}e^{j2\Phi_{D1}} - e^{j\Phi_{D1}}e^{j2\Phi_{D0}}) - V_{01}(e^{j2\Phi_{D1}} - e^{j2\Phi_{D0}}) + V_{02}(e^{j\Phi_{D1}} - e^{j\Phi_{D0}})$$

$$= \text{function of } \Phi_{D0} \text{ and } \Phi_{D1}$$

(8)

Solving for $\Phi_{D0}$, $\Phi_{D1}$ and $\Phi_{D2}$ and substituting these values in equations (1), (2) and (3) we determine $M_0$, $M_1$ and $M_2$.

Taking equations (2), (3) and (4) and treating $M_0 e^{jD\Phi_0}$, $M_1 e^{jD\Phi_1}$ and $M_2 e^{jD\Phi_2}$ as the variables and solving the determinant equation for $\Delta_0$ is the same and performing the same operations as with the first set of equations we have the following:

$(\overline{6}) M_0 e^{j\Phi_{D0}} = \text{function of}(\Phi_{D1}, \Phi_{D2})$ $(\overline{7}) M_1 e^{j\Phi_{D1}} = \text{function of}(\Phi_{D0}, \Phi_{D2})$ $(\overline{8}) M_2 e^{j\Phi_{D2}} = \text{function of}(\Phi_{D0}, \Phi_{D1})$ Equation $(\overline{6})/(6)$, $(\overline{7})/(7)$ and $(\overline{8})/(8)$ $(\overline{6})/(6) = e^{j\Phi_{D0}} = \text{function}(\Phi_{D1}, \Phi_{D2})$ $(\overline{7})/(7) = e^{j\Phi_{D1}} = \text{function}(\Phi_{D0}, \Phi_{D2})$ $(\overline{8})/(8) = e^{j\Phi_{D2}} = \text{function}(\Phi_{D0}, \Phi_{D1})$ Solving for $\Phi_{D0}$, $\Phi_{D1}$ and $\Phi_{D2}$ and substituting these values in equations (2), (3) and (4) we determine $M_0 e^{jD\Phi_0}$, $M_1 e^{jD\Phi_1}$ and $M_2 e^{jD\Phi_2}$.

$V''_{00} = M_0 X_{02} + M_1 X_{12} + M_2 X_{22}$     Channel 2 Pulse data 1-$M$ Delay 0    (1')

$V''_{01} = M_0 X_{02} e^{j\Phi'D0} + M_1 X_{12} e^{j\Phi'D1} + M_2 X_{22} e^{j\Phi'D2}$     Channel 2 Pulse data 2-$M+1$ Delay 1    (2')

$V''_{02} = M_0 X_{02} e^{j2\Phi'D0} + M_1 X_{12} e^{j2\Phi'D1} + M_2 X_{22} e^{j2\Phi'D2}$     Channel 2 Pulse data 3-$M+2$ Delay 2    (3')

$V''_{03} = M_0 X_{02} e^{j3\Phi'D0} + M_1 X_{12} e^{j3\Phi'D1} + M_2 X_{21} e^{j3\Phi'D2}$     Channel 2 Pulse data 4-$M+3$ Delay 3    (4')

$X_{01} = e^{jD\Phi_0} e^{jK_{D0}X_0} / W_{M0} = |1/A_{M0}| e^{j(K_{D0}X_0 \Psi_{M0})}$ where $D = 0$   $X_{01} = e^{jK_{D0}X_0} / W_{M0} = |1/A_{M0}| e^{j(K_{D0}X_0 \Psi_{M0})}$ $X_{11} = e^{jD\Phi_1} e^{jK_{D0}X_1} / W_{M1} = |1/A_{M1}| e^{j(K_{D0}X_1 \Psi_{M1})}$ where $D = 0$   $X_{11} = e^{jK_{D0}X_1} / W_{M1} = |1/A_{M0}| e^{j(K_{D0}X_1 \Psi_{M1})}$ $X_{21} = e^{jD\Phi_2} e^{jK_{D0}X_2} / W_{M2} = |1/A_{M2}| e^{j(K_{D0}X_2 \Psi_{M2})}$ where $D = 0$   $X_{21} = e^{jK_{D0}X_2} / W_{M2} = |1/A_{M0}| e^{j(K_{D0}X_2 \Psi_{M2})}$ Performing the same operations on equations (1'), (2') and (3') with the variables $M_0 X_{01}$, $M_1 X_{11}$ and $M_2 X_{21}$ and $\Delta_0$ remains the same. The analysis is analogous and the result is the following:

and solving for $\overline{M_0 X_{01}} = M_0 X_{01} * \Delta_0$ $$\overline{M_0X_{01}} = V_{01}(e^{j\Phi'D1}e^{j2\Phi'D2} - e^{j2\Phi'D1}e^{j2\Phi'D2}) - V_{02}(e^{j2\Phi'D1} - e^{j2\Phi'D2}) + V_{03}(e^{j\Phi'D1} - e^{j\Phi'D2}) = \text{function of } \Phi'_{D1} \text{ and } \Phi'_{D2} \quad (6')$$

and solving for $\overline{M_1X_{11}} = M_1X_{11}*\Delta_0$

= function of $\Phi'_{D0}$ and $\Phi'_{D2}$ (7')

and solving for $\overline{M_2X_{21}} = M_2X_{21}*\Delta_0$

= function of $\Phi'_{D0}$ and $\Phi'_{D1}$ (8')

Taking equation (6')/(6) we have the following:

$X_{01} = M_0X_{01}/M_0$

Taking equation (7')/(7) we have the following:

$X_{11} = M_1X_{11}/M_1$

Taking equation (8')/(8) we have the following:

$X_{21} = M_2X_{21}/M_2$ $$\frac{V_{02}(e^{j\Phi''D0}e^{j2\Phi'D1} - e^{j2\Phi''D0}e^{j\Phi''D1}) - V_{03}(e^{j2'\Phi''D1} - e^{j2\Phi''D0}) + V_{04}(e^{j\Phi''D1} - e^{j\Phi''D0})}{V_{01}(e^{j\Phi'D0}e^{j2\Phi'D1} - e^{j2\Phi'D0}e^{j\Phi'D1}) - V_{02}(e^{j2'\Phi'D1} - e^{j2\Phi'D0}) + V_{03}(e^{j\Phi'D1} - e^{j\Phi'D0})}$$

Performing the same operations on equations (2'), (3') and (4') with the variables $M_0X_{01}$, $M_1X_{11}$ and $M_2X_{21}$ and $\Delta_0$ remains the same. The analysis is analogous and the result is the following:

$(\overline{6'})M_0e^{j\Phi_{D0}} = \text{function of}(\Phi_{D1}, \Phi_{D2})$ $(\overline{7'})M_1e^{j\Phi_{D1}} = \text{function of}(\Phi_{D0}, \Phi_{D2})$ $(\overline{8'})M_2e^{j\Phi_{D2}} = \text{function of}(\Phi_{D0}, \Phi_{D1})$ Equation $(\overline{6'})/(6')$, $(\overline{7'})/(7')$ and $(\overline{8'})/(8')$ $(\overline{6'})/(6') = e^{j\Phi_{D0}} = \text{function}(\Phi_{D1}, \Phi_{D2})$ $(\overline{7'})/(7') = e^{j\Phi_{D1}} = \text{function}(\Phi_{D0}, \Phi_{D2})$ $(\overline{8'})/(8') = e^{j\Phi_{D2}} = \text{function}(\Phi_{D0}, \Phi_{D1})$ Solving for $\Phi_{D0}$, $\Phi_{D1}$ and $\Phi_{D2}$ and substituting these values in equations (2), (3) and (4) we determine $M_0X_{01}$, $M_1X_{02}$ and $M_2X_{03}$.

Taking the next set of equations as follows:

| | | |
|---|---|---|
| $V''_{00} = M_0X_{02} + M_1X_{12} + M_2X_{22}$ | Channel 2 Pulse data $2\text{-}M+1$ Delay 1 | (1″) |
| $V''_{01} = M_0X_{02}e^{j\Phi''D0} + M_1X_{12}e^{j\Phi''D1} + M_2X_{22}e^{j\Phi''D2}$ | Channel 2 Pulse data $3\text{-}M+2$ Delay 2 | (2″) |
| $V''_{02} = M_0X_{02}e^{j2\Phi''D0} + M_1X_{12}e^{j2\Phi''D1} + M_2X_{22}e^{j2\Phi''D2}$ | Channel 2 Pulse data $4\text{-}M+3$ Delay 3 | (3″) |
| $V''_{03} = M_0X_{02}e^{j3\Phi''D0} + M_1X_{12}e^{j3\Phi''D1} + M_2X_{21}e^{j3\Phi''D2}$ | Channel 2 Pulse data $5\text{-}M+4$ Delay 4 | (4″) |

$X_{02} = X_{01}e^{j(\Phi_0 + \Delta K_{D0}X_0)} = X_{01}e^{j(\theta_0)}$ : $X_{12} = X_{11}e^{j(\Phi_1 + \Delta K_{D0}X_0)} = X_{11}e^{j(\theta_1)}$ : $X_{22} = X_{21}e^{j(\Phi_2 + K_{D0}X_0)} = X_{21}e^{j(\theta_2)}$ Rewriting equations (1″ to 4″) we have the following:

| | | |
|---|---|---|
| $V''_{00} = M_0X_{01}e^{j\theta_0} + M_1X_{11}e^{j\theta_1} + M_2X_{12}e^{j\theta_2}$ | Channel 2 Pulse data $2\text{-}M+1$ Delay 1 | (1″) |
| $V''_{01} = M_0X_{01}e^{j\theta_0}e^{j\Phi''D0} + M_1X_{11}e^{j\theta_1}e^{j\Phi''D1} + M_2X_{12}e^{j\theta_2}e^{j\Phi''D2}$ | Channel 2 Pulse data $3\text{-}M+2$ Delay 2 | (2″) |
| $V''_{02} = M_0X_{01}e^{j\theta_0}e^{j2\Phi''D0} + M_1X_{11}e^{j\theta_1}e^{j2\Phi''D1} + M_2X_{12}e^{j\theta_2}e^{j2\Phi''D2}$ | Channel 2 Pulse data $4\text{-}M+3$ Delay 3 | (3″) |
| $V''_{03} = M_0X_{01}e^{j\theta_0}e^{j3\Phi''D0} + M_1X_{11}e^{j\theta_1}e^{j3\Phi''D1} + M_2X_{11}e^{j\theta_2}e^{j3\Phi''D2}$ | Channel 2 Pulse data $5\text{-}M+4$ Delay 4 | (4″) |

Performing the same operations on equations (1″), (2″) and (3″) with the variables $M_0X_{01}e^{j\theta_0}$, $M_1X_{11}e^{j\theta_1}$ and $M_2X_{21}e^{j\theta_2}$ and $\Delta_0$ remains the same. The analysis is analogous and the result is the following:

and solving for $\overline{M_0X_{01}}e^{j\theta_0} = M_0X_{01}e^{j\theta_0}*\Delta_0$ $$\frac{\overline{M_0X_{01}}}{e^{j\theta_0}} = V''_{02}(e^{j\Phi'D1}e^{j2\Phi'D2} - e^{j2\Phi'D1}e^{j\Phi'D2}) - V''_{03}(e^{j2\Phi'D1} - e^{j2\Phi'D2}) + V''_{04}(e^{j\Phi'D1} - e^{j\Phi'D2})$$

= function of $\Phi''_{D1}$ and $\Phi''_{D2}$ and solving for $\overline{M_1X_{11}}e^{j\theta_1} = M_1X_{11}e^{j\theta_1}*\Delta_0$ $$\frac{\overline{M_1X_{11}}}{e^{j\theta_1}} = V_{02}(e^{j\Phi''D0}e^{j2\Phi''D2} - e^{j2\Phi''D0}e^{j\Phi''D2}) - V_{03}(e^{j2'\Phi''D0} - e^{j2\Phi''D2}) + V_{04}(e^{j\Phi''D0} - e^{j\Phi''D2})$$

= function of $\Phi'_{D0}$ and $\Phi'_{D2}$ and solving for $\overline{M_2X_{21}}e^{j\theta_2} = M_2X_{21}e^{j\theta_2}*\Delta_0$ $$\frac{\overline{M_2X_{21}}}{e^{j\theta_2}} = V_{02}(e^{j\Phi''D0}e^{j2\Phi''D1} - e^{j2\Phi''D0}e^{j\Phi''D1}) - V_{03}(e^{j2'\Phi''D1} - e^{j2\Phi''D0}) + V_{04}(e^{j\Phi''D1} - e^{j\Phi''D0})$$

= function of $\Phi''_{D0}$ and $\Phi''_{D1}$

Taking equation (6″)/(6') we have the following:

$e^{j\theta_0} = M_0X_{01}e^{j\theta_0}/M_0X_{01} =$ $$\frac{V''_{02}(e^{j\Phi'D1}e^{j2\Phi'D2} - e^{j2\Phi'D1}e^{j\Phi'D2}) - V''_{03}(e^{j2'\Phi'D1} - e^{j2\Phi'D2}) + V''_{04}(e^{j\Phi'D1} - e^{j\Phi'D2})}{V_{01}(e^{j\Phi'D1}e^{j2\Phi'D2} - e^{j2\Phi'D1}e^{j\Phi'D2}) - V_{02}(e^{j2'\Phi'D1} - e^{j2\Phi'D2}) + V_{03}(e^{j\Phi'D1} - e^{j\Phi'D2})} \quad (12)$$

Taking equation (7″)/(7') we have the following:

$e^{j\theta_1} = M_1X_{11}e^{j\theta_1}/M_1X_{11} =$ $$\frac{V_{02}(e^{j\Phi''D0}e^{j2\Phi''D2} - e^{j2\Phi''D0}e^{j\Phi''D2}) - V_{03}(e^{j2'\Phi''D0} - e^{j2\Phi''D2}) + V_{04}(e^{j\Phi''D0} - e^{j\Phi''D2})}{V_{01}(e^{j\Phi'D0}e^{j2\Phi'D2} - e^{j2\Phi'D0}e^{\Phi'D2}) - V_{02}(e^{j2'\Phi'D0} - e^{j2\Phi'D2}) + V_{03}(e^{j\Phi'D0} - e^{j\Phi'D2})} \quad (13)$$

Taking equation (8")/(8') we have the following:

$$e^{j\theta_2} = M_2 X_{21} e^{j\theta_2} / M_2 X_{21}$$

$$= V_{02}(e^{j\Phi''D0} e^{j2\Phi''D1} - e^{j2\Phi''D0} e^{j\Phi''D1}) - V_{03}(e^{j2'\Phi''D1} - e^{j2\Phi''D0}) + V_{04}(e^{j\Phi''D1} - e^{j\Phi''D0}) /$$

$$V_{01}(e^{j\Phi D0} e^{j2\Phi D1} - e^{j\Phi D1} e^{j2\Phi D0}) - V_{02}(e^{j2\Phi D1} - e^{j2\Phi D0}) + V_{03}(e^{j\Phi D1} - e^{j\Phi D0})$$

Performing the same operations on equations (2"), (3") and (4") with the variables $M_0 X_{01} e^{j\theta_0}$, $M_1 X_{11} e^{j\theta_1}$ and $M_2 X_{21} e^{j\theta_2}$ and $\Delta_0$ remains the same Substituting equation (13) into equation (12) we have the following:

The analysis is analogous and the result is the following:

$$(\overline{6}'') M_0 e^{j\Phi D0} = \text{function of}(\Phi_{D1}, \Phi_{D2})$$

$$(\overline{7}'') M_1 e^{j\Phi D1} = \text{function of}(\Phi_{D0}, \Phi_{D2})$$

$$(\overline{8}'') M_2 e^{j\Phi D2} = \text{function of}(\Phi_{D0}, \Phi_{D1})$$

Equation $(\overline{6}'')/(6'')$, $(\overline{7}'')/(7'')$ and $(\overline{8}'')/(8'')$ $$(\overline{6}'')/(6'') = e^{j\Phi D0} = \text{function}(\Phi_{D1}, \Phi_{D2})$$

$$(\overline{7}'')/(7'') = e^{j\Phi D1} = \text{function}(\Phi_{D0}, \Phi_{D2})$$

$$(\overline{8}'')/(8'') = e^{j\Phi D2} = \text{function}(\Phi_{D0}, \Phi_{D1})$$

Solving for $\Phi_{D0}$, $\Phi_{D1}$ and $\Phi_{D2}$ and substituting these values in equations (2), (3) and (4) we determine $M_0 X_{00} e^{j\theta_0}$, $M1 X_{01} e^{j\theta_1}$ and $M_2 X_{02} e^{j\theta_2}$ $$e^{j\theta_0} = M_0 X_{00} e^{j\theta_0} / M_0 X_{00} = \text{function of } \Phi_{D1} \text{ and } \Phi_{D2}$$

$$e^{j\theta_1} = M_1 X_{01} e^{j\theta_1} / M_1 X_{01} = \text{function of } \Phi_{D0} \text{ and } \Phi_{D2}$$

$$e^{j\theta_2} = M_2 X_{02} e^{j\theta_2} / M_2 X_{02} = \text{function of } \Phi_{D0} \text{ and } \Phi_{D1}$$

From the determination of $M_0 X_{01}$, $M_1 X_{11}$ and $M_2 X_{21}$ and $M_0 X_{00} e^{j\theta_0}$, $M_1 X_{01} e^{j\theta_1}$ and $M_2 X_{02} e^{j\theta_2}$ we have determined $\theta_1$, $\theta_2$ and $\theta_3$ And $\theta_0 = \Phi_0 + \Delta K_{D0} X_0$: $\theta_1 = \Phi_1 + \Delta K_{D0} X_1$: $\theta_2 = \Phi_2 + \Delta K_{D0} X_2$ where everything is known except $\Phi_0$, $\Phi_1$ and $\Phi_2$ and $X_O$, $X_1$ and $X_2$ are determined as in two return case and having determined $\Phi_{D0}$ and $\Phi_{D1}$ and $\Phi_{D2}$ since $\Phi_{A0} = \Phi_{D0} - \Phi_0$: $\Phi_{A1} = \Phi_{D1} - \Phi_1$: $\Phi_{A2} = \Phi_{D2} - \Phi_2$ the azimuth of the returns have been attained.

$\Phi_{D0}$ and $\Phi_{D1}$ and $\Phi_{D2}$ in the three sets of matrix data of three returns as follows Substituting in equation $\Phi_{D1}$ as a function of $\Phi_{D0}$ and $\Phi_{D2}$ we have the following:

$\Phi_{D0}$ as a function of $\Phi_{D2}$

Substituting in equation $\Phi_{D1}$ as a function of $\Phi_{D0}$ and $\Phi_{D2}$ we have the following:

$\Phi_{D0}$ as a function of $\Phi_{D2}$

Substituting equation $\Phi_{D2}$ as a function of $\Phi_{D0}$ and $\Phi_{D1}$ we have the following:

$\Phi_{D1}$ as a function of $\Phi_{D0}$

Similarly substituting $\Phi_{D1}$ as a function of $\Phi_{D2}$ we have the following:

$\Phi_{D1}$ as a function of $\Phi_{D0}$

Similarly substituting $\Phi_{D1}$ as a function of $\Phi_{D0}$ we have the following:

Similarly substituting $\Phi_{D1}$ as a function of $\Phi_{D0}$ we have the following:

$\Phi_{D1}$ as a function of $\Phi_{D2}$ we have the following:

$\Phi_{D1}$ as a function of $\Phi_{D2}$ we have two equations two unknowns and solvable in $\Phi_{D0}$ and $\Phi_{D2}$ and similarly for $\Phi_{D1}$ and $\Phi_{D2}$ and $\Phi_{D0}$ and $\Phi_{D1}$ and $\Phi_{D1}$, $\Phi_{D2}$ and $\Phi_{D3}$ Thus we have solved for $\theta_1$, $\theta_2$ and $\theta_3$ twice.

B1 Assist in Processing Three or More Returns Per Detected Bin

We can perform these operations for the three sets of data for the three returns and the solutions should be the same or close to the same.

The methodology in simplifying and more robust solutions when there are three or returns is the following:

1. Determine from processing adjacent bins for the detection of other returns that would also be detected in the processed bin such as clutter then we have one or more known solutions.
2. Employing the candidate solution technique, that is substituting all possible solutions which are very limited in number (detected only in the beamwidth of the antenna).
3. If radar returns are received from more than one range Doppler bin then we know that there is an object associated with the radar returns located in the overlap from the adjacent range Doppler bins (i.e., narrowing the possible location of the object). Thus, multiple objects in a single bin are easier to locate when overlap from other range Doppler bins is also considered.
4. The solution entails $\Phi_{D1}$, $\Phi_{D2}$, $\Phi_{D3}$, etc where the amplitudes are equal. From the second set of data a small frequency change from the first set of data this gives the same $\Phi_{D1}$, $\Phi_{D2}$ and $\Phi_{D3}$ for the solution but different $M_0$, $M_1$ and $M_2$. The ratios of the $M'_0/M_0$, $M'_1/M_1$ and $M'_2/M_2$ should give a good estimate of where the position $\Phi_{D0}$ and $\Phi_{D1}$ and $\Phi_{D2}$ are detected at their peak in that RDB and a check on the solutions determined. From this the azimuth of the returns are determined. From the ratio of the second set of data to the first set of data we obtain XF0 and XF1 and XF2 from which is the ratio of $M'_0/M_0 = X_{F0}$ and $M'_1/M_1 = X_{F1}$ and $M'_2/M_2 = X_{F2}$ where all other terms are known. From the previous determinations of the estimate $\Phi_{D0}$ and $\Phi_{D1}$ and $\Phi_{D2}$ which is the position in the filter where the returns are detected at there peak in the RDB. This gives a good estimate of the azimuth of the returns. To get more accurate determinations other close frequency points to initially processed data are processed.

From XF0 an estimate of where the returns are detected at there peak in the RDB. From the following equation $\Phi_{0A} = \Phi_{D0} - \Phi_0$ where $\Phi_{0A}$ is the phase of the return proportional to the azimuth of the return, and $\Phi_{D1}$, $\Phi_{D2}$ and $\Phi_{D3}$ is the phase of the return proportional to the peak of the return where, $\Phi_0$ is the phase of the return proportional to the velocity of the return.

Similarly this is performed for XF1 and XF2 hence finding the azimuth of the second and third return.

Analogously a small change in range bin may be taken and we determine XR0, XR1 and XR2 which determines where the peak of the returns in range, this does not help in the evaluation in azimuth. If and evaluation in resolving velocity ambiguity with the taking of meaning delay in time and processing again. Thus we can determine the peak of each return in range and azimuth to obtain the maximum amplitude for each return for further use.

A more accurate determination of $\Phi_{D0}$, $\Phi_{D1}$ and $\Phi_{D2}$ is determined by taking the four sets of equations and employing the candidate $\Phi$ technique substituting all possible solutions which are restricted to the values that can be in only one range doppler bin (RDB) but for when greater accuracy is required the number of candidate solutions increase. The candidate solutions should be very close in value for all four sets of data giving very robust and accurate solutions which determines all the parameters of the returns.

Also another correlating and checking operation is to repeat the processing with a close frequency and the results should be very close plus obtaining and obtaining change in return vector (XF). This would be the same for all sets of four sets of data and also would be a check on the $\Phi_{D0}$, $\Phi_{D1}$ and $\Phi_{D2}$ solutions. This is illustrated in FIG. 12.

Analogously this would process a close sample in the range direction and also for processing other linear arrays. Attaining the precise range, azimuth, height, unambiguous radial velocity and vertical and tangential velocity is performed the same as in other single channel many pulse systems. RECAPPING—We have determined all $\Phi_s$, in the two return and three return case and as consequently it may be performed for more than three $\Phi_s$. The significance of this development is as each RDB that is processed clutter, target, noise, and other returns may be detected and thresholded for importance and later post processed to determine if clutter, movers, sidelobes, multipath targets, and others.

Correlation Factors

1—Time delay as many pulses at a time as the number of returns and process data determine all the $\Phi_s$.

2—Additional time delay processed again and all $\Phi_s$ should agree

3—Other RDB processed that have the same return data related to each such as mover should agree 4—IF more than two channels other dual channels is processed and results should agree.

5—Other techniques that are related as to be shown later in document and results should agree 6—If a planar array is implemented all other linear arrays should obtain the same results and height and vertical tangential velocity obtained.

The aforementioned system has many advantages such as the following:

1—No clutter cancellation of any kind is required therefore as follows:
   a) no clutter covariance matrix;
   b) no training data; and
   c) no special clutter knowledge required.

2—No channel matching required

3—Returns and clutter do not compete with each other in there detection and therefore clutter and returns are thresholded separately and returns are ideally are competing with white noise only and make for an excellent return ratio to noise.

4—Very simple system-less storage-less processing-less hardware and less dwell time and very accurate.

5—Full transmit and receive antenna employed with full antenna gains
   a) smaller antenna sidelobes;
   b) full antenna gain; and
   c) narrow clutter band width 6—May be applied to two arrays and two arrays or three arrays. Each dual array processed as two channel system and should have same results and correlated.

7—Correlation factors as stated in previous paragraph.

8—The significance of the ability to process many returns in same RDB and determining there amplitude and phases and radial velocity gives the ability to separate clutter and either returns such as bona fide targets, moving clutter, multi path returns, etc. Knowledge aided information would aid in categorizing these returns.

IIII. Two Channel "M" Pulses —Two Return Analyses— DPCA Type Operation

The following analysis may be applied for a one transmit with the two or more receive antennae (channels) utilizing DPCA techniques to find the range, radial velocity and azimuth. This set of equations is for a two channel $\Delta T$ system.

A—This development is for two (2) returns with DPCA operation.

| | | |
|---|---|---|
| $V_{00} = M_0 + M_1$ | Channel 1 Pulse data 1-$M$ Delay 0 | (1) |
| $V_{01} = M_0 X_{01} + M_1 X_{11}$ | Channel 2 Pulse data 1-$M$ Delay 0 | (2) |
| $V_{02} = M_0 X_{02} e^{j\Phi_0} + M_1 X_{11} e^{j\Phi_1}$ | Channel 2 Pulse data 2-$M$ + 1 Delay 1 | (3) |
| $V_{03} = M_0 X_{03} e^{j2\Phi_0} + M_1 X_{11} e^{j2\Phi_1}$ | Channel 2 Pulse data 3-$M$ + 2 Delay 2 | (4) |
| $X_{01} = e^{jD\Phi_0}/W_{M0}$ where $D = 0: X_{01} = e^{j(K_{D0} X_0)}/W_{M0}$ | | (5) |
| $X_{11} = e^{jD\Phi_1}/W_{M1}$ where $D = 0: X_{11} = e^{j(K_{D0} X_1)}/W_{M1}$ | | (6) |
| $X_{02} = e^{jD\Phi_0 + \Delta K_{D0} X_0}/W_{M0}$ where $D = 1: X_{01} e^{j(\Phi_0 + \Delta K_{D0} X_0)}$ | | (7) |
| $X_{12} = e^{jD\Phi_1 + \Delta K_{D0} X_1}/W_{M1}$ where $D = 1: X_{11} e^{j(\Phi_0 + \Delta K_{D0} X_1)}$ | | (8) |
| $X_{03} = e^{jD(\Phi_0 + \Delta K_{D0} X_0)}/W_{M0}$ where $D = 2: X_{01} e^{j2(\Phi_0 + K_{D0} X_0)}$ | | (9) |
| $X_{13} = e^{jD(\Phi_1 + K_{D0} X_1)}/W_{M1}$ where $D = 2: X_{11} e^{j2(\Phi_0 + K_{D0} X_1)}$ | | (10) |

Rewriting equations (1) to (4) incorporating development above we have the following:

$$V_{00} = M_0 + M_1 \quad \text{Channel 1 Pulse data 1-}M \text{ Delay 0} \quad (1)$$

$$V_{01} = M_0 X_{01} + M_1 X_{11} \quad \text{Channel 2 Pulse data 1-}M \text{ Delay 0} \quad (2)$$

$$V_{02} = M_0 X_{02} e^{j\Phi_0} + M_1 X_{11} e^{j\Phi_1} \quad \text{Channel 2 Pulse data 2-}M+1 \text{ Delay 1} \quad (3)$$

$$V_{03} = M_0 X_{03} e^{j2\Phi_0} + M_1 X_{11} e^{j2\Phi_1} \quad \text{Channel 2 Pulse data 3-}M+2 \text{ Delay 2} \quad (4)$$

where $\theta_0 = \Delta K_{D0} X_0$ and $\theta_1 = \Delta K_{D0} X_1$

All terms previously defined except $X_{O1}$ and $X_{11}$ where $X_{O1}$ and $X_{O2}$ is the DPCA factor plus that which makes the channel 1 and channel 2 equal and where $A_{MO}$ is the amplitude matching antenna factor and $\Psi_{M0}$ is are the phase matching factor and $K_{D0} X_0$ is the factor of the detection is from the center of filter. AMO and $\Psi_{M0}$ represents the imperfect matching between channel 1 and 2. $K_{D0} X_0$ is the factor that corrects if the return is not detected in the center of the filter. $K_{D0}$ is the DPCA constant that corrects off for mismatch from center of filter. $X_0$ is the distance the return is detected from the center of filter. $X_1$ and analogously the same as for $W_{M1}$. $A_{M1}$ is the amplitude factor and $\Psi_{M1}$ and $K_{D0} X_1$ are the phase factor. $A_{M1}$ and $W_{M1}$ represent the imperfect matching between channel and 2. $K_{D0} X_1$ is the factor that corrects if the return is not detected in the center of the filter. $K_{D0}$ is the DPCA constant that corrects off center of filter. X1 is the distance the return is detected from the center of filter.

Equation (1) is the first channel and equation (2) is the second channel delayed no time delay.

Equation (3) is second channel delayed one times.

Taking equations (2) and (3) and treating $M_0 X_{01}$ and $M_1 X_{11}$ as the variables and vying for $M_0 X_{01}$ and $M_1 X_{11}$ we have:

Taking equations (3) and (4) and treating $M_0 X_0 e^{j\theta_0}$ and $M_1 X_1 e^{j\theta_1}$ as the variables and solving for $M_0 X_0 e^{j\theta_0}$ and $M_1 X_1 e^{j\theta_1}$ we have:

$$M_0 X_0 e^{j\theta_0} = (V_{02} e^{j\theta_1} - V_{03})/(e^{j\theta_1} - e^{j\theta_0}) \quad (2''')$$

$$M_1 X_1 e^{j\theta_1} = (V_{02} - V_{03} e^{j\theta_0})/(e^{j\theta_1} - e^{j\theta_0}) \quad (3''')$$

Equation (2''')/Equation (2'') and equation (3''')/equation (3'') is the following:

$$e^{j\theta_0} = (V_{02} e^{j\theta_1} - V_{03})/(V_{01} e^{j\theta_1} - V_{02}) \quad (4)$$

$$e^{j\theta_1} = (V_{02} - V_{03} e^{j\theta_0})/(V_{01} - V_{02} e^{j\theta_0}) \quad (5)$$

Equation (4) or Equation (5) is easily solved for $\theta_0$ and $\theta_1$ which are solved for $\Phi_0$ and $\Phi_1$ proportional to the radial velocity of return 0 and return 1 respectively. If return "Mo" is clutter then $\Phi_0=0$ corresponding to clutter having zero (0) velocity.

Now employing equations (2) and (3) and solving for MoXo and M1X1 knowing $\Phi_0$ and $\Phi_1$ we are now to find $\Phi_{D0}$ and $\Phi_{D1}$ (defined previously) which are proportional to return 0 and return 1 respectively where they are detected in there filter.

We have determined $\Phi_0$ and $\Phi_1$ and MoXo and M1X1 and both returns are detected in the same RDB but the location in that RDB is not known.

If the location is taken at the center of the filter the error in determination of azimuth is plus or minus a half a RDB. If a more accurate determination is desired a point of frequency close to first filter is created and processed like that of first filter.

This gives the same $\Phi_0$ and $\Phi_1$ and different $M_0$ and $M_1$ and the ratio of the $M_0$ and $M_1$ should give a good estimate of where the position $\Phi_{D0}$ and $\Phi_{D1}$ is detected at in the RDB. From this an estimate of azimuth of both returns determined. To get a more accurate determination another frequency may be processed or a slight change in the range processed and results correlated for best results.

From a second set of data a small known change in frequency from the first set of data. We assume there will be no change in the channel balancing terms $A_{M0}$, $\Psi_{M0}$ which are the amplitude and phase term but a known DPCA term $\Delta K_{D0} X_0$ where $X_0$ is unknown position of new filter and $\Delta K_{D0}$ DPCA known constant therefore the term is unknown and performing a small change in frequency as done previously second set of data, the solutions is then determined for $\Phi_1$ and $\Phi_0$ and the changes are in $X_{01}$ to $X_{02} e^{j\Delta X * \Delta K_{D0}}$ where the phase term is known and represents the known change in frequency and known position change in peak of filter. The same is for the second return $X_{11}$ to $X_{12} e^{j\Delta K_{D0} X_1}$ and analogous definitions of terms. The returns change due to frequency change from $M_0$ to $M'_0$ where $X_{F0}=M'_0/M_0$ and $M_1$ to $M'_1$ where $X_{F1}=M'_1/M_1$ and solving for $M_0 X_0$ and $M_0 X_0 e^{j(K_{D1} X_0)}$ in the first and second set of data and dividing the terms we get $X_{F0} e^{j(K_{D1} X_0)} = M'_0/M_0 e^{j(K_{D1} X_0)}$. Therefore we have determined the ratio of the returns from which we estimate the position of the peak where is the first return and from that calculate the azimuth of the return. We can analogously perform that for the second return.

The aforementioned analysis may be applied to many returns per RDB but as the number of returns increases the difficulty of determining the phases of the returns becomes much more difficult up to four and more returns is cumbersome are complicated. More said about that later in the document.

B—This development is for three (3) returns with DPCA operation.

$$V_{00} = M_0 + M_1 + M_2 \qquad \text{CHANNEL 1-TIME 1} \qquad (1')$$
$$V_{01} = M_0 X_{01} + M_1 X_{11} + M_2 X_{21} \qquad \text{CHANNEL 2-TIME 1} \qquad (2')$$
$$V_{02} = M_0 X_{02} e^{j\Phi_0} + M_{12} X_{12} e^{j\Phi_1} + M_2 X_{12} e^{j\Phi_2} \qquad \text{CHANNEL 2-TIME 2} \qquad (3')$$
$$V_{03} = M_0 X_{03} e^{j2\Phi_0} + M_{13} X_{13} e^{j2\Phi_1} + M_2 X_{23} e^{j2\Phi_2} \qquad \text{CHANNEL 2-TIME 3} \qquad (4')$$
$$V_{04} = M_0 X_{04} e^{j3\Phi_0} + M_{14} X_{14} e^{j3\Phi_1} + M_2 X_{24} e^{j3\Phi_1} \qquad \text{CHANNEL 2-TIME 4} \qquad (5')$$
$$X_{01} = e^{j\Phi_0}/W_{M0} = e^{j\Phi_0}/A_{M0} e^{j(\Psi_{M0} + K_{D0} X_0)} \text{ where } \Phi_0 = 0 \qquad (6')$$
$$X_{11} = e^{j\Phi_1}/W_{M1} = e^{j\Phi_1}/A_{M1} e^{j(\Psi_{M1} + K_{D0} X_1)} \text{ where } \Phi_1 = 0 \qquad (7')$$
$$X_{12} = e^{j\Phi_2}/W_{M2} = e^{j\Phi_2}/A_{M2} e^{j(\Psi_{M2} + K_{D0} X_2)} \text{ where } \Phi_2 = 0 \qquad (8')$$
$$X_{02} = X_{01} e^{j\Phi_0}/W_{M0} = 1/A_{M0} e^{j(\Phi_0 - \Delta K_{D0} X_0 - \Psi_{M0})} \qquad (9')$$
$$X_{12} = e^{j\Phi_1}/W_{M1} = e^{j\Phi_1}/A_{M1} e^{j(\Phi_1 - \Delta K_{D0} X_1 - \Psi_{M1})} \qquad (10')$$
$$X_{22} = e^{j\Phi_2}/W_{M2} = e^{j\Phi_2}/A_{M2} e^{j(\Phi_2 - \Delta K_{D0} X_2 - \Psi_{M2})} \qquad (11')$$
$$X_{03} = X_{01} e^{j\Phi_0}/W_{M0} = 1/A_{M0} e^{j2(\Phi_0 - \Delta K_{D0} X_0) - (\Psi_{M0})} \qquad (12')$$
$$X_{13} = e^{j\Phi_1}/W_{M1} = e^{j\Phi_1}/A_{M1} e^{j2(\Phi_1 - \Delta K_{D0} X_1) - (\Psi_{M1})} \qquad (13')$$
$$X_{23} = e^{j\Phi_2}/W_{M2} = e^{j\Phi_2}/A_{M2} e^{j2(\Phi_2 - \Delta K_{D0} X_2) - (\Psi_{M2})} \qquad (14')$$

Rewriting equations (1) to (5) incorporating development above we have the following:

$$V_{00} = M_0 + M_1 + M_2 \qquad \text{CHANNEL 1-TIME 1} \qquad (1')$$
$$V_{01} = M_0 X_{01} + M_1 X_{11} + M_2 X_{21} \qquad \text{CHANNEL 2-TIME 1} \qquad (2')$$
$$V_{02} = M_0 X_{02} e^{j\Phi_0} + M_{12} X_{12} e^{j\Phi_1} + M_2 X_{12} e^{j\Phi_2} \qquad \text{CHANNEL 2-TIME 2} \qquad (3')$$
$$V_{03} = M_0 X_{03} e^{j2\Phi_0} + M_{13} X_{13} e^{j2\Phi_1} + M_2 X_{23} e^{j2\Phi_2} \qquad \text{CHANNEL 2-TIME 3} \qquad (4')$$
$$V_{04} = M_0 X_{04} e^{j3\Phi_0} + M_{14} X_{14} e^{j3\Phi_1} + M_2 X_{24} e^{j3\Phi_1} \qquad \text{CHANNEL 2-TIME 4} \qquad (5')$$

Taking equations (2') and (3') and (4') and treating $M_0 X_0$ and $M_1 X_1$ and $M_2 X_2$ as the variables and solving the determinant equation for $\Delta_0$ we have:

$$\Delta_0 = \begin{vmatrix} 1 & 1 & 1 \\ e^{j\theta_0} e^{j\theta_1} e^{j\theta_2} \\ e^{j2\theta_0} e^{j2\theta_1} e^{j2\theta_2} \end{vmatrix} = 1 e^{j\theta_1} e^{j\theta_2} - 1 e^{j\theta_0} e^{j\theta_2} + 1 e^{j\theta_0} e^{j\theta_1}$$
$$\qquad e^{j2\theta_0} e^{j2\theta_1} e^{j2\theta_2} \quad e^{j2\theta_1} e^{j2\theta_2} \quad e^{j2\theta_0} e^{j2\theta_2} \quad e^{j2\theta_0} e^{j2\theta_1}$$
$$= e^{j\theta_1} e^{j2\theta_2} - e^{j\theta_2} e^{j2\theta_1} - e^{j\theta_0} e^{j2\theta_2} + e^{j\theta_2} e^{j2\theta_0} + e^{j\theta_0} e^{j2\theta_1} - e^{j\theta_1} e^{j2\theta_0}$$
$$= \text{function of } \theta_0, \theta_1 \text{ and } \theta_2$$

and solving for $\overline{M_0 X_{01}} = M_0 X_{01} * \Delta_0$ $$\overline{M_0 X_{01}} = \begin{vmatrix} V_{01} & 1 & 1 \\ V_{02} e^{j\theta_1} e^{j\theta_2} \\ V_{03} e^{j2\theta_1} e^{j2\theta_2} \end{vmatrix} = V_{01} \begin{vmatrix} e^{j\theta_1} e^{j\theta_2} \\ e^{j2\theta_1} e^{j2\theta_2} \end{vmatrix} - V_{02} \begin{vmatrix} 1 & 1 \\ e^{j2\theta_1} e^{j2\theta_2} \end{vmatrix} + V_{03} \begin{vmatrix} 1 & 1 \\ e^{j\theta_1} e^{j\theta_2} \end{vmatrix}$$

$$M_0 X_{01} = V_{01}(e^{j\theta_1} e^{j2\theta_2} - e^{j\theta_2} e^{j2\theta_1}) - V_{02}(e^{j2\theta_2} - e^{j2\theta_1}) + V_{03}(e^{j\theta_1} - e^{j\theta_2})$$
$$= \text{function of } \theta_1 \text{ and } \theta_2$$

and solving for $$\overline{M_1 X_{11}} = M_1 M_{11} * \Delta_0 = V_{02}(e^{j\theta_0} e^{j2\theta_2} - e^{j\theta_1} e^{j2\theta_0}) - V_{03}(e^{j2\theta_2} - e^{j2\theta_0}) + V_{04}(e^{j\theta_2} - e^{j\theta_0}) \qquad (7)$$
$$= \text{function of } \theta_0 \text{ and } \theta_2$$

and solving for $$\overline{M_2X_{21}} = M_2M_{21}*\Delta_0 = V_{02}(e^{j\theta_0}e^{j2\theta_2} - e^{j\theta_1}e^{j2\theta_0}) - V_{03}(e^{j2\theta_2} - e^{j2\theta_0}) + \quad (8)$$
$$V_{04}(e^{j\theta_2} - e^{j\theta_0})$$
$$= \text{function of } \theta_0 \text{ and } \theta_2$$

$$\overline{M_2X_{21}} = e^{j\theta_0}e^{j\theta_1}V_{02} = V_{01}e^{j\theta_0}e^{j\theta_1} - V_{02}\begin{vmatrix}1 & 1\\ e^{j2\theta_0}e^{j2\theta_1}\end{vmatrix} \frac{V_{01}}{V_{03}} \begin{vmatrix}e^{j\theta_0}e^{j\theta_1} & e^{j2\theta_0}e^{j2\theta_1}\end{vmatrix} + V_{03}\begin{vmatrix}1 & 1\\ e^{j\theta_0}e^{j\theta_1}\end{vmatrix}$$

$$\overline{M_2X_{21}} = V_{01}(e^{j\theta_0}e^{j2\theta_1} - e^{j\theta_1}e^{j2\theta_0}) - V_{02}(e^{j2\theta_1} - e^{j2\theta_0}) + V_{03}(e^{j\theta_1} - e^{j\theta_0})$$
$$= \text{function of } \theta_1 \text{ and } \theta_2$$

Performing the same operations on equations (3), (4) and (5) with the variables $M_0X_{01}e^{j\Theta_0}$, $M_1X_{11}e^{j\Theta_1}$ and $M_2X_{12}e^{j\Theta_0}$ and $\Delta_0$ remains the same. The analysis is analogous and the result will be the following:

and solving for $\overline{M_0X_{01}e^{j\Theta_0}} = M_0X_{01}e^{j\Theta_0}*\Delta_0$ $$\overline{M_0X_{01}e^{j\theta_0}} = V_{02}(e^{j\theta_1}e^{j2\theta_2} - e^{j\theta_2}e^{j2\theta_1}1) - V_{03}(e^{j2\theta_2} - e^{j2\theta_1}) + \quad (9)$$
$$V_{04}(e^{j\theta_2} - e^{j\theta_1})$$
$$= \text{function of } \theta_1 \text{ and } \theta_2$$

and solving for $\overline{M_1X_{11}e^{j\Theta_1}} = M_1X_{11}e^{j\Theta_1}*\Delta_0$ $$\overline{M_1X_{11}e^{j\theta_1}} = V_{02}(e^{j\theta_0}e^{j2\theta_2} - e^{j\theta_2}e^{j2\theta_0}) - V_{03}(e^{j2\theta_2} - e^{j2\theta_0}) + \quad (10)$$
$$V_{04}(e^{j\theta_2} - e^{j\theta_0})$$
$$= \text{function of } \theta_0 \text{ and } \theta_2$$

and solving for $\overline{M_2X_{21}e^{j\Theta_2}} = M_2X_{21}e^{j\Theta_2}*\Delta_0$ $$\overline{M_2X_{21}e^{j\theta_1}} = V_{02}(e^{j\theta_0}e^{j2\theta_1} - e^{j\theta_1}e^{j2\theta_0}) - V_{03}(e^{j2\theta_1} - e^{j2\theta_0}) + \quad (11)$$
$$V_{04}(e^{j\theta_1} - e^{j\theta_0})$$
$$= \text{function of } \theta_0 \text{ and } \theta_1$$

Taking the equations (9)/(6) and solve we have the following:

$$e^{j\theta_0} = V_{03}(e^{j\theta_1}e^{j2\theta_2} - e^{j\theta_2}e^{j2\theta_1}) - V_{04}(e^{j2\theta_2} - e^{j2\theta_1}) + \quad (12'')$$
$$V_{05}(e^{j\theta_2} - e^{j\theta_1})/V_{02}(e^{j\theta_1}e^{j2\theta_2} - e^{j\theta_2}e^{j2\theta_1}) -$$
$$V_{03}(e^{j2\theta_2} - e^{j2\theta_1}) + V_{04}(e^{j\theta_2} - e^{j\theta_1})$$
$$= \text{function of } \theta_1 \text{ and } \theta_2$$

Taking the previous equations (10)/(7) and solve we have the following:

$$e^{j\theta_1} = V_{03}(e^{j\theta_0}e^{j2\theta_2} - e^{j\theta_2}e^{j2\theta_0}) - V_{04}(e^{j2\theta_2} - e^{j2\theta_0}) + \quad (13'')$$
$$V_{05}(e^{j\theta_2} - e^{j\theta_0})/V_{02}(e^{j\theta_0}e^{j2\theta_2} - e^{j\theta_2}e^{j2\theta_0}) -$$

-continued
$$V_{03}(e^{j2\theta_2} - e^{j2\theta_0}) + V_{04}(e^{j\theta_2} - e^{j\theta_0})$$
$$= \text{function of } \theta_0 \text{ and } \theta_2$$

Taking the previous equation (11)/(8) and solve we have the following:

$$e^{j\theta_2} = V_{03}(e^{j\theta_0}e^{j2\theta_1} - e^{j\theta_1}e^{j2\theta_0}) - V_{04}(e^{j2\theta_1} - e^{j2\theta_0}) + \quad (14'')$$
$$V_{05}(e^{j\theta_1} - e^{j\theta_0})/V_{02}(e^{j\theta_0}e^{j2\theta_1} - e^{j\theta_1}e^{j2\theta_0}) -$$
$$V_{03}(e^{j2\theta_1} - e^{j2\theta_0}) + V_{04}(e^{j\theta_1} - e^{j\theta_0})$$
$$= \text{function of } \theta_0 \text{ and } \theta_1$$

Substituting equation (13") into equation (12") we have the following:

$\theta_0$ as a function of $\theta_2$

Substituting equation (13") into equation (14") we have the following:

$\theta_0$ as a function of $\theta_2$ we have two equations two unknowns and solvable in $\Phi_0$ and $\Phi_2$.

Substituting equation (12") into equation (13") we have the following:

$\theta_1$ as a function of $\theta_2$

Substituting equation (12") into equation (14") we have the following:

$\theta_1$ as a function of $\theta_2$ we have two equations two unknowns and solvable in $\Phi_1$ as a function of $\Phi_2$.

Substituting equation (14") into equation (13") we have the following:

$\theta_0$ as a function of $\theta_1$

Substituting equation (14") into equation (12") we have the following:

$\theta_0$ as a function of $\theta_1$

C1—Same as Assist in Section B1 for Assist in Determining Solutions for $\theta_0$, $\theta_1$, $\theta_2$, Etc for More Two Returns Instead of $\Phi_{D0}$, $\Phi_{D1}$, $\Phi_{D2}$, Etc we have two equations two unknowns and solvable in $\theta_0$ as a function of $\theta_1$ Thus we have solved for $\theta_2$ twice From a second set of data a small known change in frequency from the first set of data. We assume there will be no change in the channel balancing terms $A_{M0}, \Psi_{M0}$ which are the amplitude and phase term but a known DPCA term $\Delta K_{D0} X_0$ where $X_0$ is the unknown change in position of new filter and $K_{D0}$ DPCA known constant therefore the term is known. Performing the operations on the second set of data, the solutions are the same for $\theta_1$ and $\theta_2$ and the changes $X_{01}$ to $X_{01} e^{j(\Delta K_{D0} X_0)}$ where the phase term is known and represents the known change in frequency and known position change in peak of filter. The same is for the second and third return $X_{11}$ to $X_{11} e^{j \Delta X_1 * \Delta K_{D0}}$ and $X_{21}$ to $X_{21} e^{j \Delta X_2 * \Delta K_{D0}}$ analogous definitions of terms. The returns change due to frequency change from $M_0$ to $M'_0$ where $X_{F0} = M'_0/M_0$ and $M_1$ to $M'_1$ where $X_{F1} = M'_1/M_1$ and solving for $M_0 X_{01}$ and $M'^0 X_{01} e^{j(K_{D0} * \Delta X_0)}$ in the first and second set of data and dividing the terms we get $X_{F0} e^{j(K_{D0} * \Delta X_0)} = M'_0/M_0 e^{j(K_{D0} * \Delta X_0)}$. Therefore we have determined the ratio of the returns from which we estimate the position of the peak where is the first return and from that calculate the azimuth of the return. We can analogously perform that for the second and third return. The aforementioned analysis may be applied to many returns per RDB but as the number of returns increase the difficulty of determining the phases of the returns becomes much more difficult up to four or more returns is cumbersome is complicated. More said about that later in the document.

C2—Combining techniques of section III—Two channels "M" pulse system $\Phi_D$ technique and section IIII—$\Delta T$ technique-DPCA-Two channel "M" pulse system The two techniques employ the same data and may be processed in any manner to facilitate a solution. The following is a list of common solutions and attributes.
1. Same solutions for all parameters such as the following:
   a) $\Phi_{D\ s}, \Phi_{A\ s}$ and $\Phi_s$ and Ms and $X_{F\ s}, X_{R\ s}$ and $X_{H\ s}$
   b) $\Phi_{D\ s}$ have many same solutions in the $\Phi_D$ technique
   c) solutions for position and velocity of respective returns
2. $\Phi_D$ technique is more effective but requires more storage and processing but requires one less delay in data
3. Accuracy and robustness of solutions are enhanced
4. Appearance of a very practical system D—Analyzing the relationship (Duality) between one and two pulse systems to that of the one and two channel systems. The one and two channel systems employ many pulses in time which the spectrum (transformed to frequency) are obtained while the one and two pulse systems employ many channels (space elements) which the spectrum (transformed to frequency) are obtained.
1. The many pulse system and the many channel system the detection of clutter is the azimuth of detection while movers have two components one due to there azimuth and the other due to their radial velocity. The total frequency component is the addition of these components.
2. The many pulse system processes all detections of returns in the same RDB and the many channel system processes all detections of returns in the same RAB.
3. The many pulse system processes to determine velocity of returns and then calculates azimuth. The many channel system processes to determine azimuth of returns and then calculates velocity.

4. Calculation of DPCA and channel balancing factors are a duality since one works on space elements transformed while the other works on time elements transformed. Although one works with space but other works with time they have the same form and lend themselves to analogous equations and solutions. The channel balancing terms are in both systems depending on the azimuth of the returns. The DPCA terms depend on respective delays one in time and other in space but are analogous. Consequently they are analyzed in that manner.

Figure 9:
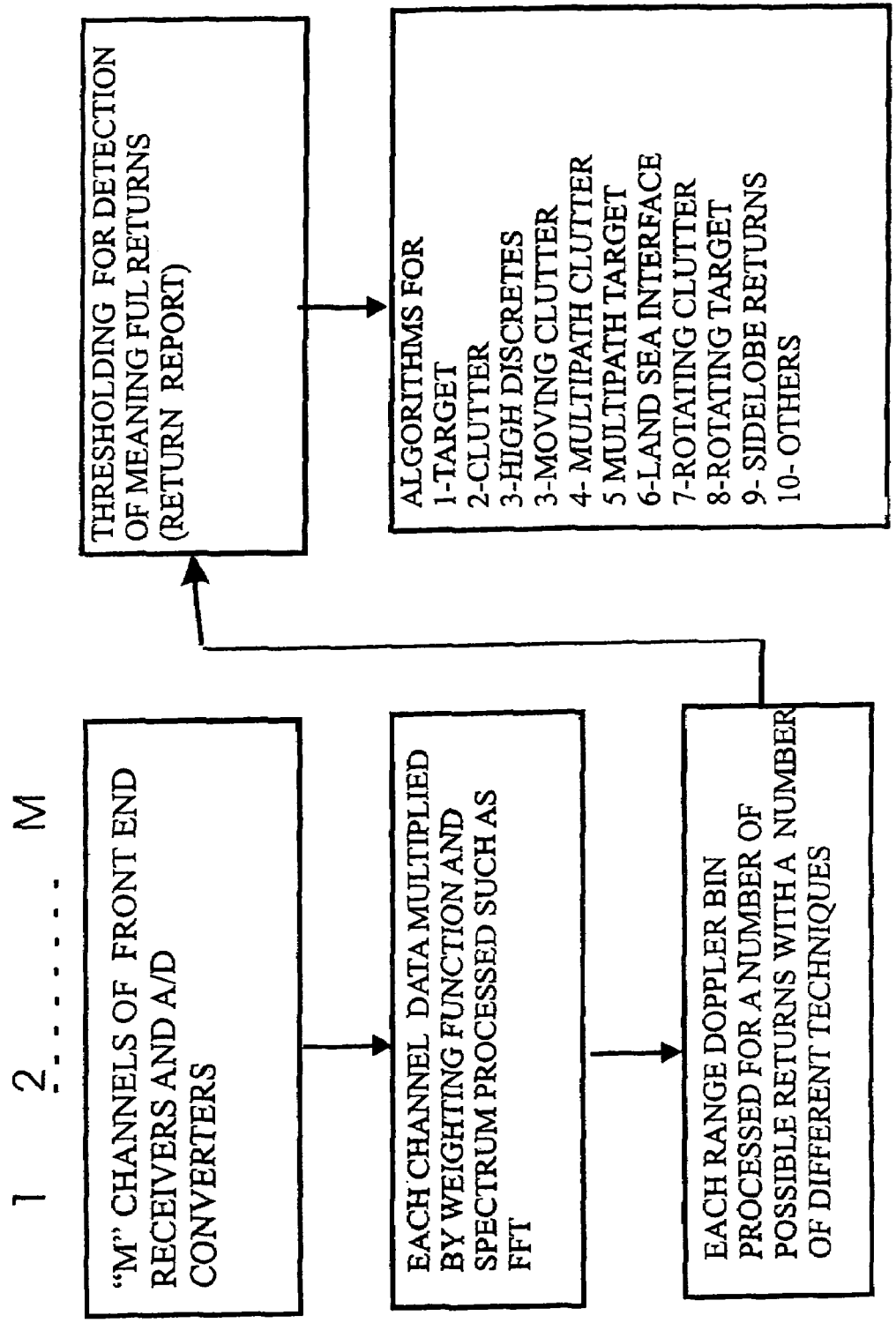
FIG. 9—depicts an embodiment of a block diagram of a system in accordance with the invention.

5. FIGS. 7 and 8 illustrate in the multipulse systems the number of parameters that could be correlated if n additional sets of data are processed which also applies to the multichannel systems. FIG. 9 illustrates the type of operations to be performed in implementing the multichannel system.

V One Pulse and One Channel Systems

This STAP methodology employs one or more pulse or channel data but one pulse at a time or one channel at a time, process them into its frequency spectrum and consequently localize clutter into its own range azimuth bin (RAB) or range doppler bin (RDB) together with any other returns such as target, thermal noise, and others.

The subsequent processing of each bin will separate out clutter doppler since clutter has zero (0) radial velocity and other returns detected in the same bin will have different velocities. Determining the azimuth and the velocity of the returns will be calculated therefore no additional data is required.

The knowledge aided STAP will be involved to determine from the detected returns which are the targets of interest, sidelobe returns, land sea interface, thermal noise, etc.

The knowledge aided STAP will not be involved in canceling clutter but in the post processing of the returns of interest so they may be detected and there parameters measured and determine the nature of the return.

The following sections will be an analysis of various techniques with there mathematical development to accomplished these ends. It is assumed the channel or time data has been processed by FFT into there individual range azimuth bins (RABs) or (RDBs) respectively where there exist in the cases of interest clutter (0-velocity) and other returns (non "0" velocity). Initially two (2) returns will be developed; it may be clutter and moving target or two moving targets.

More returns detected in one bin will be considered such as three returns, or more.

VA1—Two Returns Only Employing Two Sets of Data Common to all One Channel and One Pulse Systems $$V_{00} = M_0 + M_1 \quad (1)$$

$$V_{01} = M_0 e^{j \Phi_{D0}} + M_1 e^{j \Phi_{D1}} \quad (2)$$

$$V_{02} = M_0 e^{j 2 \Phi_{D0}} + M_1 e^{j 2 \Phi_{D1}} \quad (3)$$

VA1—One Channel Many Pulse Odd-Even Data and Apertures Equations (1), (2) and (3) and (1'), (2') and (3') Represented as Follows:

| | | |
|---|---|---|
| (1)-channel 1-aperture 1-time data | 1,3,5,-------,m−1 | odd data |
| (2)- | 3,5,7,--------,m+1 | |
| (3) | 5,7,9,---------,m+3 | |
| (1') -aperture 2 | 2,4,6,---------,m | even data |
| (2') | 4,6,8,---------,m+2 | |
| (3') | 6,8,10,--------,m+4 | |

VA2—One Channel Many Pulse No Odd-Even Data and Simultaneous Apertures Equations (1), (2) and (3) and (1'), (2') and (3') Represents as Follows:

| | | |
|---|---|---|
| (1)-channel 1-aperture 1-time data | 1,2,3,-------,m | |
| (2)- | | 1,2,3,-------,m |
| (3) | | 1,2,3,-------,m |
| (1')- | -aperture 2 | 1,2,3,-------,m |
| (2') | | 1,2,3,-------,m |
| (3') | | 1,2,3,-------,m |

VA3—One Pulse Many Channels Odd-Even Data and Apertures Equations (1), (2) and (3) and (1'), (2') and (3') Represents as Follows:

| | | | |
|---|---|---|---|
| (1)-PULSE 1-aperture 1-CHANNEL data | 1,3,5,-------,N−1 | odd data | |
| (2)- | | 3,5,7,--------,N+1 | |
| (3) | | 5,7,9,---------,N+3 | |
| (1') | -aperture 2 | 2,4,6,---------,N | even data |
| (2') | | 4,6,8,---------,N+2 | |
| (3') | | 6,8,10,--------,N+4 | |

VA4—One Pulse Many Channels No Odd-Even Data and Simultaneous Apertures a) Equations (1), (2) and (3) and (1'), (2') and (3') Represents as Follows:

| | | |
|---|---|---|
| (1)-PULSE 1-aperture 1-CHANNEL data | 1,2,3,-------,N | |
| (2)- | | 1,2,3,-------,N |
| (3) | | 1,2,3,-------,N |
| (1')- | -aperture 2 | 1,2,3,-------,N |
| (2') | | 1,2,3,-------,N |
| (3') | | 1,2,3,-----,N |

Taking equations (1) and (2) and treating $M_0$ and $M_1$ as the variables and solving for $M_0$ and $M_1$ we have:

$$M_0 = (V_{00} e^{j\Phi_{D1}} - V_{01})/(e^{j\Phi_{D1}} - e^{j\Phi_{D0}}) \quad (5)$$

$$M_1 = (V_{01} - e^{j\Phi_{D0}} V_{00})/(e^{j\Phi_{D1}} - e^{j\Phi_{D0}}) \quad (6)$$

Taking equations (2) and (3) and solving for $M_0 e^{j\Phi_{D0}}$ and $M_1 e^{j\Phi_{D1}}$ we have the following:

$$M_0 e^{j\Phi_{D0}} = (V_{01} e^{j\Phi_{D1}} - V_{02})/(e^{j\Phi_{D1}} - e^{j\Phi_{D0}}) \quad (7)$$

$$M_1 e^{j\Phi_{D1}} = (V_{02} - e^{j\Phi_{D0}} V_{01})/(e^{j\Phi_{D1}} - e^{j\Phi_{D0}}) \quad (8)$$

Dividing equations (7)/(5) and equations (8)/(6) we have the following:

$$e^{j\Phi_{D0}} = (V_{01} e^{j\Phi_{D1}} - V_{02})/(V_{00} e^{j\Phi_{D1}} - V_{01}) \quad (9)$$

$$e^{j\Phi_{D1}} = (V_{02} - e^{j\Phi_{D0}} V_{01})/(V_{01} - e^{j\Phi_{D0}} V_{00}) \quad (10)$$

Solving equation (9) and (10) for $\Phi_{D0}$ and $\Phi_{D1}$ and substituting these values into equation (1) and (2) and determine $M_0$ and $M_1$.

Now we have another set of equations for aperture (antenna) 2 formulated a beam width away from the first aperture (it can be any reasonable distance away).

$$V'_{00} = M'_0 + M'_1 \quad (1')$$

$$V'_{01} = M'_0 e^{j\Phi'_{D0}} + M'_1 e^{j\Phi'_{D1}} \quad (2')$$

$$V'_{02} = M'_0 e^{j2\Phi'_{D0}} + M'_1 e^{j\Phi'_{D1}} \quad (3')$$

Taking equations (1'), (2') and (3') and performing the identical operations as on equations (1), (2) and (3) and solving for $\Phi'_{D0}$ and $\Phi'_{D1}$ and $M'_0 + M'_1$ and where $\Phi'_{D0} = \Phi_{D0}$ and $\Phi'_{D1} = \Phi_{D1}$ $$K_{M0} e^{j\alpha 0} = M'_0/M_0 = (V'_{00} e^{j\Phi'_{D1}} - V'_{01})/(V_{00} e^{j\Phi'_{D1}} - V_{01}) \quad (12)$$

$$K_{M1} e^{j\Phi\alpha 1} = M'_1/M_1 = (V'_{01} - V'_{00} e^{j\Phi'_{D0}})/(V_{01} - V_{00} e^{j\Phi'_{D0}}) \quad (13)$$

b) From the data in the significant clutter only area in the antennas we have the equation for clutter only data as follows:

The returns from a prior measurement of the ratio of return output of aperture 2, even data to aperture 1 data, odd data-vs-azimuth or real time measurement of significant clutter only data, their ratio of two apertures-vs-azimuth and compared with ratios calculated in the processing which is the position in the filter where the returns are detected.

The methodology of producing this curve from real time data is as follows:

a) chose only relatively large amplitude clutter only data
b) determine its azimuth from its measurement and its amplitude and phase ratio of the return of apertures
c) measure ratio of ratio of the amplitude and phase from each aperture which is $$K_{M0} e^{j\alpha 0} = M'_0/M_0 \text{ and } K_{M1} e^{j\Phi\alpha 1} = M'_1/M_1$$

d) note: clutter only data is at its azimuth position—no radial velocity
e) perform this with as much data as to obtain a very good estimate of the curve of c) by any fitting statistical methodology
f) thus we have obtained a very good estimate of curve desired Now having generated from the real time data the curve of ratio of even divided by odd-vs-azimuth the candidate $\Phi$ technique is employed where all the possible phases are substituted (which are very limited in number, in equation (12) or (13) and the solutions are compared to the curve for the ratio of aperture data as a function of azimuth and where there is a match this is the solution. The solution for equations (12) and (13) should agree and they are a check on each other. Having attained the solution for azimuth $\Phi_A$ and having the solution for $\Phi_D$ then $\Phi = \Phi_D - \Phi_A$, the solution for radial velocity of the returns.

From the ratio of the second set of data to the first set of data we obtain $K_{M0} e^{j\alpha 0}$ and $K_{M1} e^{j\alpha 1}$ which is the ratio of $M'^0/M_0 = K_{M0} e^{j\alpha 0}$ and $M'_1/M_1 = K_{M1} e^{j\alpha 1}$ where all other terms are known.

c) A close range is now processed. This is processed to yield a second set of equations and processing similar to first set of data.

Now employing equations (1) and (2) and solving for $M_0$ and $M_1$ knowing $\Phi_{A0}$ and $\Phi_{A1}$ we are now to find $\Phi_{R0}$ and $\Phi_{R1}$ which is the detected position of 0 and 1 return is at its peak in the range bin, are proportional to range of return 0 and return 1 respectively. and $M_0$ and $M_1$ and both returns are detected in the same range bin (RB) but the location in that RB is not known. If the location is taken at the center of the filter the error in determination of range is plus or minus a half a RB. If a more accurate determination is desired a point of range close to first filter is created and processed like that of first data set this will be used to a more accurate determination of the range of both returns.

This gives the same $\Phi_{A0}$ and $\Phi_{A1}$ and different $M_0$ and $M_1$ and the ratios of the $M_0$ and $M_1$ should give a good estimate of where the position $\Phi_{R0}$ and $\Phi_{R1}$ is detected in the RB.

From this an estimate of better range of both returns is determined. To get a more accurate determination, another range or ranges may be processed or a slight change in the range processed and results correlated for best results. The ratio of second set of data for close in range we will obtain a much more accurate range.

The linear array height amplitude and phase changes in the different linear arrays should be the same.

The $X_R$ and $X_H$ should be all equal in the both sets of data and is another determination of the correct results Up to this point all sections VA1-VA4 have a common set of equations and solutions.

In the one channel system if the time data is delayed a significant time and processed like the first set of data the amplitude and phase change of the range will give the unambiguous velocity from which the ambiguous velocity is calculated and will be a check on the velocity that has been determined. This may be performed as many times as necessary and may eliminate the need for another PRF to increase the ambiguous velocity.

Processing similarly for change in doppler frequency will give the horizontal tangential velocity and for height change in the linear arrays will give vertical tangential velocity.

Thus range, azimuth and radial velocity unambiguously and vertical and horizontal tangential velocity has been attained.

In the one pulse system the precise range and height will be as in the one channel system but precise frequency will not be the same meaning. The significant delay in channel will give these parameters as a function of channel change.

Additional aids in one pulse and one channel systems attaining the solutions are to employ another delayed set of data and results should agree with the first set of data processed. Further if another close range bin is processed the change in range in both sets of data processed should be the same. This holds for the height and doppler or azimuth change is the same.

VB—Three Returns Only Employing Three Sets of Data Common To all One Channel and One Pulse Systems $$V_{00}=M_0+M_1+M_2 \quad (1)$$

$$V_{01}=M_0e^{j\Phi_{D0}}+M_1e^{j\Phi_{D1}}+M_2e^{j\Phi_{D2}} \quad (2)$$

$$V_{02}=M_0e^{j2\Phi_{D0}}+M_1e^{j2\Phi_{D1}}+M_2e^{j2\Phi_{D2}} \quad (3)$$

$$V_{03}=M_0e^{j3\Phi_{D0}}+M_1e^{j3\Phi_{D1}}+M_2e^{j3\Phi_{D2}} \quad (4)$$

VB1—One Channel Many Pulse Odd-Even Data and Apertures Equations (1), (2), (3) and (4) and (1'), (2'), (3') and (4') Represented as Follows:

| | | | |
|---|---|---|---|
| (1)-channel 1-aperture 1-time data | 1,3,5,-------,m−1 | odd data |
| (2)- | | 3,5,7,--------,m+1 | |
| (3) | | 5,7,9,---------,m+3 | |
| (4) | | 7,9,11---------,m+5 | |
| (1') | -aperture 2 | 2,4,6,---------,m | even data |
| (2') | | 4,6,8,---------,m+2 | |
| (3') | | 6,8,10,--------,m+4 | |
| (4') | | 8,10,12,--------,m+6 | |

VB2—One Channel Many Pulse No Odd-Even Data and Simultaneous Apertures Equations (1), (2), (3) and (4) and (1'), (2'), (3') and (4') Represented as Follows:

| | | |
|---|---|---|
| (1)-channel 1-aperture 1-time data | 1,2,3,-------,m |
| (2)- | | 1,2,3,-------,m |
| (3) | | 1,2,3,-------,m |
| (4) | | 1,2,3,-------,m |
| (1')- | -aperture 2 | 1,2,3,-------,m |
| (2') | | 1,2,3,-------,m |
| (3') | | 1,2,3,-------,m |
| (4') | | 1,2,3,-------,m |

VB3—One Pulse Many Channels Odd-Even Data and Apertures Equations (1), (2), (3) and (4) and (1'), (2'), (3') and (4') Represented as Follows:

| | | | |
|---|---|---|---|
| (1)-PULSE 1-aperture 1-CHANNEL data | 1,3,5,-------,N−1 | odd data |
| (2)- | | 3,5,7,--------,N+1 | |
| (3) | | 5,7,9,---------,N+3 | |
| (4) | | 7,9,11,---------,N+5 | |
| (1') | -aperture 2 | 2,4,6,---------,N | even data |
| (2') | | 4,6,8,----------,N+2 | |
| (3') | | 6,8,10,--------,N+4 | |
| (4') | | 8,10,12--------,N+6 | |

VB4—One Pulse Many Channels No Odd-Even Data and Simultaneous Apertures Equations (1), (2), (3) and (4) and (1'), (2'), (3') and (4') Represented as Follows:

| | | |
|---|---|---|
| (1)-PULSE 1-aperture 1-CHANNEL data | 1,2,3,-------,N |
| (2)- | | 1,2,3,-------,N |
| (3) | | 1,2,3,-------,N |
| (4) | | 1,2,3,-------,N |
| (1')- | -aperture 2 | 1,2,3,-------,N |
| (2') | | 1,2,3,-------,N |
| (3') | | 1,2,3,-------,N |
| (4') | | 1,2,3,-------,N |

Taking equations (1) and (2) and (3) and treating $M_0$ and $M_1$ and $M_2$ as the variables and solving the determinant equation for $\Delta_0$ we have:

$$\Delta_0 = \begin{vmatrix} 1 & 1 & 1 \\ e^{j\Phi_{D0}} & e^{j\Phi_{D1}} & e^{j\Phi_{D0}} \\ e^{j2\Phi_{D0}} & e^{j2\Phi_{D1}} & e^{j2\Phi_{D2}} \end{vmatrix} =$$

$$1\begin{vmatrix} e^{j\Phi_{D1}} e^{j\Phi_{D2}} \\ e^{j2\Phi_{D1}} e^{j2\Phi_{D2}} \end{vmatrix} - 1\begin{vmatrix} e^{j\Phi_{D0}} e^{j\Phi_{D1}} \\ e^{j2\Phi_{D0}} e^{j2\Phi_{D2}} \end{vmatrix} + 1\begin{vmatrix} e^{j\Phi_{D0}} e^{j\Phi_{D1}} \\ e^{j2\Phi_{D0}} e^{j2\Phi_{D1}} \end{vmatrix}$$

$$\Delta_0 = e^{j\Phi_{D1}} e^{j\Phi_{D2}} - e^{j2\Phi_{D1}} e^{j2\Phi_{D2}} - e^{j\Phi_{D0}} e^{j2\Phi_{D2}} + e^{j\Phi_{D2}} e^{j2\Phi_{D0}} +$$
$$e^{j\Phi_{D0}} e^{j2\Phi_{D1}} - e^{j\Phi_{D1}} e^{j2\Phi_{D0}}$$

$$= \text{function of } \Phi_{D0}, \Phi_{D1} \text{ and } \Phi_{D2}$$

and solving for $\overline{M_0} = M_0 * \Delta_0$ $$\overline{M_0} = \begin{vmatrix} V_{00} & 1 & 1 \\ V_{01} & e^{j\Phi_{D1}} & e^{j\Phi_{D2}} \\ V_{02} & e^{j2\Phi_{D1}} & Ve^{j2\Phi_{D2}} \end{vmatrix} = V_{00}\begin{vmatrix} e^{j\Phi_{D1}} & e^{j\Phi_{D2}} \\ e^{j2\Phi_{D1}} & e^{j2\Phi_{D2}} \end{vmatrix} - \quad (6)$$

$$V_{01}\begin{vmatrix} 1 & 1 \\ e^{j2\Phi_{D1}} & e^{j2\Phi_{D2}} \end{vmatrix} + V_{02}\begin{vmatrix} 1 & 1 \\ e^{j\Phi_{D1}} & e^{j\Phi_{D2}} \end{vmatrix}$$

$$\overline{M_0} = V_{00}(e^{j\Phi_{D1}}e^{j2\Phi_{D2}} - e^{j\Phi_{D2}}e^{j2\Phi_{D1}}) - V_{01}(e^{j2\Phi_{D2}} - e^{j2\Phi_{D1}}) + V_{02}(e^{j\Phi_{D2}} - e^{j\Phi_{D1}})$$

$$= \text{function of } \Phi_{D1} \text{ and } \Phi_{D2}$$

and solving for $\overline{M_1} = M_1 * \Delta_0$ $$\overline{M_1} = \begin{vmatrix} 1 & V_{00} & 1 \\ e^{j\Phi_{D0}} & V_{01} & e^{j\Phi_{D2}} \\ e^{j2\Phi_{D2}}V_{02} & & Ve^{j2\Phi_{D2}} \end{vmatrix} = V_{00}\begin{vmatrix} e^{j\Phi_{D0}} & e^{j\Phi_{D2}} \\ e^{j2\Phi_{D0}} & e^{j2\Phi_{D2}} \end{vmatrix} - \quad (7)$$

$$V_{01}\begin{vmatrix} 1 & 1 \\ e^{j2\Phi_{D0}} & e^{j2\Phi_{D2}} \end{vmatrix} + V_{02}\begin{vmatrix} 1 & 1 \\ e^{j\Phi_{D0}} & e^{j\Phi_{D2}} \end{vmatrix}$$

$$\overline{M_1} = V_{01}(e^{j\Phi_{D0}}e^{j2\Phi_{D2}} - e^{j2\Phi_{D0}}e^{j\Phi_{D2}}) - V_{01}(e^{j2\Phi_{D2}} - e^{j2\Phi_{D0}}) + V_{02}(e^{j\Phi_{D2}} - e^{j\Phi_{D0}})$$

$$= \text{function of } \Phi_{D0} \text{ and } \Phi_{D2}$$

and solving for $\overline{M_2} = M_2 * \Delta_0$ $$\overline{M_2} = \begin{vmatrix} 1 & 1 & V_{00} \\ e^{j\Phi_{D0}} & e^{j\Phi_{D1}} & V_{01} \\ e^{j2\Phi_{D0}} & Ve^{j2\Phi_{D1}} & V_{02} \end{vmatrix} = V_{00}\begin{vmatrix} e^{j\Phi_{D0}} & e^{j\Phi_{D1}} \\ e^{j2\Phi_{D0}} & e^{j2\Phi_{D0}} \end{vmatrix} - \quad (8)$$

$$V_{01}\begin{vmatrix} 1 & 1 \\ e^{j2\Phi_{D0}} & e^{j2\Phi_{D1}} \end{vmatrix} + V_{02}\begin{vmatrix} 1 & 1 \\ e^{j\Phi_{D0}} & e^{j\Phi_{D1}} \end{vmatrix}$$

$$\overline{M_2} = V_{00}(e^{j\Phi_{D1}}e^{j2\Phi_{D2}} - e^{j\Phi_{D2}}e^{j2\Phi_{D1}}) - V_{01}(e^{j2\Phi_{D2}} - e^{j2\Phi_{D1}}) + V_{02}(e^{j\Phi_{D2}} - e^{j\Phi_{D1}})$$

$$= \text{function of } \Phi_{D0} \text{ and } \Phi_{D1}$$

Taking equation (2), (3) and (4) and performing the identical operations as in equation (1), (2) and (3) we have the following:

$$\overline{M_0 e^{j\Phi_{D0}}} = V_{01}(e^{j\Phi_{D1}}e^{j\Phi_{D2}} - e^{j\Phi_{D2}}e^{j2\Phi_{D1}}) - \quad (9)$$
$$V_{02}(e^{j2\Phi_{D2}} - e^{j2\Phi_{D1}}) + V_{03}(e^{j\Phi_{D2}} - e^{j\Phi_{D1}})$$
$$= \text{function }(\Phi_{D1} \text{ and } \Phi_{D2})$$

$$\overline{M_1 e^{j\Phi_{D1}}} = V_{01}(e^{j\Phi_{D0}}e^{j2\Phi_{D2}} - e^{j2\Phi_{D0}}e^{j\Phi_{D2}}) - \quad (10)$$
$$V_{02}(e^{j2\Phi_{D2}} - e^{j2\Phi_{D0}}) + V_{03}(e^{j\Phi_{D2}} - e^{j\Phi_{D0}})$$
$$= \text{function }(\Phi_{D0} \text{ and } \Phi_{D1})$$

-continued $$\overline{M_2 e^{j\Phi_{D2}}} = V_{01}(e^{j\Phi_{D0}}e^{j2\Phi_{D1}} - e^{j\Phi_{D1}}e^{j2\Phi_{D0}}) - \quad (11)$$
$$V_{02}(e^{j2\Phi_{D1}} - e^{j2\Phi_{D0}}) + V_{03}(e^{j\Phi_{D1}} - e^{j\Phi_{D0}})$$
$$= \text{function }(\Phi_{D0} \text{ and } \Phi_{D1})$$

Dividing equation (9)/(6) and (10)/(7) and (11)/(8) we have the following:

$$e^{j\Phi_{D0}} = V_{01}(e^{j\Phi_{D1}}e^{j2\Phi_{D2}} - e^{j\Phi_{D2}}e^{j2\Phi_{D1}}) - \quad (12)$$
$$V_{02}(e^{j2\Phi_{D2}} - e^{j2\Phi_{D1}}) + V_{03}(e^{j\Phi_{D2}} - e^{j\Phi_{D1}})/$$
$$V_{00}(e^{j\Phi_{D1}}e^{j2\Phi_{D2}} - e^{j\Phi_{D2}}e^{j2\Phi_{D1}}) -$$
$$V_{01}(e^{j2\Phi_{D2}} - e^{j2\Phi_{D1}}) + V_{02}(e^{j\Phi_{D2}} - e^{j\Phi_{D1}})$$
$$= \text{function }(\Phi_{D1}, \Phi_{D2})$$

$$e^{j\Phi_{D1}} = V_{01}(e^{j\Phi_{D0}}e^{j2\Phi_{D2}} - e^{j2\Phi_{D0}}e^{j\Phi_{D2}}) - \quad (13)$$
$$V_{02}(e^{j2\Phi_{D2}} - e^{j2\Phi_{D0}}) + V_{03}(e^{j\Phi_{D2}} - e^{j\Phi_{D0}})/$$
$$V_{01}(e^{j\Phi_{D0}}e^{j2\Phi_{D2}} - e^{j2\Phi_{D0}}e^{j\Phi_{D2}}) -$$
$$V_{01}(e^{j2\Phi_{D2}} - e^{j2\Phi_{D0}}) + V_{02}(e^{j\Phi_{D2}} - e^{j\Phi_{D0}})$$
$$= \text{function }(\Phi_{D0}, \Phi_{D2})$$

$$e^{j\Phi_{D2}} = V_{01}(e^{j\Phi_{D0}}e^{j2\Phi_{D1}} - e^{j\Phi_{D1}}e^{j2\Phi_{D0}}) - \quad (14)$$
$$V_{02}(e^{j2\Phi_{D1}} - e^{j2\Phi_{D0}}) + V_{03}(e^{j\Phi_{D1}} - e^{j\Phi_{D0}})/$$
$$V_{00}(e^{j\Phi_{D0}}e^{j2\Phi_{D1}} - e^{j\Phi_{D1}}e^{j2\Phi_{D0}}) -$$
$$V_{01}(e^{j2\Phi_{D1}} - e^{j2\Phi_{D0}}) + V_{02}(e^{j\Phi_{D1}} - e^{j\Phi_{D0}})$$
$$= \text{function }(\Phi_{D0}, \Phi_{D1})$$

The equations for the other data as follows:

$$V'_{00} = M'_0 + M'_1 + M'_2 \quad (1')$$

$$V'_{01} = M'_0 e^{j\Phi'_{D0}} + M'_1 e^{j\Phi'_{D1}} + M'_2 e^{j\Phi'_{D2}} \quad (2')$$

$$V'_{02} = M'_0 e^{j2\Phi'_{D0}} + M'_1 e^{j2\Phi'_{D1}} + M'_2 e^{j2\Phi'_{D2}} \quad (3')$$

$$V'_{03} = M'_0 e^{j3\Phi'_{D0}} + M'_1 e^{j3\Phi'_{D1}} + M'_2 e^{j3\Phi'_{D2}} \quad (4')$$

Taking equations (1' to 4') and solving identical to equations (1) to (4) we have the following:

$$e^{j\Phi'_{D0}} = V'_{01}(e^{j\Phi'_{D1}}e^{j2\Phi'_{D2}} - e^{j\Phi'_{D2}}e^{j2\Phi'_{D1}}) - \quad (12')$$
$$V'_{02}(e^{j2\Phi'_{D2}} - e^{j2\Phi'_{D1}}) + V'_{03}(e^{j\Phi'_{D2}} - e^{j\Phi'_{D1}})/$$
$$V'_{00}(e^{j\Phi'_{D1}}e^{j2\Phi'_{D2}} - e^{j\Phi'_{D2}}e^{j2\Phi'_{D1}}) -$$
$$V'_{01}(e^{j2\Phi'_{D2}} - e^{j2\Phi'_{D1}}) + V'_{02}(e^{j\Phi'_{D2}} - e^{j\Phi'_{D1}})$$
$$= \text{function }(\Phi'_{D1}, \Phi'_{D2})$$

$$e^{j\Phi'_{D1}} = V'_{01}(e^{j\Phi'_{D0}}e^{j2\Phi'_{D2}} - e^{j2\Phi'_{D0}}e^{j\Phi'_{D2}}) - \quad (13')$$
$$V'_{02}(e^{j2\Phi'_{D2}} - e^{j2\Phi'_{D2}}) + V'_{03}(e^{j\Phi'_{D2}} - e^{j\Phi'_{D0}})/$$
$$V'_{01}(e^{j\Phi'_{D0}}e^{j2\Phi'_{D2}} - e^{j2\Phi'_{D2}}e^{j\Phi'_{D2}}) -$$
$$V'_{01}(e^{j2\Phi'_{D2}} - e^{j2\Phi'_{D0}}) + V'_{02}(e^{j\Phi'_{D2}} - e^{j\Phi'_{D0}})$$
$$= \text{function }(\Phi'_{D0}, \Phi'_{D2})$$

-continued $$e^{j\Phi'_{D2}} = V'_{01}\left(e^{j\Phi'_{D0}}e^{j2\Phi'_{D1}} - e^{j\Phi'_{D1}}e^{j2\Phi'_{D0}}\right) - \quad (14')$$
$$V'_{02}\left(e^{j2\Phi'_{D1}} - e^{j2\Phi'_{D0}}\right) + V'_{03}\left(e^{j\Phi'_{D1}} - e^{j\Phi'_{D0}}\right) /$$
$$V'_{00}\left(e^{j\Phi'_{D0}}e^{j2\Phi'_{D1}} - e^{j\Phi'_{D1}}e^{j2\Phi'_{D0}}\right) -$$
$$V'_{01}\left(e^{j2\Phi'_{D1}} - e^{j2\Phi'_{D0}}\right) + V'_{02}\left(e^{j\Phi'_{D1}} - e^{j\Phi'_{D0}}\right)$$
$$= \text{function } (\Phi'_{D0}, \Phi'_{D1})$$

where $\Phi^{D0}=\Phi'_{D0}$; $\Phi_{D1}=\Phi'_{D1}$ and $\Phi_{D2}=\Phi'_{D2}$

Taking equations (12) to (14) and equations (12') to (14') and solving in both sets of equations for $\Phi_{D0}$, $\Phi_{D1}$ and $\Phi_{D2}$ solution which should be equal is the following procedure:

Substituting equation (12) or (12') into equation (13) or (13') we have the following:

$\Phi_{D0}$ as a function of $\Phi_{D2}$

Substituting equation (13) or (13') into equation (14) or (14') we have the following:

$D_0$ as a function of $\Phi_{D2}$

Substituting equation (14) or (14') into equation (12) or (12') we have the following:

$\Phi_{D0}$ as a function of $\Phi_{D1}$ substituting equation (14) or (14') into equation (13) or (13') we have the following:

$\Phi_{D0}$ as a function of $\Phi_{D1}$

Similarly we have two equations two unknowns and solvable in $\Phi_{D0}$ and $\Phi_{D2}$ and similarly for $\Phi_{D1}$ and $\Phi_{D2}$.

Thus we have solved for $\Phi_{D1}$, $\Phi_{D2}$ and $\Phi_{D3}$ twice.

From the second set of data a small frequency change from the first set of data this gives the same $\Phi_{D1}$, $\Phi_{D2}$ and $\Phi_{D3}$ and different $M_0$, $M_1$ and $M_2$ and the ratios of the $M'_0/M_0$, $M'_1/M_1$ and $M'_2/M_2$ should give a good check of where the position $\Phi_{D0}$ and $\Phi_{D1}$ and $\Phi D_2$ is detected at that RDB or RAB and a check on the solutions determined. From this the azimuth of the returns are determined.

A methodology in simplifying solutions where there are three or more returns detected in RDB or RAB. Determine from processing adjacent RDB or RAB detection of returns that will be detected in the processed bin. Then by employing candidate solution methodology, that is substituting all possible solutions which are very limited in number, and knowing one or more solutions. The solutions must have the known solution as one of its solutions. This makes it much simpler solution and more robust and accurate Calculating from real time data a curve of the ratio of amplitude of returns at the two different apertures-vs-azimuth. Chose relatively significant clutter only detected in same bin in both apertures.

The methodology of producing this curve from real time data is as follows:

a) chose only relatively large amplitude clutter only data.
b) determine its azimuth from its measurement and its amplitude and phase of the return in each aperture.
c) measure ratio of ratio of the amplitude and phase from each aperture which is $K_{M0}e^{j\alpha 0}=M'_0/M_0$ and $K_{M1}e^{j\Phi\alpha 1}=M'_1/M_1$ etc.

d) perform this with as much data as to obtain a very good estimate of the curve by any fitting statistical methodology.
e) thus we have obtained a very good estimate of curve desired.

Now having generated from the real time data the curve of ratio of even divided by odd-vs-azimuth the candidate $\Phi$ technique is employed where all the possible phases are substituted (which are very limited in number, in equations and the solutions are compared to the curve for the ratio of aperture data as a function of azimuth and where there is a match this is the solution. The solution for equations should agree and they are a check on each other. Having attained the solution for azimuth, $\Phi_A$, and having the solution for $\Phi_D$ then $\Phi=\Phi_D-\Phi_A$, the solution for radial velocity of the returns.

Determine its azimuth position and measure its ratio between apertures. Perform this for all clutter that meets the criteria and obtain a best statistical estimate of the said curve.

Dealing with three unknown returns or more an aid in finding the $\Phi_D{}_S$ will be very helpful and obtain a more robust solutions. There are not many cases where there will be three or more returns are detected in the same RDB or RAB but in those cases the aid in processing first if there is clutter or other return detected close to processed bin to be detected in processed bin also. To continue to find as many possible solutions from all the close bins processed. If so you know at least one of the solutions assume you that returns solution is known and a great deal more robust and accurate.

Employing the possible candidate solutions, only a restricted number of solutions are possible, with the known solution or solutions, vary the other candidate solutions until the solution is $M'_0/M_0=K_{M0}e^{j\alpha 0}$ or $M'_1/M_1=K_{M1}e^{j\alpha 1}$ or $M'_2/M_2=K_{M2}e^{j\alpha 2}$ etc.

The agreement with curve of ratio of returns ratio-vs-azimuth and the azimuth of each return has been determined. Since $\Phi_0=\Phi_{D0}-\Phi_{A0}$ and $\Phi_1=\Phi_{D1}-\Phi_{A1}$ and $\Phi_2=\Phi_{D2}-\Phi_{A2}$ etc. we solve for all returns radial velocity.

From the ratio of the second set of data to the first set of data we obtain XF0 and XF1 and XF2 from which is the ratio of $M'_0/M_0=X_{F0}$ and $M'_1/M_1=X_{F1}$ and $M'_2/M_2=X_{F2}$ where all other terms are known. From the previous determinations of the $\Phi_{D0}$ and $\Phi_{D1}$ and $\Phi_{D2}$ which is the position in the filter where the returns are detected at there peak in the RDB or RAB where $\Phi_{0A}$ is the phase of the return proportional to the azimuth of the return, and $\Phi_{D0}$ is the phase of the return proportional to the peak of the return, $\Phi_0$, is the phase of the return proportional to the velocity of the return.

In the one channel system:

A small change in doppler bin may be taken and its determined XF0, XF1 and XF2 which determines where the peak of the returns in doppler, this does not help in the evaluation in azimuth.

A small change in range bin may be taken and we determine XR0, XR1 and XR2 which determines where the peak of the returns in range, this does not help in the evaluation in azimuth. Resolving velocity ambiguity is taking a meaning delay in time and processing again. Thus we can determine the peak of each return in range and azimuth to obtain the maximum amplitude for each return for further use.

Other linear arrays are processed may be taken and its determine XH0, XH1 and XH2 which determines where the peak of the returns in height, this does not help in the evaluation in azimuth.

Resolving velocity ambiguity with the taking of meaningful delay in time and processing again. Thus we can determine the peak of each return in range and azimuth to obtain the maximum amplitude for each return for further use. The change in amplitude and phase of the range bin in conjunction with a delay in time gives an accurate determination of radial velocity which will resolve velocity ambiguity. This will also be for doppler change give the horizontal tangential velocity and with an analogous technique in a planar array giving vertical tangential velocity therefore an estimate of total velocity and estimate of pointing angle of the return. Which is the following: The previous analysis was with two returns possible per RAB processed though three (3) or more returns per RAB may be processed and determine the solution From the analysis for the one channel system there is determined all the parameters of the returns the accurate position in range, azimuth and velocity and radial velocity, horizontal and vertical tangential velocity, mover, noise, and other returns may be detected and thresholded for importance and later processed to determine if sidelobes, multipath targets, etc.

One Pulse System

The analysis indicates the same solutions for range, velocity, azimuth and precise range and height are obtained but not the other parameters.

Obtaining curve of ratio of aperture 2 divided by aperture 1 $M'/M = |K_M| e^{j\alpha}$-vs-azimuth as detailed in previous cases, we perform the candidate solution technique we substitute each candidate solution for right side of equations above and when the right solution is entered the left side will equal the correct Km and phase. This performed for all three equations and the solutions should correlate. Employ analogous techniques as in other three return cases in the one pulse technique to find all the same solutions.

RECAPPING-We have determined all $\Phi_s$, in the two return and three return case and as consequently it may be performed for many $\Phi_s$. The significance of this development is as each RDB that is processed clutter, target, noise, and other returns may be detected and thresholded for importance and later processed to determine if sidelobes, multipath targets, etc.

Employ analogous techniques as other three return and three sets of data cases to find all the same solutions.

VC—One Pulse—One Aperture System—$\Delta C$ Technique

The analysis may be performed with a one antenna transmit and many (channel) receive system. This system is called $\Delta C$ technique with one aperture formulated where the data will be delayed as desired to solve the problem. We will consider two returns clutter and mover and the channel data has been spectrum processed into its individual RABs and each will be treated as follows:

Referenced previous delayed one data point, each channel the data point is delayed it is multiplied by a suitable weighting function and its spectrum is obtained with such as FFT. In processing a particular RAB we may have the following:

$$V_{00} = M_0 + M_1 \quad (1)$$

PULSE 1- APERTURE 1-CHANNEL 1-N $$V_{01} = M_0 e^{j\Phi_{D0}} + M_1 e^{j\Phi_{D1}} \quad (2)$$

PULSE 1- APERTURE 1-CHANNEL 2-N+1-DELAYED ONE CHANNEL $$V_{02} = M_0 e^{j2\Phi_{D0}} + M_1 e^{j2\Phi_{D1}} \quad (3)$$

PULSE 1- APERTURE 1-CHANNEL 3-N+2-DELAYED TWO CHANNELS $$V_{03} = M_0 e^{j3\Phi_{D0}} + M_1 e^{j3\Phi_{D1}} \quad (4)$$

PULSE 1- APERTURE 1-CHANNEL 4-N+3-DELAYED THREE CHANNELS

Above equations are for two returns where

V00—is the return in the RAB being processed at delayed data 1 at PULSE 1 $V_{01}$—is the return in the RAB being processed at delayed data 2 at PULSE 1

$V_{02}$—is the return in the RAB being processed at delayed data 3 at PULSE 1

$V_{03}$—is the return in the RAB being processed at delayed data 4 at PULSE 1

$M_0$—is the first return vector $M_1$—is the second return vector $\Phi_{D0}$—is the phase of the first return where the phase is proportional to the azimuth plus velocity of the return $\Phi_{D1}$—is the phase of the second return where the phase is proportional to the azimuth plus velocity of the return Taking equations (1) and (2) and treating $M_0$ and $M_1$ as the variables and solving for $M_0$ and $M_1$ we have:

$$M_0 = (V_{00} e^{j\Phi_{D1}} - V_{01})/(e^{j\Phi_{D1}} - e^{j\Phi_{D0}}) \quad (5)$$

$$M_1 = (V_{00} - e^{j\Phi_{D0}} V_{01})/(e^{j\Phi_{D1}} - e^{j\Phi_{D0}}) \quad (6)$$

Taking equations (2) and (3) and treating $M_0 e^{j\Phi_{D0}}$ and $M_1 e^{j\Phi_{D1}}$ as the variables and solving for $M_0 e^{j\Phi_{D0}}$ and $M_1 e^{j\Phi_{D1}}$ we have:

$$M_0 e^{j\Phi_{D0}} = (V_{01} e^{j\Phi_{D1}} - V_{02})/(e^{j\Phi_{D1}} - e^{j\Phi_{D0}}) \quad (5')$$

$$M_1 e^{j\Phi_{D1}} = (V_{01} - e^{j\Phi_{D0}} V_{02})/(e^{j\Phi_{D1}} - e^{j\Phi_{D0}}) \quad (6')$$

Equation (5')/Equation (5) and (6')/(6) are the following:

$$e^{j\Phi_{D0}} = (V_{01} e^{j\Phi_{D1}} - V_{02})/V_{00} e^{j\Phi_{D1}} - V_{01}) \quad (7')$$

$$e^{j\Phi_{D1}} = (V_{01} - e^{j\Phi_{D0}} V_{02})/(V_{00} - e^{j\Phi_{D0}} V_{01}) \quad (8')$$

Equation (7') or Equation (8') is easily solved for $\Phi_{D0}$ and $\Phi_{D1}$ which are proportional to the azimuth plus velocity of return 0 and return 1 respectively.

Now employing equations (1) and (2) and solving for $M_0$ and $M_1$ knowing $\Phi_{D0}$ and $\Phi_{D1}$ we are now to find $\Phi_{A0}$ and $\Phi_{A1}$ which are proportional to total phase of the azimuth return 0 and return 1 respectively and $M_0$ and $M_1$ and both returns are detected in the same RAB.

Now we have another set of equations for another close azimuth bin from the first azimuth bin processed.

$$V'_{00} = M'_0 + M'_1 \quad (1')$$

PULSE 1- AZIMUTH BIN 2-CHANNEL 1-N $$V'_{01} = M'_0 e^{j\Phi'_{D0}} + M'_1 e^{j\Phi'_{D1}} \quad (2')$$

PULSE 1- AZIMUTH BIN 2-CHANNEL 2-N+1-DELAYED ONE CHANNEL $$V'_{02} = M'_0 e^{j2\Phi'_{D0}} + M'_1 e^{j2\Phi'_{D1}} \quad (3')$$

PULSE 1- AZIMUTH BIN 2-CHANNEL 3-N+2-DELAYED TWO CHANNELS $$V'_{03} = M'_0 e^{j3\Phi'_{D0}} + M'_1 e^{j3\Phi'_{D1}} \quad (4')$$

PULSE 1- AZIMUTH BIN 2-CHANNEL 4-N+3-DELAYED THREE CHANNELS

This gives the same $\Phi_{A0}$ and $\Phi_{A1}$ and different $M_0$ and $M_1$ and the ratios of the $M_0$ and $M_1$ should give a good estimate of where the position $\Phi_{D0}$ and $\Phi_{D1}$ is detected at in the RAB. $\Phi_{D0}$ and $\Phi_{D1}$ is the peak position of return 0 and 1 are detected in the RDB processed.

From the ratio of the second set of data to the first set of data we obtain $|A_{Z0}|$ and $|A_{Z1}|$ which is the ratio of $M'_0/M_0=|A_{Z0}|$ and $M'_1/M_1=|A_{Z1}|$ where all other terms are known.

A small change in the azimuth bin may be taken and we determine $|A_{Z0}|$ and $|A_{Z1}|$ which determines where the peak of the returns is in azimuth, this helps in the determination in tangential velocity. If attaining tangential velocity is desired then the taking of meaningful delay in time and processing again. Thus we can determine the peak of each return in azimuth to obtain the $\Phi_{A0}$ and $\Phi_{A1}$ of each return for further use in determining the radial velocity $\Phi_0=\Phi_{D0}-\Phi_{A0}$ and $\Phi_1=\Phi_{D1}-\Phi_{A1}$ change in amplitude and phase of the azimuth bin in conjunction with a delay in time gives an accurate determination of radial velocity. This will also be for and an analogous technique in a planar array giving vertical tangential velocity therefore an estimate of total velocity and estimate of pointing angle of the return which is the following: The previous analysis was with two returns possible per RAB processed though three (3) or more returns per RAB may be processed and determine the solution From the previous analysis for the one pulse system there is determined all the parameters of the returns the accurate position in range, azimuth and height and ambiguous radial velocity.

VD—One Channel—Multiple Time Data-Change in Time-One Aperture

The system is a transmission from a fixed transmission array and one or more receive antennas This STAP methodology process the data into its frequency spectrum and consequently localize clutter into its own range doppler bin (RDB) together with any other returns such as target, thermal noise, and others.

The subsequent processing of each RDB will separate out clutter doppler since clutter has zero (0) radial velocity and other returns in the same (RDB) will have different velocities. From determining the velocity of the returns the azimuth will be calculated therefore no additional data is required.

The knowledge aided STAP will be involved to determine from the detected returns which are targets of interest, sidelobe returns, land sea interface, thermal noise, etc.

The knowledge aided STAP will be not involved in canceling clutter but in the post processing of the returns of interest so they may be detected and there parameters measured and determine the nature of the return.

Two returns in one RDB will be considered initially and such as three moving returns, or more will be dealt with as analogously as other techniques.

$$V_{00}=M_0+M_1 \quad (1)$$

TIME DATA $$V_{01}=M_0e^{j\Phi_{D0}}+M_1e^{j\Phi_{D1}} \quad (2)$$

TIME DATA DELAYED ONE TIME $$V_{02}=M_0e^{j2\Phi_{D0}}+M_1e^{j2\Phi_{D1}} \quad (3)$$

DELAYED TWO TIMES $$V_{03}=M_0e^{j3\Phi_{D0}}+M_1e^{j3\Phi_{D1}} \quad (4)$$

DELAYED THREE TIMES

Above equations are for two returns where

V00—is the return in the RDB being processed at data 1

$V_{01}$—is the return in the RDB being processed at data 2

$V_{02}$—is the return in the RDB being processed at data 3

$V_{03}$—is the return in the RDB being processed at data 4

$M_0$—is the first return vector.

$M_1$—is the second return vector.

$\Phi_{D0}$—is the phase of the first return where the phase is proportional to the azimuth plus velocity of the return.

$\Phi_{D1}$—is the phase of the second return where the phase is proportional to the azimuth plus velocity of the return.

Taking equations (1) and (2) and treating $M_0$ and $M_1$ as the variables and solving for $M_0$ and $M_1$ we have:

$$M_0=(V_{00}e^{j\Phi_{D1}}-V_{01})/(e^{j\Phi_{D1}}-e^{j\Phi_{D0}}) \quad (5)$$

$$M_1=(V_{00}-e^{j\Phi_{D0}}V_{01})/(e^{j\Phi_{D1}}-e^{j\Phi_{D0}}) \quad (6)$$

Taking equations (2') and (3') and treating $M_0e^{j\Phi_{D0}}$ and $M_1e^{j\Phi_{D1}}$ as the variables and solving for $M_0e^{j\Phi_{D0}}$ and $M_1e^{j\Phi_{D1}}$ we have:

$$M_0e^{j\Phi_{D0}}=(V_{01}e^{j\Phi_{D1}}-V_{02})/(e^{j\Phi_{D1}}-e^{j\Phi_{D0}}) \quad (5')$$

$$M_1e^{j\Phi_{D1}}=(V_{01}-e^{j\Phi_{D0}}V_{02})/(e^{j\Phi_{D1}}-e^{j\Phi_{D0}}) \quad (6')$$

Equation (5')/Equation (5) and (6')/(6) are the following:

$$e^{j\Phi_{D0}}=(V_{01}e^{j\Phi_{D1}}-V_{02})/V_{00}e^{j\Phi_{D1}}-V_{01}) \quad (7')$$

$$e^{j\Phi_{D1}}=(V_{01}-e^{j\Phi_{D0}}V_{02})/(V_{00}-e^{j\Phi_{D0}}V_{01}) \quad (8')$$

Equation (7') or Equation (8') is easily solved for $\Phi_{D0}$ and $\Phi_{D1}$ which are proportional to the azimuth plus velocity of return 0 and return 1 respectively. A close range is processed. This is processed to yield a second set of equations and processing similar to first set of data.

$$V'_{00}=M'_0+M'_1 \quad (1')$$

NO DELAY IN DATA $$V'_{01}=M'_0e^{j\Phi'_{D0}}+M'_1e^{j\Phi'_{D1}} \quad (2')$$

DELAYED ONE TIME $$V'_{02}=M'_0e^{j2\Phi'_{D0}}+M'_1e^{j2\Phi'_{D1}} \quad (3')$$

DELAYED THREE TIMES $$V'_{03}=M'_0e^{j3\Phi'_{D0}}+M'_1e^{j3\Phi'_{D1}} \quad (4')$$

DELAYED FOUR TIMES

Now employing equations (1') to (4') and solving in same manner as equation (1) to (4) for $M'_0$, $M'_1$ and $\Phi'_{D0}$, $\Phi'_{D1}$ in which $\Phi'_{D0}=\Phi_{D0}$ and $\Phi'_{D1}=\Phi_{D1}$ we are now to find $M'_0/M_0=X_{RO}$ and $M'_1/M_1=X_{RO}$ which is the detected position of 0 and 1 return gives estimate of peak in the range bin, are proportional to range of return 0 and return 1 respectively and $M_0$ and $M_1$ and both returns are detected in the same range bin (RB).

To get a more accurate determination, another range or ranges may be processed or a slight change in the range processed and results correlated for best results. The ratio of second set of data for close in range we will obtain a much more accurate range. Now we have another set of equations after a significant delay in time and perform the same operations as first set of data and determine the amplitude and phase change of the determination of the range bin data will give an estimate of the unambiguous velocity of the returns and from this the known peak of the returns the azimuth of the returns are calculated.

VE—Combination of multi pulse techniques where processing significant time later (multi-aperture and ΔR techniques)

The two techniques may employ the same data since in multi aperture technique each aperture data the ΔR techniques may be implemented and may be processed in any manner to correlate with other solutions. The following is a list of common solutions.
 1. Same solutions for all parameters such as the following:
  a) $\Phi_{D\ s}$, $\Phi_{A\ s}$ and $\Phi_s$ and M s and $X_{F\ s}$, $X_{R\ s}$ and $X_{H\ s}$
  b) solutions for position and velocity of respective returns
 2. Accuracy and robustness of solutions are enhanced VF—Combination of multi channel technique (multi-aperture and ΔZ—change in azimuth-techniques)

The two techniques may employ the same data since in multi aperture technique each aperture data the ΔZ techniques may be implemented and may be processed in any manner to facilitate a solution. The following is a list of common solutions.
 2. Same solutions for all parameters such as the following:
  a) $\Phi_{D\ s}$, $\Phi_{A\ s}$ and $\Phi_s$ and M s and $X_{F\ s}$, $X_{R\ s}$ and $X_{H\ s}$
  b) solutions for position and velocity of respective returns
 3. Accuracy and robustness of solutions are enhanced From the previous analysis for the one pulse system and that for the one channel system there is determined all the parameters of the returns the accurate position in range, azimuth and velocity and unambiguous radial velocity, horizontal and vertical tangential velocity, mover, noise, and other returns may be detected and thresholded for importance and later processed to determine if sidelobes, multipath targets, etc.

VG—Correlation Factors

1—Time delay as many pulses and process data and determines all $\Phi_s$.

2—Additional time delay data processed again and all $\Phi_s$ should agree

Figure 10:
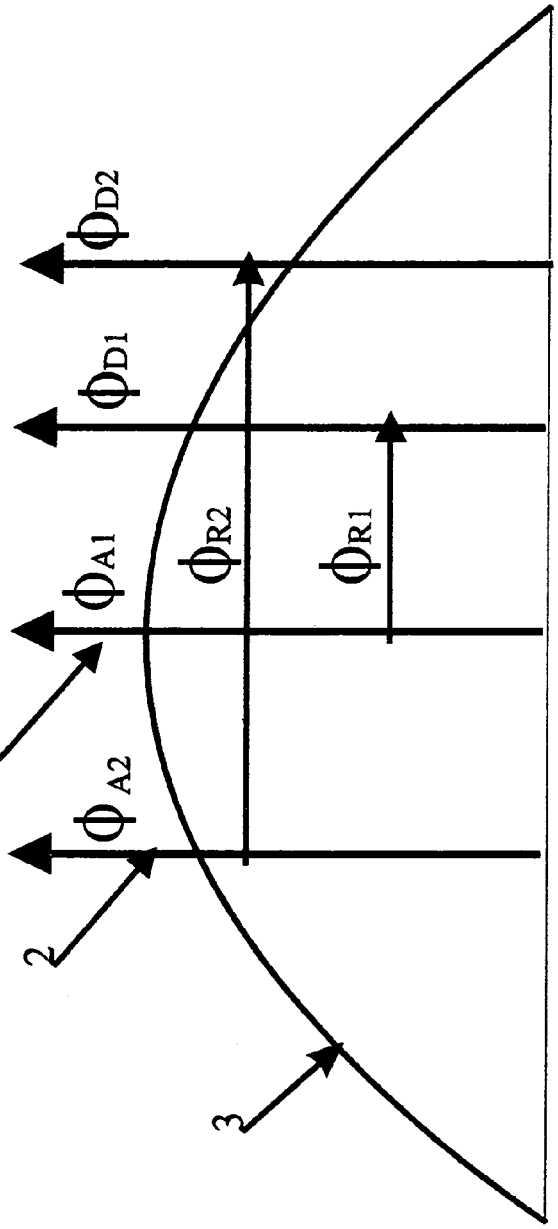
FIG. 10—depicts an exemplary illustration of a relationship of detection phase to radial velocity phase to azimuth phase in accordance with the invention.

3—Other RDB processed have same return data related to each such as mover should agree 4—Other techniques as to be shown later in document and results should agree VH—The aforementioned system has many advantages but the outstanding are as the following
 1—Channel matching is not a problem since only one channel is employed
 2—Dwell Time is reduced dramatically due to the minimum of only one pulse required limited by the processor to perform the necessary functions.
 3—Returns and clutter do not compete with each other in the resulting processing and therefore clutter and returns are thresholded separately and returns are ideally are competing with white noise only and make for an excellent return ratio to noise.
 4—One pulse system is very simple system-less storage-less processing-more hardware due to RF front end and A/D converter required for every channel or groups of channels.
 5—May be applied to one pulse or two or more pulses to give more than one solution and they should be very close to each other. Each processed as one pulse system and should have same results and correlated.
 6—The significance of the ability to process many returns in same RDB and determining there amplitude and phases and radial velocity gives the ability to separate clutter and other returns such as bona fide movers, moving clutter, multipath returns, etc. Data base of returns and the mathematical basis and knowledge aided information would aid in categorizing these returns.
 7—If more than one pulse implemented than the results of each pulse should be the same or close to the same. If a different transmission frequency is accompanied by another pulse they can be close in time and process as another one pulse system without interfering with each other.
 8—If a number of pulses and a number of channels are employed with the delta T and delta C technique and correlated would make for excellent results.
 9. FIG. 10 illustrates the detection of two returns in the same bin.

VI—A Two PULSES at a time-"N"-Channels of data-two returns-$\Phi_D$ technique

The analysis may be performed with a one antenna transmit and two pulse system. This system is called ΔC methodology where the data will be delayed one or more channel increments in pulse 2 as required for a solution. We will consider two returns clutter and target and the "N" channel data (channel data) has been spectrum processed into its individual range azimuth bins (RABs) and each will be treated as follows: Each set of data, channel data point is delayed it is multiplied by a suitable weighting function and its spectrum is obtained with such as FFT. In processing a particular RAB where we have two returns we have the following equations:

$$V_{00}=M_0+M_1 \tag{1}$$

PULSE 1 CHANNEL data 1-N Delay 0

$$V_{00}=M_0 e^{j\Phi_{D0}}+M_1 e^{j\Phi_{D1}} \tag{2}$$

PULSE 1 CHANNEL data 2-N+1 Delay 1

$$V_{00}=M_0 e^{j2\Phi_{D0}}+M_1 e^{j2\Phi_{D1}} \tag{3}$$

PULSE 1 CHANNEL data 3-N+2 Delay 2

$$V_{00}=M_0 e^{j3\Phi_{D0}}+M_1 e^{j3\Phi_{D1}} \tag{4}$$

PULSE 1 CHANNEL data 4-N+3 Delay 3

Above equations are for two returns where $V_{00}$—is the return in the RAB being processed at time 1

$V_{01}$—is the return in the RAB being processed at time 2

$V_{02}$—is the return in the RAB being processed at time 3

$V_{03}$—is the return in the RAB being processed at time 4

$M_0$—is the first return vector $M_1$—is the second return vector $\Phi_{D0}$—is the phase of the first return where the phase is proportional to the phase due to radial velocity plus that due to the azimuth of the return.

$\Phi_{D1}$—is the phase of the second return where the phase is proportional to the radial velocity plus that due to the azimuth of the return It is noted with each delay in channel data the vectors of the returns phase is increased proportional to the delay which represents the phase of the return proportional to the velocity plus that due to its azimuth in the antenna beam. Zero velocity returns such as clutter will have phase shift equal to zero due to its velocity but one due to its azimuth position in the antenna beam and other returns will have phase shifts directly proportional to their radial velocity and one due to its azimuth position in the main beam. When returns are detected in the same RAB the sum of their phases ($\Phi_{D0}$ or $\Phi_{D1}$) (frequency) are in the same RAB and it is on this basis the returns are analyzed, processed and separated out.

Taking equations (1) and (2) and treating $M_0$ and $M_1$ as the variables and solving for $M_0$ and $M_1$ we have:

$$M_0 = (V_{00} e^{j\Phi_{D1}} - V_{01})/(e^{j\Phi_{D1}} - e^{j\Phi_{D0}}) \tag{1'}$$

$$M_1 = (V_{00} - V_{01} e^{j\Phi_{D0}})/(e^{j\Phi_{D1}} - e^{j\Phi_{D0}}) \tag{2'}$$

Taking equations (2) and (3) and treating as the variables and solving for $M_0 e^{j\Phi_{D0}}$ and $M_1 e^{j\Phi_{D1}}$ we have:

$$M_0 e^{j\Phi_{D0}} = (V_{01} e^{j\Phi_{D1}} - V_{02})/(e^{j\Phi_{D1}} - e^{j\Phi_{D0}}) \tag{1''}$$

$$M_1 e^{j\Phi_{D1}} = (V_{01} - V_{02} e^{j\Phi_{D0}})/(e^{j\Phi_{D1}} - e^{j\Phi_{D0}}) \tag{2''}$$

Equation (2")/Equation (2') or Equation (1")/Equation (1') are the following:

$$e^{j\Phi_{D0}} = (V_{01} e^{j\Phi_{D1}} - V_{02})/(V_{00} e^{j\Phi_{D1}} - V_{01}) \tag{3'}$$

$$e^{j\Phi_{D1}} = (V_{02} - V_{01} e^{j\Phi_{D0}})/(V_{01} - V_{00} e^{j\Phi_{D0}}) \tag{4'}$$

Equation (3') or Equation (4') is easily solved for $\Phi_{D0}$ and $\Phi_{D1}$ which are proportional to the total phase of return 0 and return 1 respectively. If return "Mo" is clutter then $\Phi_0 = 0$ corresponding to clutter having zero (0) velocity.

Now employing equations (1) and (2) and solving for $M_0$ and $M_1$ knowing $\Phi_{D0}$ and $\Phi_{D1}$ we are now to find $\Phi_0$ and $\Phi_1$ which are proportional to velocity of return 0 and return 1 respectively. $M_0$ and $M_1$ and both returns that are detected in the same RAB.

Having the second channel data and performing the same operations as in channel 1 and the equations are as follows:

$$V'_{00} = M_0 X_{01} + M_1 X_{11} \quad \text{PULSE 2 CHANNEL data } 1 - N \text{ Delay 0} \tag{1'}$$

$$V'_{01} = M_0 X_{01} e^{j\Phi'_{D0}} + M_1 X_{11} e^{j\Phi'_{D1}} \quad \text{PULSE 2 CHANNEL data } 2 - N + 1 \text{ Delay 1} \tag{2'}$$

$$V'_{02} = M_0 X_{01} e^{j2\Phi'_{D0}} + M_1 X_{11} e^{j2\Phi'_{D1}} \quad \text{PULSE 2 CHANNEL data } 3 - N + 2 \text{ Delay 2} \tag{3'}$$

$$V'_{03} = M_0 X_{01} e^{j3\Phi'_{D0}} + M_1 X_{11} e^{j3\Phi'_{D1}} \quad \text{PULSE 2 CHANNEL data } 4 - N + 3 \text{ Delay 3} \tag{4'}$$

$$X_{01} = e^{jD\Phi_{A0}} e^{jK_{D0} X_0} / W_{M0} = |1/A_{M0}| e^{j(K_{D0} X_0 - \Psi_{M0})} \quad \text{where } D = 0 \quad X_{01} = e^{jK_{D0} X_0} / W_{M0} = |1/A_{M0}| e^{j(K_{D0} X_0 \Psi_{M0})}$$

$$X_{11} = e^{jD\Phi_{A1}} e^{jK_{D0} X_1} / W_{M1} = |1/A_{M1}| e^{j(K_{D0} X_1 - \Psi_{M1})} \quad \text{where } D = 0 \quad X_{11} = e^{jK_{D0} X_1} / W_{M1} = |1/A_{M1}| e^{j(K_{D0} X_1 \Psi_{M1})}$$

Solving equations (1') to (4') in the same manner as equations (1) to (4) we solve for $\Phi'_{D0}$ and $\Phi'_{D1}$ and $M_0 X_{01}$ and $M_1 X_{11}$. $\Phi'_{D0}$ and $\Phi'_{D1}$ Solution should be the same as for $\Phi_{D0}$ and $\Phi_{D1}$ since in pulse 2 we have the same returns detected in the same RAB with the same velocity components.

soluion for $M_0 X_{01}$ and $M_1 X_{11}$ in pulse 2

/solving for $M_0$ and $M_1$ in pulse 1 yields $X_{01}$ and $X_{11}$

Having the second pulse data delayed and performing the same operations as in channel 1 and 2 and the equations are as follows:

$$V''_{00} = M_0 X_{02} + M_1 X_{12} \quad \text{PULSE 2 CHANNEL data } 2 - N + 1 \text{ Delay 1} \tag{1''}$$

$$V''_{01} = M_0 X_{02} e^{j\Phi''_{D0}} + M_1 X_{12} e^{j\Phi''_{D1}} \quad \text{PULSE 2 CHANNEL data } 3 - N + 2 \text{ Delay 2} \tag{2''}$$

$$V''_{02} = M_0 X_{02} e^{j2\Phi''_{D0}} + M_1 X_{12} e^{j2\Phi''_{D1}} \quad \text{PULSE 2 CHANNEL data } 4 - N + 3 \text{ Delay 3} \tag{3''}$$

$$V''_{03} = M_0 X_{02} e^{j3\Phi''_{D0}} + M_1 X_{12} e^{j3\Phi''_{D1}} \quad \text{PULSE 2 CHANNEL data } 5 - N + 4 \text{ Delay 4} \tag{4''}$$

$$X_{02} = X_{01} e^{j(\Phi_{A0} + \Delta K_{D0} X_0)} = X_{01} e^{j(Y_0)} : \quad X_{12} = X_{11} e^{j(\Phi_{A1} + \Delta K_{D0} X_1)} = X_{11} e^{j(Y_1)}$$

Rewriting equations (1") to (4") we have the following:

$$V''_{00} = M_0 X_{01} + M_1 X_{12} \quad \text{PULSE 2 CHANNEL data } 2 - N + 1 \text{ Delay 1} \tag{1''}$$

$$V''_{01} = M_0 X_{01} e^{j\Phi''_{D0}} + M_1 X_{12} e^{j\Phi''_{D1}} \quad \text{PULSE 2 CHANNEL data } 3 - N + 2 \text{ Delay 2} \tag{2''}$$

$$V''_{02} = M_0 X_{01} e^{j2\Phi''_{D0}} + M_1 X_{12} e^{j2\Phi''_{D1}} \quad \text{PULSE 2 CHANNEL data } 4 - N + 3 \text{ Delay 3} \tag{3''}$$

$$V''_{03} = M_0 X_{01} e^{j3\Phi''_{D0}} + M_1 X_{12} e^{j3\Phi''_{D1}} \quad \text{PULSE 2 CHANNEL data } 5 - N + 4 \text{ Delay 4} \tag{4''}$$

Solving equations (1") to (4") the same manner as equations (1) to (4) we solve for $\Phi'_{D0}$ and $\Phi'_{D1}$ and $M_0X_{01}$ and $M_1X_{11}$. $\Phi''_{D0}$ and $\Phi''_{D1}$ Solution should be the same.

solution for $M_0X_{01}e^{j\Gamma_0}$ and $M_1X_{11}e^{j\Gamma_1}$ in channel 2 delayed /solving for $M_0X_{01}$ and $M_1X_{11}$ in channel 2 yields $e^{j\Gamma_0}$ and $e^{j\Gamma_1}$ and $\Gamma_0 = \Phi_{A0} + \Delta K_{D0} X_0$ where $X_0$ is unknown and $\Gamma_0$ is known and therefore $\Phi_{A0}$ has to be determined $\Gamma_1 = \Phi_{A1} + \Delta K_{D0} X_1$ where $X_1$ is unknown and $\Gamma_1$ are known and therefore $\Phi_{A1}$ has to be determined Solving for phase proportional to velocity in both returns we have the following:

Finding $\Phi_{D0}$ and $\Phi_{D1}$ as in the channel technique and finding $\Phi_O = \Phi_{D0} - \Phi_{A0}$ and $\Phi_1 = \Phi_{D1} - \Phi_{A1}$ Definition of terms not defined previously:

ALL "V" TERMS ARE MEASURED TERMS.—

X01—CHANNEL 2 TERM THAT makes relates channel 2 to channel 1 for return 1

X02—CHANNEL 2 TERM THAT makes relates channel 2 to channel 1 for return 2

$\Delta K_{D0}$—The difference factor for different delays for return 1 and 2

$X_0$—The azimuth position in filter factor for return 1
$\Gamma_0$—The difference in angle between different delayed data of return 1

$\Gamma_1$—The difference in angle between different delayed data of return 2

$\Phi_{AO}$—phase proportional to azimuth of return 1

$\Phi_{A1}$—phase proportional to azimuth of return 2

$A_{M0}$—Amplitude balancing term between channel 1 and 2 for return 1

$A_{M1}$—Amplitude balancing term between channel 1 and 2 for return 2

$\Psi_{M0}$—Phase balancing term between channel 1 and 2 for return 1

$\Psi_{M1}$—Phase balancing term between channel 1 and 2 for return 2

Comments and observations on technique

1—All solutions $\Phi_{D0}$, $\Phi'_{D0}$, $\Phi''_{D0}$ should be equal and $\Phi_{D1}$, $\Phi'_{D1}$, $\Phi''_{D1}$ should be equal 2-Solving for M0 and M1 by this approach solves for the location of their peaks therefore they have a phase shift equal to zero at this point.

3—To solve for the channel balancing terms three sets of equations are required but for solving for velocity and azimuth only last two sets are required.

4—Correlate with other $\Delta C$ technique in the following manner:
  a) Same solution
  b) All variables are the same value such as M0, M1, ETC
  c) $\Delta F$, $\Delta R$ and $\Delta H$ Results should correlate Analogously a small change in range bin may be taken and we determine $X_{R0}$ and $X_{R1}$ which determines where the peak of the returns in range, this does not help in the evaluation in azimuth. Resolving velocity ambiguity with the taking of meaningful delay in time and processing again. Thus we can determine the peak of each return in range and azimuth to obtain the maximum amplitude for each return for further use. The change in amplitude and phase of the range bin in conjunction with a delay in time gives an accurate determination of velocity which will resolve velocity ambiguity.

The change in amplitude and phase of the doppler bin in conjunction with a delay in time gives an accurate determination of horizontal tangential velocity.

The change in amplitude and phase in the different linear arrays of the doppler bin in conjunction with a delay in time gives an accurate determination of vertical tangential velocity.

Thus we have obtained the three dimensional position and velocity of all returns.

B. Two pulse "N" channel data in time-three returns-$\Phi_D$ technique

The previous analysis was for two returns possible per RAB processed; this will be for three (3) returns per RAB.

$$V_{00} = M_0 + M_1 + M_2 \qquad \text{PULSE 1 CHANNEL data } 1 - N \text{ Delay} \qquad (1)$$

$$V_{01} = M_0 e^{j\Phi_{D0}} + M_1 e^{j\Phi_{D1}} + M_2 e^{j\Phi_{D2}} \qquad \text{PULSE 1 CHANNEL data } 2 - N + 1 \text{ Delay 1} \qquad (2)$$

$$V_{02} = M_0 e^{j2\Phi_{D0}} + M_1 e^{j2\Phi_{D1}} + M_2 e^{j2\Phi_{D2}} \qquad \text{PULSE 1 CHANNEL data } 3 - N + 2 \text{ Delay 2} \qquad (3)$$

$$V_{03} = M_0 e^{j3\Phi_{D0}} + M_1 e^{j3\Phi_{D1}} + M_2 e^{j3\Phi_{D2}} \qquad \text{PULSE 1 CHANNEL data } 4 - N + 3 \text{ Delay 3} \qquad (4)$$

All terms previously defined except the following:

$M_2$—Third return $\Phi_{D2}$—phase proportional to radial velocity plus azimuth of third return $\Phi_{A2}$—phase proportional to azimuth of third return $\Phi_2$—phase proportional to radial velocity of third return Taking equations (1) and (2) and (3) and treating $M_0$ and $M_1$ and $M_2$ as the variables and solving the determinant equation for $\Delta_0$ we have:

$$\Delta_0 = e^{j\Phi_0} \overset{1}{e^{j\Phi_1}} \overset{1}{e^{j\Phi_2}} 1 e^{j\Phi_1} e^{j\Phi_2} - 1 e^{j\Phi_0} e^{j\Phi_2} 1 e^{j\Phi_0} e^{j\Phi_1}$$

$$e^{j2\Phi_0} e^{j2\Phi_1} e^{j2\Phi_2} e^{j2\Phi_1} e^{j2\Phi_2} e^{j2\Phi_0} e^{j2\Phi_2} e^{j2\Phi_0} e^{j2\Phi_1}$$

-continued $$\Delta_0 = e^{j\Phi_{D1}}e^{j2\Phi_{D2}} - e^{j\Phi_{D2}}e^{j2\Phi_{D1}} - e^{j\Phi_{D0}}e^{j2\Phi_{D2}} - e^{j\Phi_{D2}}e^{j2\Phi_{D0}} + e^{j\Phi_{D0}}e^{j2\Phi_{D1}} - e^{j\Phi_{D1}}e^{j2\Phi_{D0}}$$

$$= \text{function of } \Phi_{D0}, \Phi_{D1} \text{ and } \Phi_{D2}$$

and solving for $\overline{M_0} = M_0 * \Delta_0$ $$\overline{M_0} = \begin{vmatrix} V_{00} & 1 & 1 \\ V_{01}e^{j\Phi_{D1}}e^{j\Phi_{D2}} \\ V_{02}e^{j2\Phi_{D1}} V e^{j2\Phi_{D2}} \end{vmatrix} = V_{00}e^{j\Phi_{D1}}e^{j\Phi_{D2}}\begin{vmatrix}1&1\\e^{j2\Phi_{D1}}&e^{j2\Phi_{D2}}\end{vmatrix} - V_{01}\begin{vmatrix}1&1\\e^{j2\Phi_{D1}}e^{j2\Phi_{D2}}&e^{j2\Phi_{D1}}e^{j2\Phi_{D2}}\end{vmatrix} + V_{02}\begin{vmatrix}1&1\\e^{j\Phi_{D1}}&e^{j\Phi_{D2}}\end{vmatrix} \quad (6)$$

$$\overline{M_0} = V_{00}(e^{j\Phi_{D1}}e^{j2\Phi_{D2}} - e^{j\Phi_{D2}}e^{j2\Phi_{D1}}) - V_{01}(e^{j2\Phi_{D2}} - e^{j2\Phi_{D1}}) + V_{02}(e^{j\Phi_{D2}} - e^{j\Phi_{D1}})$$

$$= \text{function of } \Phi_{D1} \text{ and } \Phi_{D2}$$

and solving for $\overline{M_1} = M_1 * \Delta_0$ $$\overline{M_1} = \begin{vmatrix} 1 & V_{00} & 1 \\ e^{j\Phi_{D0}} V_{01}e^{j\Phi_{D2}} \\ e^{j2\Phi_{D0}} V_{02} V e^{j2\Phi_{D2}} \end{vmatrix} = V_{00}e^{j\Phi_{D0}}e^{j\Phi_{D2}}\begin{vmatrix}1&1\\e^{j2\Phi_{D0}}&e^{j2\Phi_{D2}}\end{vmatrix} - V_{01}\begin{vmatrix}1&1\\e^{j2\Phi_{D0}}e^{j2\Phi_{D2}}&e^{j2\Phi_{D0}}e^{j2\Phi_{D2}}\end{vmatrix} + V_{02}\begin{vmatrix}1&1\\e^{j\Phi_{D0}}&e^{j\Phi_{D2}}\end{vmatrix} \quad (7)$$

$$\overline{M_1} = V_{01}(e^{j\Phi_{D0}}e^{j2\Phi_{D2}} - e^{j2\Phi_{D0}}e^{j\Phi_{D2}}) - V_{01}(e^{j2\Phi_{D2}} - e^{j2\Phi_{D0}}) + V_{02}(e^{j\Phi_{D2}} - e^{j\Phi_{D0}})$$

$$= \text{function of } \Phi_{D0} \text{ and } \Phi_{D2}$$

and solving for $\overline{M_2} = M_2 * \Delta_0$ $$\overline{M_2} = \begin{vmatrix} 1 & 1 & V_{00} \\ e^{j\Phi_{D0}} e^{j\Phi_{D1}} V_{01} \\ e^{j2\Phi_{D0}} V e^{j2\Phi_{D1}} V_{02} \end{vmatrix} = V_{00}e^{j\Phi_{D0}}e^{j\Phi_{D1}}\begin{vmatrix}1&1\\e^{j2\Phi_{D0}}&e^{j2\Phi_{D1}}\end{vmatrix} - V_{01}\begin{vmatrix}1&1\\e^{j2\Phi_{D0}}e^{j2\Phi_{D1}}&e^{j2\Phi_{D0}}e^{j2\Phi_{D1}}\end{vmatrix} + V_{02}\begin{vmatrix}1&1\\e^{j\Phi_{D0}}&e^{j\Phi_{D1}}\end{vmatrix} \quad (8)$$

$$\overline{M_2} = V_{00}(e^{j\Phi_{D0}}e^{j2\Phi_{D1}} - e^{j\Phi_{D1}}e^{j2\Phi_{D0}}) - V_{01}(e^{j2\Phi_{D1}} - e^{j2\Phi_{D0}}) + V_{02}(e^{j\Phi_{D1}} - e^{j\Phi_{D0}})$$

$$= \text{function of } \Phi_{D0} \text{ and } \Phi_{D1}$$

Solving for $\Phi_{D0}$, $\Phi_{D1}$ and $\Phi_{D2}$ and substituting these values in equations (1), (2) and (3) we determine $M_0$, $M_1$ and $M_2$.

Taking equations (2), (3) and (4) and treating $M_0 e^{jD\Phi_0}$, $M_1 e^{jD\Phi_1}$ and $M_2 e^{jD\Phi_2}$ as the variables and solving the determinant equation for $\Delta_0$ is the same and performing the same operations as with the first set of equations we have the following:

($\overline{6}$) $M_0 e^{j\Phi_{D0}}$ = function of($\Phi_{D1},\Phi_{D2}$)

($\overline{7}$) $M_1 e^{j\Phi_{D1}}$ = function of($\Phi_{D0},\Phi_{D2}$)

($\overline{8}$) $M_2 e^{j\Phi_{D2}}$ = function of($\Phi_{D0},\Phi_{D1}$)

Equation $(\overline{6})/(6)$, $(\overline{7})/(7)$ and $(\overline{8})/(8)$ $(\overline{6})/(6) = e^{j\Phi_{D0}}$ = function($\Phi_{D1},\Phi_{D2}$)

$(\overline{7})/(7) = e^{j\Phi_{D1}}$ = function($\Phi_{D0},\Phi_{D2}$)

$(\overline{8})/(8) = e^{j\Phi_{D2}}$ = function($\Phi_{D0},\Phi_{D1}$)

Solving for $\Phi_{D0}$, $\Phi_{D1}$ and $\Phi_{D2}$ and substituting these values in equations (2), (3) and (4) we determine $M_0 e^{jD\Phi_0}$, $M_1 e^{jD\Phi_1}$ and $M_2 e^{jD\Phi_2}$.

$$V'_{00} = M_0 X_{01} + M_1 X_{11} + M_2 X_{21} \qquad \text{PULSE 2 CHANNEL data 1-}N \text{ Delay 0} \quad (1')$$

$$V'_{01} = M_0 X_{01} e^{j\Phi'D0} + M_1 X_{11} e^{j\Phi'D1} + M_2 X_{21} e^{j\Phi'D2} \qquad \text{PULSE 2 CHANNEL data 2-}N+1 \text{ Delay 1} \quad (2')$$

$$V'_{02} = M_0 X_{01} e^{j2\Phi'D0} + M_1 X_{11} e^{j2\Phi'D1} + M_2 X_{21} e^{j2\Phi'D2} \qquad \text{PULSE 2 CHANNEL data 3-}N+2 \text{ Delay 2} \quad (3')$$

$$V'_{03} = M_0 X_{01} e^{j3\Phi'D0} + M_1 X_{11} e^{j3\Phi'D1} + M_2 X_{21} e^{j3\Phi'D2} \qquad \text{PULSE 2 CHANNEL data 4-}N+3 \text{ Delay 3} \quad (4')$$

$$X_{01} = e^{jD\Phi_{A0}} e^{jK_{D0} X_0}/W_{M0} = |1/A_{M0}|e^{j(K_{D0}X_0 \Psi_{M0})} \text{ where } D=0 \;\; X_{01} = e^{jK_{D0}X_0}/W_{M0} = |1/A_{M0}|e^{j(K_{D0}X_0 \Psi_{M0})}$$

$$X_{11} = e^{jD\Phi_{A1}} e^{jK_{D0} X_1}/W_{M1} = |1/A_{M1}|e^{j(K_{D0}X_1 \Psi_{M1})} \text{ where } D=0 \;\; X_{11} = e^{jK_{D0}X_0}/W_{M1} = |1/A_{M1}|e^{j(K_{D0}X_1 \Psi_{M1})}$$

$$X_{21} = e^{jD\Phi_{A2}} e^{jK_{D0} X_2}/W_{M2} = |1/A_{M2}|e^{j(K_{D0}X_2 \Psi_{M2})} \text{ where } D=0 \;\; X_{12} = e^{jK_{D0}X_0}/W_{M1} = |1/A_{M2}|e^{j(K_{D0}X_2 \Psi_{M2})}$$

Performing the same operations on equations (1'), (2') and (3') with the variables $M_0X_{01}$, $M_1X_{11}$ and $M_2X_{21}$ and $\Delta_0$ remains the same. The analysis is analogous and the result is the following:

and solving for $\overline{M_0X_{01}} = M_0X_{01} * \Delta_0$ $$\overline{M_0X_{01}} = V_{01}(e^{j\Phi'_{D1}}e^{j2\Phi'_{D2}} - e^{j2\Phi'_{D1}}e^{j\Phi'_{D2}}) - V_{02}(e^{j2'\Phi_{D1}} - e^{j2\Phi'_{D2}}) + V_{03}(e^{j\Phi'_{D1}} - e^{j\Phi'_{D2}})$$

= function of $\Phi'_{D1}$ and $\Phi'_{D2}$  (6')

and solving for $\overline{M_1X_{11}} = M_1X_{11} * \Delta_0$ $$V_{01}(e^{j\Phi'_{d0}}e^{j2\Phi'_{D2}} - e^{j2\Phi'_{D0}}e^{j\Phi'_{D2}}) - V_{02}(e^{j2'\Phi_{D0}} - e^{j2\Phi'_{D2}}) + V_{03}(e^{j\Phi'_{D0}} - e^{j\Phi'_{D2}})$$

= function of $\Phi'_{D0}$ and $\Phi'_{D2}$  (7')

and solving for $\overline{M_2X_{21}} = M_2X_{21} * \Delta_0$ $$\overline{M_2X_{21}} = V_{01}(e^{j\Phi'_{D0}}e^{j2\Phi'_{D1}} - e^{j2\Phi'_{D0}}e^{j\Phi'_{D1}}) - V_{02}(e^{j2'\Phi_{D1}} - e^{j2\Phi'_{D0}}) + V_{03}(e^{j\Phi'_{D1}} - e^{j\Phi'_{D0}})$$

= function of $\Phi'_{D0}$ and $\Phi'_{D1}$  (8')

Taking equation (6')/(6) we have the following:

$$X_{01} = M_0X_{01}/M_0$$

Taking equation (7')/(7) we have the following:

$$X_{11} = M_1X_{11}/M_1$$

Taking equation (8')/(8) we have the following:

$$X_{21} = M_2X_{21}/M_2$$

Performing the same operations on equations (2'), (3') and (4') with the variables $M_0X_{01}$, $M_1X_{11}$ and $M_2X_{21}$ and $\Delta_0$ remains the same. The analysis is analogous and the result is the following:

$(\overline{6'})M_0e^{j\Phi_{D0}}$ = function of $(\Phi_{D1}, \Phi_{D2})$ $(\overline{7'})M_1e^{j\Phi_{D1}}$ = function of $(\Phi_{D0}, \Phi_{D2})$ $(\overline{8'})M_2e^{j\Phi_{D2}}$ = function of $(\Phi_{D0}, \Phi_{D1})$ Equation $(\overline{6'})/(6')$, $(\overline{7'})/(7')$ and $(\overline{8'})/(8')$ $(\overline{6'})/(6') = e^{j\Phi_{D0}}$ = function$(\Phi_{D1}, \Phi_{D2})$ $(\overline{7'})/(7') = e^{j\Phi_{D1}}$ = function$(\Phi_{D0}, \Phi_{D2})$ $(\overline{8'})/(8') = e^{j\Phi_{D2}}$ = function$(\Phi_{D0}, \Phi_{D1})$ Solving for $\Phi_{D0}$, $\Phi_{D1}$ and $\Phi_{D2}$ and substituting these values in equations (2), (3) and (4) we determine $M_0X_{01}$, $M_1X_{02}$ and $M_2X_{03}$.

Taking the next set of equations as follows:

$$V''_{00} = M_0X_{02} + M_1X_{12} + M_2X_{22} \quad \text{PULSE 2 CHANNEL data } 2\text{-}N+1 \text{ Delay } 0 \quad (1'')$$

$$V''_{01} = M_0X_{02}e^{j\Phi'_{D0}} + M_1X_{12}e^{j\Phi'_{D1}} + M_2X_{22}e^{j\Phi'_{D2}} \quad \text{PULSE 2 CHANNEL data } 3\text{-}N+2 \text{ Delay } 1 \quad (2'')$$

$$V''_{02} = M_0X_{02}e^{j2\Phi'_{D0}} + M_1X_{12}e^{j2\Phi'_{D1}} + M_2X_{22}e^{j2\Phi'_{D2}} \quad \text{PULSE 2 CHANNEL data } 4\text{-}N+3 \text{ Delay } 2 \quad (3'')$$

$$V''_{03} = M_0X_{02}e^{j3\Phi'_{D0}} + M_1X_{12}e^{j3\Phi'_{D1}} + M_2X_{21}e^{j3\Phi'_{D2}} \quad \text{PULSE 2 CHANNEL data } 5\text{-}N+4 \text{ Delay } 3 \quad (4'')$$

$$X_{02} = X_{01}e^{j(\Phi_0 + \Delta K_{D0}X_0)} = X_{01}e^{j(\theta_0)} : X_{12} = X_{11}e^{j(\Phi_1 + \Delta K_{D0}X_0)} = X_{11}e^{j(\theta_1)} : X_{22} = X_{21}e^{j(\Phi_2 + K_{D0}X_0)} = X_{21}e^{j(\theta_2)}$$

Rewriting equations (1" to 4") we have the following:

$$V''_{00} = M_0X_{01}e^{j\theta_0} + M_1X_{11}e^{j\theta_1} + M_2X_{12}e^{j\theta_2} \quad \text{PULSE 2 CHANNEL data } 2\text{-}N+1 \text{ Delay } 1 \quad (1'')$$

$$V''_{01} = M_0X_{01}e^{j\theta_0}e^{j\Phi'_{D0}} + M_1X_{11}e^{j\theta_1} \quad \text{PULSE 2 CHANNEL data } 3\text{-}N+2 \text{ Delay } 2 \quad (2'')$$

$$V''_{02} = M_0X_{02}e^{j2\Phi'_{D0}} + M_1X_{12}e^{j2\Phi'_{D1}} + M_2X_{22}e^{j2\Phi'_{D2}} \quad \text{PULSE 2 CHANNEL data } 4\text{-}N+3 \text{ Delay } 3 \quad (3'')$$

$$V''_{03} = M_0X_{02}e^{j3\Phi'_{D0}} + M_1X_{12}e^{j3\Phi'_{D1}} + M_2X_{21}e^{j3\Phi'_{D2}} \quad \text{PULSE 2 CHANNEL data } 5\text{-}N+4 \text{ Delay } 4 \quad (4'')$$

Performing the same operations on equations (1"), (2") and (3") with the variables $M_0X_{01}e^{jT_0}$, $M_1X_{11}e^{jT_1}$ and $M_2X_{21}e^{jT_2}$ and $\Delta_0$ remains the same. The analysis is analogous and the result is the following:

and solving for $\overline{M_0X_{01}e^{jT_0}} = M_0X_{01}e^{jT_0*}\Delta_0$ $$\frac{\overline{M_0X_{01}}}{e^{jT_0}} = V''_{02}(e^{j\Phi'_{D1}}e^{j2\Phi'_{D2}} - e^{j2\Phi'_{D1}}e^{j\Phi'_{D2}}) - V''_{03}(e^{j2\Phi_{D1}} - e^{j2\Phi_{D2}}) + V_{04}(e^{j\Phi'_{D1}} - e^{j\Phi'_{D2}})$$

$$= \text{function of } \Phi''_{D1} \text{ and } \Phi''_{D2}$$

and solving for $\overline{M_1X_{11}e^{jT_1}} = M_1X_{11}e^{jT_1*}\Delta_0$ $$\overline{M_1X_{11}}e^{jT_1} = V_{02}(e^{j\Phi''_{D0}}e^{j2\Phi''_{D2}} - e^{j2\Phi''_{D0}}e^{j\Phi''_{D2}}) - V_{03}(e^{j2\Phi''_{D0}} - e^{j2\Phi''_{D2}}) + V_{04}(e^{j\Phi''_{D0}} - e^{j\Phi''_{D2}})$$

$$= \text{function of } \Phi'_{D0} \text{ and } \Phi'_{D2} \quad (7'')$$

and solving for $\overline{M_2X_{21}e^{jT_2}} = M_2X_{21}e^{jT_2*}\Delta_0$ $$\overline{M_2X_{21}}e^{jT_2} = V_{02}(e^{j\Phi''_{D0}}e^{j2\Phi''_{D1}} - e^{j2\Phi''_{D0}}e^{j\Phi''_{D1}}) - V_{03}(e^{j2\Phi''_{D1}} - e^{j2\Phi''_{D0}}) + V_{04}(e^{j\Phi''_{D1}} - e^{j\Phi''_{D0}})$$

$$= \text{function of } \Phi''_{D0} \text{ and } \Phi''_{D1} \quad (8'')$$

Taking equation (6")/(6') we have the following:

$$e^{jT_0} = M_0X_{01}e^{jT_0}/M_0X_{01} =$$

$$V''_{02}(e^{j\Phi'_{D1}}e^{j2\Phi'_{D2}} - e^{j2\Phi'_{D1}}e^{j\Phi'_{D2}}) - V''_{03}(e^{j2\Phi'_{D1}} - e^{j2\Phi'_{D2}}) + V''_{04}(e^{j\Phi'_{D1}} - e^{j\Phi'_{D2}})/$$

$$V_{01}(e^{j\Phi'_{D1}}e^{j2\Phi'_{D2}} - e^{j2\Phi'_{D1}}e^{j\Phi'_{D2}}) - V_{02}(e^{j2\Phi'_{D1}} - e^{j2\Phi'_{D2}}) + V_{03}(e^{j\Phi'_{D1}} - e^{j\Phi'_{D2}}) \quad (12)$$

Taking equation (7")/(7') we have the following:

$$e^{jT_1} = M_1X_{11}e^{jT_1}/M_1X_{11} =$$

$$V_{02}(e^{j\Phi''_{D0}}e^{j2\Phi''_{D2}} - e^{j2\Phi''_{D0}}e^{j\Phi''_{D2}}) - V_{03}(e^{j2\Phi''_{D0}} - e^{j2\Phi''_{D2}}) + V_{04}(e^{j\Phi''_{D0}} - e^{j\Phi''_{D2}})/$$

$$V_{01}(e^{j\Phi'_{D0}}e^{j2\Phi'_{D2}} - e^{j2\Phi'_{D0}}e^{j\Phi'_{D2}}) - V_{02}(e^{j2\Phi'_{D0}} - e^{j2\Phi'_{D2}}) + V_{03}(e^{j\Phi'_{D0}} - e^{j\Phi'_{D2}}) \quad (13)$$

Taking equation (8")/(8') we have the following:

$$e^{jT_2} = M_2X_{21}e^{jT_2}/M_2X_{21} =$$

$$V_{02}(e^{j\Phi''_{D0}}e^{j2\Phi''_{D1}} - e^{j2\Phi''_{D0}}e^{j\Phi''_{D1}}) - V_{03}(e^{j2\Phi''_{D1}} - e^{j2\Phi''_{D0}}) + V_{04}(e^{j\Phi''_{D1}} - e^{j\Phi''_{D0}})/$$

$$V_{01}(e^{j\Phi'_{D0}}e^{j2\Phi'_{D2}} - e^{j2\Phi'_{D0}}e^{j\Phi'_{D2}}) - V_{02}(e^{j2\Phi'_{D0}} - e^{j2\Phi'_{D2}}) + V_{03}(e^{j\Phi'_{D0}} - e^{j\Phi'_{D2}}) \quad (14)$$

Performing the same operations on equations (2"), (3") and (4") with the variables $M_0X_{01}e^{j\theta_0}$, $M_1X_{11}e^{j\theta_1}$ and $M_2X_{21}e^{j\theta_2}$ and $\Delta_0$ remains the same Substituting equation (13) into equation (12) we have the following:

The analysis is analogous and the result is the following:

$$(\overline{6''})M_0e^{j\Phi_{D0}} = \text{function of}(\Phi_{D1},\Phi_{D2})$$

$$(\overline{7''})M_1e^{j\Phi_{D1}} = \text{function of}(\Phi_{D0},\Phi_{D2})$$

$$(\overline{8''})M_2e^{j\Phi_{D2}} = \text{function of}(\Phi_{D0},\Phi_{D1})$$

Equation $(\overline{6''})/(6'')$, $(\overline{7''})/(7'')$ and $(\overline{8''})/(8'')$ $$(\overline{6''})/(6'') = e^{j\Phi_{D0}} = \text{function}(\Phi_{D1},\Phi_{D2})$$

$$(\overline{7''})/(7'') = e^{j\Phi_{D1}} = \text{function}(\Phi_{D0},\Phi_{D2})$$

$$(\overline{8''})/(8'') = e^{j\Phi_{D2}} = \text{function}(\Phi_{D0},\Phi_{D1})$$

Solving for $\Phi_{D0}$, $\Phi_{D1}$ and $\Phi_{D2}$ and substituting these values in equations (2), (3) and (4) we determine $M_0X_{00}e^{jT_0}$, $M^1X_{01}e^{jT_1}$ and $M_2X_{02}e^{j\gamma_1}$ and we have determined $\gamma_1$, $\gamma_2$ and $\gamma_3$ and $\gamma_0 = \Phi_{A0} + \Delta K_{D0}X_0$: $\gamma_1 = \Phi_{A1} + \Delta K_{D0}X_1$: $\gamma_2 = \Phi_{A2} + \Delta K_{D0}X_2$ where everything is known except $\Phi_{A0}$, $\Phi_{A1}$ and $\Phi_{A2}$ are easily determined and having to determine $\Phi_{D0}$ and $\Phi_{D1}$ and $\Phi_{D2}$ as in the two return case since $\Phi_0 = \Phi_{D0} - \Phi_{A0}$: $\Phi_1 = \Phi_{D1} - \Phi_{A1}$: $\Phi_2 = \Phi_{D2} - \Phi_{A2}$ the velocity of the returns have been attained.

$$e^{j\gamma_0} = M_0X_{00}e^{j\gamma_0}/M_0X_{00}$$

$$e^{j\gamma_1} = M_1X_{01}e^{j\gamma_1}/M_1X_{01}$$

$$e^{j\gamma_2} = M_2X_{02}e^{j\gamma_2}/M_2X_{02}$$

Substituting equation (13) into equation (12) we have the following:

Same Solution as in Two Channel Section B1 for $\Phi_0$, $\Phi_1$ and $\Phi_2$ and for the Assist in Determining Solutions when the Number of Returns are Three or More $M_0$, $M_1$ and $M_2$ and the ratios of the $M'_0/M_0$, $M'_1/M_1$ and $M'_2/M_2$ should give a good estimate of where the position $\Phi_{D0}$ and $\Phi_{D1}$ and $\Phi_{D2}$ is detected at that RAB.

From this an estimate of velocity of the returns are determined.

From the ratio of the second set of data to the first set of data we obtain XF0 and XF1 and XF2 from which is the ratio of $M'_0/M_0 = X_{F0}$ and $M'_1/M_1 = X_{F1}$ and $M'_2/M_2 = X_{F2}$ where all other terms are known. From the previous determinations of the estimate $\Phi_{D0}$ and $\Phi_{D1}$ and $\Phi_{D2}$ which is the position in the filter where the returns are detected at there peak in the RAB. This gives a good estimate of the azimuth of the returns. To get more accurate determinations other close frequency points to initially processed data are processed.

From XF0 an estimate of where the returns are detected at there peak in the RDB. From the following equation $\Phi_0 = \Phi_{D0} - \Phi_{A0}$ where $\Phi_{0A}$ is the phase of the return proportional to the azimuth of the return, and $\Phi_{D0}$ is the phase of the return proportional to the peak of the return, $\Phi_0$ is the phase of the return proportional to the velocity of the return.

Similarly this is performed for XF1 and XF2 hence finding the azimuth of the second and third return.

Analogously a small change in range bin may be taken and we determine XR0, XR1 and XR2 which determines where the peak of the returns in range, this does not help in the evaluation in azimuth. Resolving velocity ambiguity with the taking of meaning delay in time and processing again. Thus we can determine the peak of each return in range and azimuth to obtain the maximum amplitude for each return for further use. A more accurate determination of $\Phi_{D0}$, $\Phi_{D1}$ and $\Phi_{D2}$ is determined by taking the four sets of equations and employing the candidate $\Phi$ technique substituting all possible solutions which are restricted to the values that can be in only one range azimuth bin (RAB) but for when greater accuracy is required the number of candidate solutions increase. The candidate solutions should be very close in value for all four sets of data giving very robust and accurate solutions which determines all the parameters of the returns.

Also another correlating and checking operation is to repeat the processing with a close frequency and the results should be very close plus obtaining and obtaining change in return vector (XF). This would be the same for all sets of four sets of data and also would be a check on the $\Phi_{D0}$, $\Phi_{D1}$ and $\Phi_{D2}$ solutions.

Analogously this would process a close sample in the range direction and also for processing other linear arrays.

RECAPPING—We have determined all $\Phi_s$, in the two return and three return case and as consequently it may be performed for many $\Phi_s$. The significance of this development is as each RAB that is processed clutter, target, noise, and other returns may be detected and thresholded for importance and later processed to determine if sidelobes, multipath targets, etc.

Correlation Factors

1—Time delay as many pulses at a time as the number of returns and process data determine all the $\Phi_s$.

2—Additional channel delay processed again and all $\Phi_s$ should agree

3—Other RAB processed have same return data related to each such as mover should agree 4—IF more than two pulses other dual pulses is processed and results should agree.

5—Other techniques as to be shown later in document and results should agree

6—If a planar array is implemented all other linear arrays should obtain the same results and height and vertical tangential velocity obtained.

The aforementioned system has many advantages such as the following:

1—No clutter cancellation of any kind is required therefore as follows:
 a) no clutter covariance matrix
 b) no training data
 c) no special clutter knowledge required 2—No channel matching required 3—Returns and clutter do not compete with each other in there detection and therefore clutter and returns are thresholded separately and returns are ideally are competing with white noise only and make for an excellent return ratio to noise.

4—Disadvantage many channels-radar receiver front end and a/d converter for each channel 5—Full transmit and receive antenna employed with there full antenna gains
 a) smaller antenna sidelobes
 b) full antenna gain
 c) narrow clutter band width 6—May be applied to two pulses and two pulses or three pulses. Each dual pulse processed as two pulse system and should have same results and correlated.

7—Correlation factors as stated in previous paragraph.

8—The significance of the ability to process many returns in same RAB and determining there amplitude and phases and radial velocity gives the ability to separate clutter and either returns such as bona fide targets, moving clutter, multi path returns, etc. Knowledge aided information would aid in categorizing these returns.

VII—A Dual Pulse at a Time Many Channel System-Second Pulse Channel Delay-Delta C-DPCA Like Operation As in the two channel-many pulse system the two pulse many channel system described previously as the relation between them as a duality this is also true in this case and will be illustrated here for the two return case only. The dual pulse many channel system is a duality with the dual channel many pulse system.

Same comments as at end of two return case.

We will now analyze the various DPCA type delay in the $\Delta C$ methodologies, where only two pulses will be employed. The second pulse will have a number of DPCA type delays $\Delta C$ and starting at zero ("0") and going up to two (2). It does not have to start at zero; it may start at any convenient delay and continue to as many as required. Only two returns will be considered in this analysis.

Mathematic Development (Two Returns)

$$V_{00} = M_0 + M_1 \qquad \text{PULSE 1-} \qquad (1)$$

$$V_{01} = M_0 X_{01} + M_1 X_{11} \qquad \text{PULSE 2-}\Delta C \text{ DELAY 0} \qquad (2)$$

$$V_{02} = M_0 X_{02} e^{j\Phi_{A0}} + M_1 X_{12} e^{j\Phi_{A1}} \qquad \text{PULSE 2-}\Delta C \text{ DELAY 1} \qquad (3)$$

$$V_{03} = M_0 X_{03} e^{j2\Phi_{A0}} + M_1 X_{13} e^{j2\Phi_{A1}} \qquad \text{PULSE 2-}\Delta C \text{ DELAY 2} \qquad (4)$$

$$V_{04} = M_0 X_{04} e^{j3\Phi_{A0}} + M_1 X_{14} e^{j3\Phi_{A1}} \qquad \text{PULSE 2-}\Delta C \text{ DELAY 3} \qquad (5)$$

The following is the further definition of Xs in light of the different DPCA delays.

$$X_{01} = e^{jD\Phi_{A0}}/W_{M0} \text{ at } D=0: A_0=1/W_{M0}=1/A_{M0}e^{-j(\Psi_{M0}+K^{D0}X_0)}$$

$$X_{01} = A_0$$

$$X_{02} = A_0 e^{j(\Phi_{A0}+\Delta K_{D0}X_0)} = A_0 e^{j\gamma_0}$$

$$X_{03} = A_0 e^{j2\gamma_0}$$

$$X_{04} = A_0 e^{j3\gamma_0}$$

Also in similar manner $$X_{11} = e^{jD\Phi_{A1}}/W_{M1} \text{ at } D=0: A_1=1/W_{M1}=1/A_{M1}e^{-j(\Psi_{M1}+K^{D0}X_1)}$$

$$X_{11} = A_1$$

$$X_{12} = A_1 e^{j(\Phi_{A1}+\Delta K_{D0}X_1)} = A_1 e^{j\gamma_1}$$

$$X_{13} = A_1 e^{j2\gamma_1}$$

$$X_{14} = A_1 e^{j3\gamma_1}$$

We will now rewrite the five equations above with it incorporated.

$$V_{00} = M_0 + M_1 \qquad \text{PULSE 1-TIME 1} \qquad (1')$$

$$V_{01} = M_0 A_0 + M_1 A_1 \qquad \text{PULSE 2-}\Delta C\text{-DPCA DELAY 0} \qquad (2')$$

$$V_{02} = M_0 A_0 e^{j\gamma_0} + M_1 A_1 e^{j\gamma_1} \qquad \text{PULSE 2-}\Delta C\text{-DPCA DELAY 1} \qquad (3')$$

$$V_{03} = M_0 A_0 e^{j2\gamma_0} + M_1 A_1 e^{j2\gamma_1} \qquad \text{PULSE 2-}\Delta C\text{-DCPA DELAY 2} \qquad (4')$$

$$V_{04} = M_0 A_0 e^{j3\gamma_0} + M_1 X_1 e^{j3\gamma_1} \qquad \text{PULSE 2-}\Delta C\text{-DCPA DELAY 3} \qquad (5')$$

Employing equations (2') and (3') and the variables $M_0 A_0$ and $M_1 A_1$ and solving for $\gamma_0$ and $\gamma_1$ we have the following:

$$M_0 A_0 = (V_{01} e^{j\gamma_1} - V_{02})/(e^{j\gamma_1} - e^{j\gamma_0}) \qquad (2'')$$

$$M_1 A_1 = (V_{02} - V_{01} e^{j\gamma_0})/(e^{j\theta_1} - e^{j\gamma_0}) \qquad (3'')$$

Employing equations (3') and (4') and the variables MoAo $e^{j\gamma_0}$ and M1A1$e^{j\gamma_1}$ and solving for $\gamma_0$ and $\gamma_1$ we have the following:

$$M_0A_0e^{j\gamma_0}=(V_{02}e^{j\gamma_1}-V_{03})/(e^{j\gamma_1}-e^{j\gamma_0}) \quad (2''')$$

$$M_1A_1e^{j\gamma_1}=(V_{03}-V_{02}e^{j\gamma_0})/(e^{j\gamma_1}-e^{j\gamma_0}) \quad (3''')$$

Next take equation (2''')/(2'') and equation (3''')/(3'') we have the following:

$$e^{j\gamma_0}=(V_{02}e^{j\gamma_1}-V_{03})/(V_{01}e^{j\gamma_1}-V_{02}) \quad (6')$$

$$e^{j\gamma_1}=(V_{03}-V_{02}e^{j\gamma_0})/(V_{02}-V_{01}e^{j\gamma_0}) \quad (7')$$

Equation (6') or equation (7') may be solved for $\gamma_0$ and $\gamma_1$ and consequently $\Phi_{A0}$ and $\Phi_{A1}$ and at this point the velocity may be determined with maximum error of a half of a azimuth bin since the returns peak within a halve of a doppler bin where detected. processing like the first frequency.

Taking equation (2'') and solving for MoAo since everything is known on right side of equation To attain much greater accuracy the returns position of there peaks will be endeavored to be found. This will be performed by inserting to zero fill and processing to attain a frequency close to first frequency and taking equivalent equation in second frequency and solving for M'oA'o since everything is known on right side of this equation.

The ratio of M'o/Mo equals XF0 which is the response to return in the RDB and gives an estimate where the peak of the return is in that RAB.

The ratio of A'o/Ao equals the difference between where frequencies are processed in that RDB. The actual distance is known.

$$A_0=1/W_{M0}=1/A_{M0}e^{-j(\Psi_{M0}+K_{D0}X_0)}$$

$$A'_0=1/W_{M0}=1/A_{M0}e^{-j(\Psi_{M0}+K_{D0}(X_0+\Delta X_0))}$$

Solving equation (2'')=$K_0e^{j\beta_0}$

Solving equivalent equation (2''')=$K'_0e^{j\beta'_0}$ $$M'_0/M_0=X_{F0}$$

$$A'_0M'_0/A_0M_0=X_{F0}e^{j\Delta K_{CM}\Delta x_0}$$

Therefore $|X_{F0}|=|K'_0/K_0|$ and angle of $(M'_0/M_0)=\beta'_0-\beta_0-\Delta K_{D0}\Delta x_0$ We this ratio the peak of first return is estimated ($\Phi_{D0}$) and from the equation $\Phi_{D0}$ and $\Phi_0$ where the azimuth of the return is calculated from the known or estimated $\Phi_{D0}$ and $\Phi_0$. If a better estimate of the peak of first return more samples of frequencies may be taken. The best accuracy obtained by getting the frequency sample at the peak of the return.

The analogous procedure would be undertaken for the second return.

This technique is the ΔC DPCA various delays plus and if additional accuracy is required or desired the addition samples at frequencies close to frequency processed is processed. It does not require any channel balancing and DPCA special processing and is very accurate.

Similarly another technique as in two channel technique to determine azimuths is to obtain radial velocities in the two pulse technique. Also similarly the channel balancing terms may be obtained.

B—Similar comments apply as in the two channels at a time since they are a duality of each other. The exchanging of $\Phi_S$ with $\Phi_{As}$ and solution thereof. The three return system is analogous of the other three return systems related to their related two return systems.

C—Advantages and Disadvantages of System

The aforementioned system has many advantages as the other systems but the outstanding are as the following 1—Channel matching is a problem but utilizing many channels reduces the effect.

2—Dwell time is reduced drastically due to the minimum of only two pulses required limited by the processor to perform the necessary functions.

3—Returns and clutter do not compete with each other in the resulting processing and therefore clutter and returns are thresholded separately and returns are ideally are competing with white noise only and make for an excellent return ratio to noise.

4—Very simple system-less storage-less processing-more hardware due to RF front end and A/D converter required for every channel.

5—May be applied to two or more pulses to give more than one solution and they should be very close to each other. Each processed as two pulse system and should have same results and correlated.

6—The significance of the ability to process many returns in same RDB and determining there amplitude and phases and radial velocity gives the ability to separate clutter and other returns such as bona fide movers, moving clutter, multi path returns, etc. Data base of returns and the mathematical basis and knowledge aided information would aid in categorizing these returns.

7—If more than two pulses are implemented than the results of each pulse should be the same or close to the same $V_{00}$—OUTPUT PULSE 1—ΔC=0

$V_{01}$—OUTPUT CHANNEL 2—AC DPCA DELAY O $V_{02}$—OUTPUT CHANNEL 2—AC DPCA DELAY 1

$V_{03}$—OUTPUT CHANNEL 2—AC DPCA DELAY 2

$V_{04}$—OUTPUT CHANNEL 2—AC DPCA DELAY 3

$X_{01}$—return equalizer between PULSE 1 and 2 for return 0-ΔC-DPCA delay 0

$X_{02}$—return equalizer between PULSE 1 and 2 for return 0-ΔC-DPCA delay 1

$X_{02}$—return equalizer between PULSE 1 and 2 for return 0-ΔC-DPCA delay 2

$X_{11}$—return equalizer between PULSE 1 and 2 for return 1-ΔC-DPCA delay 0

$X_{12}$—return equalizer between PULSE 1 and 2 for return 1-ΔC-DPCA delay 1

$X_{12}$—return equalizer between PULSE 1 and 2 for return 1-ΔC-DPCA delay 2

$W_{M0}$—RETURN 0 EQUALIZER BETWEEN PULSE 1 AND 2

$W_{M1}$—RETURN 1 EQUALIZER BETWEEN PULSE 1 AND 2

$A_{M0}$—AMPLITUDE 0 EQUALIZER BETWEEN PULSE 1 AND 2

$A_{M1}$—AMPLITUDE 1 EQUALIZER BETWEEN PULSE 1 AND 2

$\Psi_{MO}$—PHASE 0 EQUALIZER BETWEEN PULSE 1 AND 2

$\Psi_{M1}$—PHASE 1 EQUALIZER BETWEEN PULSE 1 AND 2

$W_{MO}$—RETURN 0 EQUALIZER BETWEEN PULSE 1 AND 2

$W_{M1}$—RETURN 1 EQUALIZER BETWEEN PULSE 1 AND 2

$A_{MO}$—AMPLITUDE 0 EQUALIZER BETWEEN PULSE 1 AND 2

$A_{M1}$-AMPLITUDE 1 EQUALIZER BETWEEN PULSE 1 AND 2

$\Psi_{MO}$—PHASE 0 EQUALIZER BETWEEN PULSE 1 AND 2

$\Psi_{M1}$—PHASE 1 EQUALIZER BETWEEN PULSE 1 AND 2

KDO—ΔC DPCA constant that makes returns equal

Ao—constant term of return o

A1—constant term of return 1

As can be observed there is a direct duality between two channels many pulse system and the two pulse many channel system. In the two channel many pulse system you are solving for the radial velocity of the returns ($\phi_s$) and calculate the azimuths ($\phi_{A\ s}$) and $\theta_s$ are the sum of $\phi_s$ and DPCA terms. All other terms are the same.

In the two pulse many channel system you are solving for the azimuth ($\phi_{A\ s}$) of the returns ($\phi_s$) and calculated the velocity and. $\gamma_s$ are the sum of $\phi A$ s and dpca terms.

Therefore the equations, etc may represent both systems with this noted such as in the claims.

VI-B Three returns are very analogous to other three return techniques

VI-C Combined techniques of section III and IV

D—Combining techniques of section III—Two pulses "N" channel system $\Phi_D$ technique and section IIII—ΔC technique—Two pulse "N" channel system The two techniques employ the same data and may be processed in any manner to facilitate a solution. The following is a list of common solutions and attributes.
1. Same solutions for all parameters such as the following:
   a) $\Phi_{D\ s}$, $\Phi_{A\ s}$ and $\Phi_s$ and M s and $X_{F\ s}$, $X_{R\ s}$ and $X_{H\ s}$
   b) $\Phi_{D\ s}$ have many same solutions in the $\Phi_D$ technique
   c) solutions for position and velocity of respective returns
2. $\Phi_D$ technique is more effective but requires more storage and processing but requires one less delay in data
3. Accuracy and robustness of solutions are enhanced
4. Appearance of a very practical system VIII—A—ONE CHANNEL SYSTEM—DELT R technique where the same as two channel system but only employing one channel and when $\Phi_D$ processing significant time later with the delta R technique the change in amplitude and phase shift of the return will determine the velocity of the return and consequently the azimuth of the return. This system requires a relatively high resolution in range to determine low velocity of returns.

Figure 11:
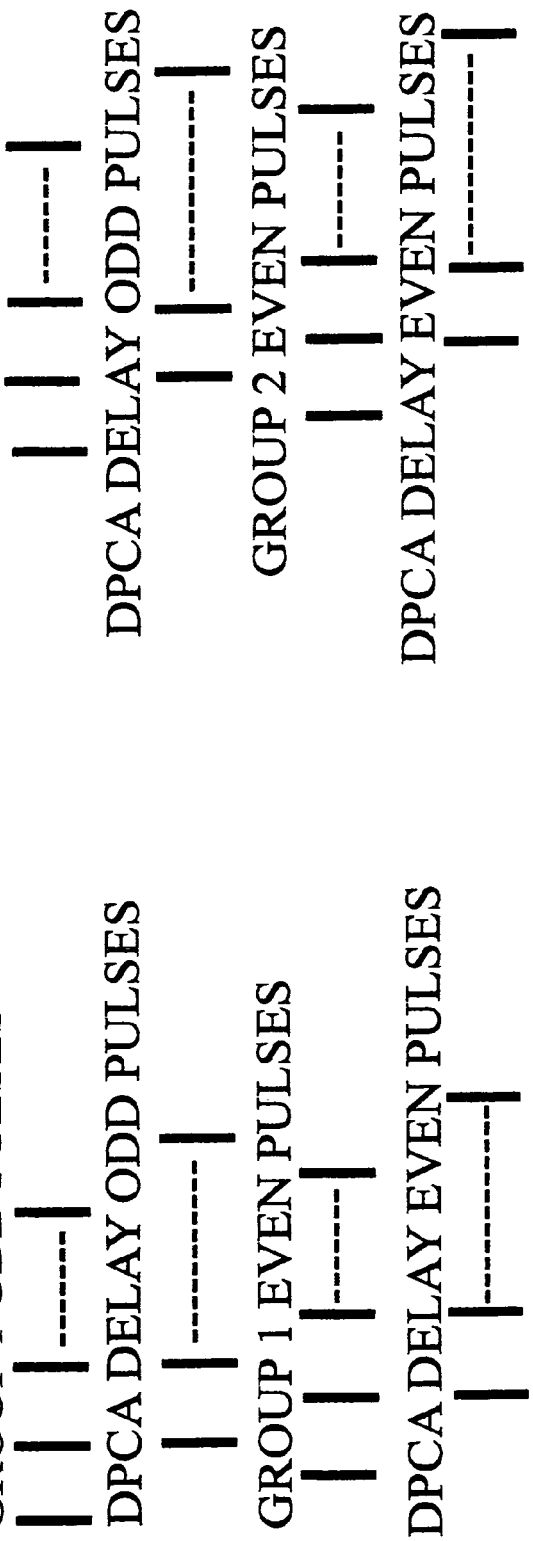
FIG. 11 depicts an exemplary illustration of delta T combined with delta I (interleaved pulses—two in example)

B—ONE CHANNEL OR ONE PULSE METHODOLOGY FOR DETECTING SHIPS OVER WATER WHERE THE FOLLOWING:
1—Ship return much larger than water returns the velocity and azimuth of the ship is determined if there is only one return and range, azimuth and velocity is easily determined.
2—Black hole and/or shadow technique to determine range, azimuth and velocity.
3. By delta R technique of section VIII A
4. By one channel or one pulse techniques in the disclosure
5. Combination of any of the techniques that is compatible IX—ACCOMPANYING TECHNIQUES are illustrated for the many pulse techniques in FIG. 6 which also applies to many channel techniques and also illustrated in FIG. 11 employing groups of data and interlaced data.

A1—ΔI Technique with dual channel system. This technique breaks up the received set of data into two or more interleaved data sets and process each data set as initially independent and the results should agree. The difference being that there is a loss of coherent gain proportional to the number of interlaced sets of data but that may be offset by non-coherently integrated between sets of interlaced data. Also the bandwidth of the filters is increased proportional to the number of interlaced sets of data which may be an advantage or disadvantage according to what is being processed. The processing of the interlaced data sets as well as the full data set may get the advantage of each. In the interlaced data there is a known relationship between each set of data.

Comment:
1. Interleave processing allows wider doppler bin proportional to the number of interleaved sets of data, if that to be effective.
2. Same results for all interleaved data and correlate results
3. Amplitude and phase relationship known between interleaved data sets.
4. Affects on returns of larger doppler bins
   a) Movers have a bandwidth of 16 hz, accordingly this will determine how many detections per doppler bin.
   b) Clutter has a bandwidth of the doppler bin.
   c) Affect on other returns such as jamming, noise antenna sidelobes, other.
   e) Other.
5. It applies to all systems.
6. The resulting solutions are increased proportional to the number of interleaved sets of data.
7. The doppler filter width and the ambiguous range is increased proportional to the number of interleaved data sets. The ambiguous velocity decreases proportional to the number of interleaved data sets A2—ΔI Technique with ΔC for single pulse system or with dual pulse system. This technique breaks up the received set of data into two or more interleaved data sets and process each data set as initially independent with the ΔC and/or ΔC delay technique and the results should agree. The difference being that there is a loss of coherent gain proportional to the number of interlaced sets of data but that may be offset by non-coherently integrated between sets of interlaced data. Also the bandwidth of the filters is increased proportional to the number of interlaced sets of data which may be an advantage or disadvantage according to what is being processed. The processing of the interlaced data sets as well as the full data set may obtain the advantage of each. In the interlaced data there is a known relationship between each set of data.

Comment:
 1. Interleave processing allows wider azimuth bin proportional to the number of interleaved sets of data, if that to be effective.
 2. Same results for all interleaved data and correlate results
 3. Amplitude and phase relationship between interleaved data sets.
 4. Affects on returns of larger azimuth bins
   a) Movers have a bandwidth of approximately 16 hz, accordingly this will determine how many detections per azimuth bin.
   b) Clutter has a bandwidth of the azimuth bin.
   c) Affect on other returns such as jamming, noise antenna sidelobes, other.
   e) Other.
 5. It applies to pulse systems
 6. The resulting solutions are increased proportional to the number of interleaved sets of data.
 7. The azimuth filter width and the ambiguous azimuth is increased proportional to the number of interleaved data sets. The ambiguous azimuth decreases proportional to the number of interleaved data sets B1. $\Delta I+\Delta A$ Technique for dual channel system This is similar to the $\Delta I$ technique but with each interlaced data set the receive antenna is moved approximately by the antenna beam width divided by the number of interlaced data sets. This technique breaks up the received set of data into two or more interleaved data sets and process each data set as initially independent and the results should agree. The difference being that there is a loss of coherent gain proportional to the number of interlaced sets of data but that may be offset by non-coherently integrated between sets of interlaced data. Also the bandwidth of the filters is increased proportional to the number of interlaced sets of data which may be an advantage or disadvantage according to what is being processed. In the interlaced data there is a known relationship between each set of data. Due to the receive arrays movement between each set of interlaced data set the ratio of the amplitude of the returns between data sets is determined by receive antenna arrays which if known will tell very accurately the returns azimuth and must correlate with results of processing each data set independently.

To attain curve of the ratio between apertures-vs-azimuth of return process significant clutter only data and obtain said curve and employ this in the above technique.

Comment: SAME AS I EXCEPT FOR THE FOLLOWING
 1. Amplitude ratio between interleaved data with simultaneously aperture change determines the azimuth of the return B2. $\Delta I+\Delta A$ Technique with $\Delta C$ for dual pulse systems. This is similar to the $\Delta I$ technique but with each interlaced data set the receive antenna is moved approximately by the antenna b beam width divided by the number of interlaced data sets. This technique breaks up the received set of data into two or more interleaved data sets and process each data set as initially independent with the $\Phi_D$ and/or $\Delta C$ delay technique and the results should agree. The difference being that there is a loss of coherent gain proportional to the number of interlaced sets of data but that may be offset by non-coherently integrated between sets of interlaced data. Also the bandwidth of the filters is increased proportional to the number of interlaced sets of data which may be an advantage or disadvantage according to what is being processed. In the interlaced data there is a known relationship between each set of data. Due to the receive arrays movement between each set of interlaced data set the ratio of the amplitude of the returns between data sets is determined by receive antenna arrays which if known will tell very accurately the returns azimuth and must correlate with results of processing each data set independently.

To attain curve of the ratio between apertures-vs-azimuth of return process significant clutter only data and obtain said curve and employ this in the above technique.

Comment: SAME AS I EXCEPT FOR THE FOLLOWING
 1. Amplitude ratio between interleaved data determines the azimuth of the return
 2. For two pulse system C1—$\Delta G$ technique with dual channel system $\Phi_D$ and/or $\Delta T$ technique. The technique involves taking the "M" data points and processing them in groups (two, three or more groups). Each group is processed independently and solutions should be very close to the same for each group and also for processing the full set of data. To maintain gain, the full set of data is processed. As the number of data points increases the gain increases and the doppler bin narrows proportional to the size of the data group. The amplitude and phase shift between groups is dependent on the number of data points in a group. Non-coherently processing the groups of data will gain most of the coherent gain of the full set of data. Groups of data applications are implemented mainly on high speed targets which may travel out of the range gate due to their velocity.

Comment:
 1. Wider doppler bin with decreasing number of data points in a group.
 2. Same results for all groups of data.
 3. Amplitude and phase relationship determinable between groups.
 4. Same as 4 for delta I.
 5. The ambiguous range and velocity is the same but doppler bin widens proportional to size of group.

C2—$\Delta G$ technique with $\Delta C$ for dual pulse system $\Phi_D$ and/or $\Delta C$ technique. The technique involves taking the "N" data points and processing them in groups (two, three or more groups). Each group is processed independently and solutions should be very close to the same for each group and also for processing the full set of data. To maintain gain, the full set of data is processed. As the number of data increases the gain increases and the azimuth bin narrows proportional to the size of the data group. The amplitude and phase shift between groups is dependent on the number of data in a group.

Comment:
 1. Wider azimuth bin with decreasing number of data points in a group.
 2. Same results for all groups of data.
 3. Amplitude and phase relationship determinable between groups.
 4. Same as 4 for delta I.
 5. The ambiguous range and velocity is the same and azimuth bin widens proportional to size of group.

D1—$\Delta G+\Delta A$ technique for dual channel system $\Phi_D$ and/or $\Delta T$ technique. Same as K1 but with each group of data the antenna is moved a portion of the bandwidth of the antenna divided by the number of groups. Each group is initially processed independently and result close to same for each group. The amplitude ratio between groups of data is the ratio of the antenna curve at each group position. The antenna curves ratio-vs-azimuth is measured with significant large clutter only data as stated for all change in aperture data. This is performed for all groups.

Comments:

1. same as C1 except for amplitude ratio-vs-azimuth

D2—$\Delta G+\Delta A$ technique dual pulse system $\Phi_D$ and/or $\Delta C$ technique. Same as K2 but with each group of data the antenna is moved a portion of the bandwidth of the antenna divided by the number of groups. Each group is initially processed independently and result close to same for each group. The amplitude ratio between groups of data is the ratio of the antenna curve at each group position. The antenna curves ratio-vs-azimuth is measured with significant large clutter only data. The antenna curves ratio-vs-azimuth is measured with significant large clutter only data as stated for all change in aperture data. This is performed for all groups.

Comments:

1. same as C2 except for amplitude ratio-vs-azimuth

D2—$\Delta G+\Delta A$ technique dual pulse system $\Phi_D$ and/or $\Delta C$ Two or more groups of data within each group of data having two or more interleaved set of data. Each interleaved set of data within a group of data is processed independently and the solution should be close to the same Comments:

1. Interleaved data within each group comments are same delta I plus delta A comments
2. Group data has same comments as delta G comments
3. Amplitude and phase relationship between interleaved set of data are determinable
4. Amplitude and phase relationship between groups of data are determinable E1—$\Delta I+\Delta G$ - - -

Two or more groups of data with each group of data having two or more interleaved sets of data. Each interleaved set of data within a group of data is processed independently and the solution should be close to the same Comments:

1. Interleaved data within each group comments are same delta I plus delta A comments
2 Group data has same comments as delta G comments
3. Amplitude and phase relationship between interleaved set of data are determinable
4. Amplitude and phase relationship between groups of data are determinable E2—$\Delta I+\Delta G$ - - -

Two or more groups of data with each group of data having two or more interleaved sets of data. Each interleaved set of data within a group of data is processed independently and the solution should be close to the same Comments:

1. Interleaved data within each group comments are same delta I plus delta A comments
2. Group data has same comments as delta G comments
3. Amplitude and phase relationship between interleaved set of data are determinable
4. Amplitude and phase relationship between groups of data are determinable F1—$\Delta I+\Delta A+\Delta G$ Technique for dual channel system $\Phi_D$ and/or $\Delta T$ Same as $\Delta I+\Delta A$ with the additional factor assuming the same number of interleaved sets of data per group and the aperture change per interleaved sets of data, then the ratio of the output between interleaved sets of data is the same. Each interleaved set of data within a group of data is processed independently and the solution should be close to the same.

F2—$\Delta I+\Delta A+\Delta G$ Technique dual pulse system $\Phi_D$ and/or $\Delta C$. Same as $\Delta I+\Delta A$ with the additional factor assuming the same number of interleaved sets of data per group and the aperture change per interleaved sets of data, then the ratio of the output between interleaved sets of data is the same. Each interleaved set of data within a group of data is processed independently and the solution should be close to the same.

G—Comments on all Developed Techniques

1—If employing the basic system as two receive channels where these two receive channels (or may be summed as one receive channel) there is the ability to process the sum channels and the two receive channels as independent systems. The sum system may be processed as one channel system and the two individual channel or pulse systems as separate system.

H—Special Application to the Overocean Implementation

Detection of ships and location of its black hole and shadow to determine the ships range, velocity and azimuth and ship classification H1—Overall detection of the ship at a particular azimuth (proportion to phase shift of where in the radar antenna beam the ship is detected), but when the ship has a relative radial velocity to the radar the phase shift of the ship adds to that due to its azimuth position relative to the boresight of the main beam of the radar, (which has motion compensation for the boresight of the antenna which is zero velocity) such as the following:

$$\Phi_{D1}=\Phi_{A1}+\Phi_1$$

where $\Phi_{D1}$ is the phase shift where the ship is detected at its peak $\Phi_{A1}$ is the phase shift due to the azimuth position. $\Phi_1$ is the phase shift due to its radial velocity.

The ship is detected at $\Phi_{D1}$, its phase shift due to its radial velocity, $\Phi_1$, plus that due to its azimuth position, $\Phi_{A1}$, in the main beam of the antenna.

In FIG. 1 that is 1*a, b, c, d* and 5 is the place where the ship is detected, but the actual position of the ship is 4. The shading of the ship shows this position. The radar illuminates this position, but due to the ships radial velocity it appears at 5. It leaves a lack of detection or black hole where it was at 4. The area 3 is also a lack of detection and this is the lined area, this is the ship blocking radar waves from illuminating the sea behind the ship. These phenomena will assist in the detection of the ship and the determination of its range, azimuth and radial velocity and horizontal tangential and vertical velocity and other ship parameters. Thus, we have a ship shaded area where the ship is, and a lined area where the shadow of the ship that tells us the azimuth ($\Phi_{A1}$) position, when we detect this lack of signal compared to the sea clutter next to it. The lack of signal should be about comparable to the thermal noise level of the radar. While the sea clutter will have a level in general considerably higher than the thermal noise.

This indicates the azimuth position and may be correlated with the previous determination where the azimuth, velocity and range are attained.

The area where there is a lack of detection at that azimuth is the outline of the ship and its shadow.

The area where there is a detection of the ship is the outline of the ship without the shadow.

In theory, if we have very fine range and doppler resolution, this area is defined very well, but we live in the real world and there is a limit to the resolution attained in range and azimuth and will limit our accuracy in attaining the parameters of the ship. FIG. 3 illustrates how the ships height profile would be attained. D being the height of ship and E is he airborne radar and A the height of the radar, B is the slant range of the radar to the ship and F is the angle of the ships shadow with the sea The solution by simple geometry for height of the ship D.

$$D \approx C^* \sin F \text{ where } \sin F \approx A/(B+C)$$

By this method knowing "C" slant range of shadow (where lack of detection ends)$(D+C)-D=V_{1N}'=M_1 e^{jN\Phi_1}C$. This method can be performed across the width of the ship to give its outline.

These measurements are all a function of the attainable range and doppler resolution.

2. The aforementioned analysis may be performed with a one antenna transmit and receive system as developed in the disclosure. If we have only one or the ship return much greater than clutter (ocean) return we have the following:

$$V_{01}/V_{00}=e^{j\Phi_1}$$

but with the two channel DPCA system with the $\Delta T$ technique we have the following:

$$V_{01}/V_{00}=e^{j\Phi_1}/W_{M1} \text{ where } W_{M1}=e^{j(\Psi_{M1}-K_{D1}X_1)}$$

and this determines $\Phi_1$ is the phase shift due to its radial velocity.

The lack of detection that is lower than the ocean return defines the azimuth position of the ship. It allows the measurement of ship parameters as explained previously illustrated in FIG. 5.

3. The aforementioned analysis may be applied for a one transmit or a two or more receive antenna system. Each receive antenna may be treated as independent receive system and treated and analyzed as that so we have two or more independent looks at the ship and the results correlated.

4. The aforementioned analysis may be applied for a one transmit and two receive antenna system with the two or more receive antenna utilizing DPCA techniques to find the range, radial velocity and azimuth independent of the shadow and black hole technique and then correlated with other techniques. Illustrated in FIG. 5.

All techniques or best technique for application may be performed and correlated to obtain the best results.

5. Applying to all systems, if a signal of the ship is sufficient to obtain desired information with the required accuracy:

a) Estimate of the parameters of the ship.

b) Estimate of the radial velocity, azimuth and range.

6. Applying to all systems, if we obtain multiple looks at the ship we will determine the unambiguous radial velocity and tangential velocity and greater accuracy in determining the ship parameters, range, velocity and azimuth.

Multilooks is defined as a look with data point 1 to N and delay the data a portion of the N point such as N/4 and adding N/4 points at the end and performing the same operations. This will result in the increased capability as stated.

When the data is delayed and reprocessed as the first set of data the ships radial motion will be measured by the number of range bins or part of a bin traveled in this time ($\Delta R/\Delta T$) gives the true velocity of the ship and will resolve the unambiguous velocity, if any, of the ship without resorting to another PRF. The tangential velocity will also be determined which could not be determined before as a measure of ($\Delta D/\Delta T$) doppler bins moved in the time difference. Hence, the total velocity of the ship is determined, not only the radial velocity, the ratio of the radial velocity to the tangential velocity which will give the angle the ship is pointing.

Multilooks of the ships will result in better parameter estimation of the ship and estimation of the range, velocity and azimuth and better estimate of the wake determination and bow wave parameters which will aide in determining all the parameters of the ship.

Isodop correction for the velocity of the ship, focusing the array may be performed to enhance the accuracy of the system.

Motion compensation relative to the boresight of the antenna is assumed.

7. Increased range and doppler resolution-VS-decreased spacing of doppler and range bins with same resolution applied to all systems.

a) Increased range resolution produces smaller range bins but with increased band width of the radar and increased storage for the increased number of cells per given range swath. The processing is increased due to range bin number increasing. The number of range bins increased is independent of the dwell time required for processing.

Increasing the doppler resolution, the number of data points have to be increased this results in increased time on target (ship) called dwell time and more storage and processing is required to handle the increased number of data points. This is a great disadvantage since it restricts the number of tasks to perform in a limited amount of time.

There is an increase the band width of the radar and in storage, processing and dwell time with an increase resolution of range and doppler.

a) A decrease in the range bin spacing is performed by increasing the number of samples, but with the same band width of the radar. This results in an increase in the number of samples (storage) per given range swath and also a proportional increase in processing required with no increase in resolution of range bins, but are more closely spaced samples of range.

A decrease in the doppler bin spacing is performed by adding zeros to the number of data samples stored. When this is processed as if the total number of data points includes all the zeros, the decrease in doppler bin spacing results are proportional to the number of zeros added. There is no additional storage, additional zeros does not constitute additional storage. The processing increased proportional to the additional doppler bins produced.

There is an increase in the number or range bins processed and stored, but no increase in storage due of input data required, but an increase in processing required, but most important no increase in dwell time required.

c) The results are with increased resolution in range and doppler has the disadvantage of increased bandwidth required of the radar and increased dwell time.

On the other hand increasing the number of samples per range bin (oversampling in range), the resolution of range is larger but the affect of lower spacing will give the affect of increased resolution of range without the higher bandwidth. The disadvantage is the larger range bin; this may be ameliorated by the previous discussion.

Adding zeros to the number of data points has the affect of the doppler resolution is the same, but the filters are spaced closer together. For example, if doubling the number of data points by adding an equal number of zeros, then the spacing of the doppler filter is halved. Since there is half the data points, the dwell time is halved. This is analogous to over sampling in range.

The affect of closer spacing of the filters gives increased resolution of azimuth without the increased dwell time. The disadvantage as in over sampling in range there is a larger doppler bin, thus may be ameliorated by previous discussion.

The trade off may be obtain doppler and range resolution as required to detect the ship, but the over sample in range and add zeros in doppler for the increased capability in range and azimuth.

8. Add ISAR processing for further classification of the ship when the ΔT parameters are processed.

9. Additional aides in detection and measurement of ship parameters, especially taken at different times within the same dwell time.

a) Measurement of sea clutter all around the point where the ship is detected.

b) Indicates the sea state conditions.

Determines the parameters of the ship, as well as radial and tangential velocity, especially when motion compensation is performed, as well as the array is focused and there are included isodop corrections.

c) Around the azimuth determination of ship
1) Another measure of the azimuth determination.
2) Another measure of the parameters of the ship.
3) Another measure of the radial velocity and tangential velocity.
4) Ship direction.
5) Bow wave detection, its velocity and heading of ship and radial and tangential velocity of the ship will give another indication of ship parameters and sea clutter around ship.
6) Wake determination will give another indication similar to 5.
7) Measure sea clutter around the indication of azimuth of ship will give additional correlation of all parameters of the ship.

d) Sea state in general
1) Will give sea state conditions.
2) Locations and detections of high and low detections. (shadows of the sea state).
3) May have more than one clutter detection per doppler bin.

10. Problem Areas
1) High clutter sea states are a big problem area and challenge to perform meaningful operations but are feasible.
2) Long dwell time to perform accurate determinations. This is the reason for decreased spacing of doppler bins and increased sampling per range bin might ameliorate that condition.
3) Long range makes things very difficult.
4) Performing surveillance and tracking at the same time as classification of ships.

11. Operate without change in time operation for the surveillance mode.

12. Additional techniques are to deal with the case where sea clutter is significant in value to ship return.

13. Two dimensional array may be employed, as well as a one dimensional array.

14. Combined with overland patent pending of Dual Synthetic Aperture Radar System (DSARS) Ser. No. 10/114, 156, filed Apr. 1, 2002, now U.S. Pat. No. 6,633,253, by Thomas J. Cataldo with overseas capability and employing the phase corrections and phase coefficient if necessary as explained in DSARS patent.

15. The mode of operation depends on many factors such as range, surveillance, tracking or spot light operation, sea state, etc.

16. Surveillance mode may be combined with spot image mode.

Wake and bow wave signatures of ships signatures as a function of their velocity and direction of the ship in help in classification of ships.

17. Surveillance mode could be a one antenna transmit and receive system.

18. High sea state conditions create shadow conditions that could be employed for better processing.

19. Surveillance plus spot image mode may be combined to reduce dwell time and obtain maximum information per unit time.

20. This technique may be extended to space borne operations

21. With the one pulse or one channel technique an electronic scanned array that may be rotated 360 degrees to cover all angles.

22. With the one pulse technique an electronic scanned array does not require motion compensation or phase compensation for boresight of transmitted antenna since only one pulse is required.

Block Diagram of System

This is a simplified system indicating the basic data is received from the radar in digital form and stored and processed in any or combinations of the techniques described in the disclosure. The data is spectrally processed and the detection of the ship is performed together with the detection of the shadow and black hole to determine the ships radial velocity, azimuth and range, as well as the measurement of the ship parameters to classify the ship with as much accuracy as possible.

The delay data is processed to determine radial velocity unambiguously and to determine the horizontal and vertical tangential velocity and the ship parameters more accurately.

I—Special Section on Detection of High Speed Targets

The detection of high speed planes and missiles is very important in the presence of clutter. Processing in groups of data enables the detection and measuring its velocity and azimuth without the target passing thru range bin then and non-coherently integrating from range to range bin. Employing groups of data keeps the target in the range bin long enough to detect its radial velocity and use delta R to determine its unambiguous velocity. In this respect the range bin has to be made wide enough to be able to have the mover a significant time in the range bin. Results may be correlated between range bins.

Being detected in the various range bins at different times to be able to employ the association techniques of tracking the detections thru the range bins and doppler bins with time. This will measure radial velocity unambiguously and tangential velocity.

The processing by groups enables that high speed movers will not travel thru the range bin in the time it is in the group. The integration between groups will give a significant increase in gain for detection.

The processing of each group together with association processing will give the unambiguously radial velocity and the azimuth of the mover.

J—Special Section on Foliage Penetration to Detect Movers and Measure there Velocity and Azimuth Accurately Foliage penetration radar has to be low in transmission frequency enough to see thru foliage. The ground and large trees will give a significant clutter return and wind blowing foliage a small but significant velocity to clutter and render clutter cancellation techniques ineffective. The USS system will separate out all returns and identify the mover and clutter returns.

K—Special Section on Stealthy Targets

STEALTHY TARGETS PRESENT A SPECIAL CHALLENGE since they have small radar cross sections and with the common stap systems especially difficult because they are embedded in clutter and the common stap systems find it very difficult to differentiate them from clutter residue. the uss has less difficulty clutter and target are measured differently and they don't compete with each other. Consequently very low returns can be detected and there velocity, azimuth and range determined.

I claim:

1. A method employing an electronic array mounted on a moving platform and a unique space time adaptive system to detect a plurality of radar returns in a same bin and their parameters with or without clutter present, comprising the steps of:
   a) transmitting at least one pulse;
   b) receiving said plurality of radar returns from said at least one pulse over at least one channel;
   c) processing said radar returns into range bins and determining whether said radar return surpasses a threshold;
   d) processing said radar returns that exceed said threshold to determine radial velocity, range, and azimuth based upon each radar return of said plurality of radar returns having different radial velocity and azimuth without utilizing clutter cancellation; and
   e) comparing said radar returns to a database of expected radar returns and adaptively processing radar returns that do not correspond to the expected radar returns, to identify said non-corresponding radar returns as indicative of at least one of clutter, a stationary target having moving elements, a land sea interface, clutter discretes, and antenna sidelobe returns without utilizing clutter cancellation.

2. The method of claim 1 wherein said at least one pulse is a plurality of pulses,
   said transmission occurs at a specific frequency, and
   said at least one of a channel is a plurality of channels for synchronous reception.

3. The method of claim 2 further comprising the steps of:
   a) receiving data pulse in a first channel and a second channel at a predetermined frequency;
   b) receiving said pulse data 1 to M received in channel 1;
   c) receiving said time pulse data in channel 2 delayed, wherein said delay is equal to the number of radar returns detected in a range Doppler bin;
   d) over sampling said pulse data and said delayed pulse data in said range bin to a desired level;
   e) zero filling said pulse data and said delayed pulse data to said desired level to increase pulse data and delayed pulse data frequency samples;
   f) multiplying said pulse data and said delayed pulse data by a weighting function obtaining a spectrum of said pulse data and said delayed pulse data;
   g) thresholding, in each range Doppler bin, said pulse data and said delayed pulse data for significant radar returns for a determination of the parameters including radial velocity, range, and azimuth without utilizing clutter cancellation;
   h) if the number of said returns is three or less the solution is easily obtained analytically but if there is a sum of greater than three returns, since said solution is long and complicated an assist is utilizable by the association of determinations of the solutions in adjacent said range Doppler bins as being the same with said range Doppler under processing and where there is known said clutter return, its respective radial velocity is zero;
   i) determining azimuth by processing another frequency sample;
   j) determining range by processing another range sample;
   k) repeating steps a) through f) to process another linear array for measuring height of a radar return;
   l) delaying said pulse data and said delayed pulse data to determine an amplitude and phase change due to frequency to calculate horizontal velocity and vertical tangential velocity;
   m) delaying said pulse data and said delayed pulse data to determine an amplitude and phase change due to range, to calculate a radial velocity;
   n) delaying a change in phase and amplitude change due to height to calculate a vertical tangential velocity; and,
   o) comparing said radar returns to a database of expected radar returns and adaptively processing radar returns that do not correspond to the expected radar returns to identify said noncorresponding radar returns as indicative of clutter, a stationary target having moving elements, a land sea interface, clutter discretes, and antenna sidelobe returns without utilizing clutter cancellation.

4. The method of claim 2 further comprising the steps of:
   a) receiving pulse data in a first channel and a second channel at a predetermined frequency, wherein said pulse data 1 to M is received in said first channel and
   said first channel pulse data is delayed a rate equal to a number of expected radar returns, and said pulse data in said second channel is delayed from said first channel and said second channel is also delayed at said rate;
   b) over sampling said pulse data and said delayed pulse data in said range bin to a desired level;
   c) zero filling said pulse data and said delayed pulse data to said desired level to increase pulse data and delayed pulse data frequency samples;
   c(i) multiplying said pulse data and said delayed pulse data by a weighting function, obtaining a spectrum of said pulse data and said delayed pulse data;
   d) thresholding, in each range Doppler bin, said pulse data and said delayed pulse data for significant radar returns for a determination of the parameter including radial velocity, range, and azimuth without utilizing clutter cancellation;
   e) determining azimuth by processing another frequency sample;
   f) determining range by processing another range sample;
   g) repeating steps a) through f) to process another linear array for measuring height of a radar return;

h) delaying said pulse data and said delayed pulse data to determine an amplitude and phase change due to frequency to calculate horizontal velocity;
i) delaying said pulse data and said delayed pulse data to determine an amplitude and phase change due to range to calculate a radial velocity;
j) delaying a change in phase and amplitude change due to height to calculate a vertical tangential velocity; and,
k) comparing said radar returns to a database of expected radar returns and adaptively processing radar returns that do not correspond to the expected radar returns to identify said non-corresponding radar returns as indicative of clutter, a stationary target having moving elements, a land sea interface, clutter discretes, and antenna sidelobe returns without utilizing clutter cancellation.

5. The method of claim 2 further comprising the steps of:
a) interleaving said received data pulses synchronously with at least one interleaved channel at a predetermined frequency wherein said pulse data is delayed a number of times equal to an expected number of radar returns, said delayed pulse data is processed to a number of interleaved sets of data with a corresponding aperture change;
b) processing said interleaved sets of data independently, wherein a transmission array is centered between an aperture 1, and an aperture 2, said interleaved channels forming a beam width portion on each side of said transmission array, and changes in receive apertures corresponding to a change in receive data in the interleaved data with aperture change;
c) over sampling said pulse data and said delayed pulse data in said range bin to a desired level;
d) zero filling said pulse data and said delayed pulse data to said desired level to increase said pulse data and said delayed pulse data frequency samples;
e) delaying at least one interleaved channel a number of times equal to an expected number of radar returns, wherein said at least one interleaved pulses is multiplied by a weighting function and spectrum is processed;
f) thresholding, in each range Doppler bin, said pulse data and said delayed pulse data for significant radar returns, for a determination of the parameters including radial velocity, range, and azimuth without utilizing clutter cancellation;
g) if the number of said returns is three or less the solution is easily obtained analytically but if there is a sum greater than three returns, since said solution is long and complicated an assist is utilizable by the association of determinations of the solutions in adjacent said range Doppler bins as being the same with said range Doppler under processing and where there is known said clutter return, its respective radial velocity is zero;
h) processing two of said data and said data delayed, thereby determining the total phase response of all said returns from which is also calculated said return vectors;
i) calculation of the curve return ratio as a function of azimuth is determined, wherein the azimuth of each return may be made from real data of relatively high said clutter only at a number of azimuths of the receive antennas or there is determined a prior from said measured antenna patterns;
j) taking the ratio of the respective of said relatively high said clutter only return vectors and from a prior calculation of the curve return ratio as a function of azimuth there is compared to the ratio calculated from a solution of odd and even sets of data to determine the azimuth of each said return, from which the velocity of each return is determined;
k) determining peak Doppler by processing another frequency sample;
l) determining range by processing another frequency sample;
m) repeating steps a) through f) to process another linear array for measuring height of a radar return;
n) delaying said pulse data and said delayed pulse data to determine an amplitude and phase change due to frequency to calculate horizontal velocity;
o) delaying said pulse data and said delayed pulse data to determine an amplitude and phase change due to range to calculate a radial velocity;
p) delaying a change in phase and amplitude change due to height to calculate a vertical tangential velocity;
q) comparing said radar returns to a database of expected radar returns and adaptively processing radar returns that do not correspond to the expected radar returns to identify said non-corresponding radar returns as indicative of clutter, a stationary target having moving elements, a land sea interface, clutter discretes, and antenna sidelobe returns without utilizing clutter cancellation; and,
r) if more than a dual channel is available, process each said dual channel and correlate.

6. The method of claim 2 further comprising the steps of:
a) receiving pulse data in a first channel and a second channel at a predetermined frequency, wherein said pulse data 1 to M is received in said first channel and
said first channel pulse data is delayed a rate equal to a number of expected radar returns, and said pulse data in said second channel is delayed D from said first channel and said second channel is also delayed at said rate;
b) over sampling said pulse data and said delayed pulse data in said range bin to a desired level:
c) zero filling said pulse data and said delayed pulse data to said desired level to increase pulse data and delayed pulse data frequency samples;
c(i) multiplying said pulse data and said delayed pulse data by a weighting function, thereby obtaining a spectrum of said pulse data and said delayed pulse data;
d) thresholding, in each range Doppler bin, said pulse data and said delayed pulse data for significant radar returns for a determination of amplitude and phase of each radar return;
e) determining by processing another frequency sample of precise peak of frequency;
f) determining range by processing another range sample precise range;
i) repeating steps a) through d) to process another linear aray when precise amplitude and phase between linear arrays due to height of a radar return is to be measured;
h) delaying said pulse data and said delayed pulse data to determine an amplitude and phase change due to frequency to calculate horizontal velocity and vertical tangential velocity;
i) delaying said pulse data and said delayed pulse data to determine and amplitude and phase change due to range to calculate an unambiguously radial velocity;
j) delaying a change in phase and amplitude change due to height to calculate a vertical tangential velocity; and,
k) comparing said radar returns to a database of expected radar returns and adaptively processing radar returns that do not correspond to the expected radar returns to identify said non-corresponding radar returns as indicative of clutter, a stationary target having moving elements, a land sea interface, clutter discretes, and antenna sidelobe returns without utilizing clutter cancellation.

7. The method of claim 2 further comprising the steps of:
a) receiving pulse data in a first channel and a second channel at a predetermined frequency, wherein said pulse data 1 to M is received in said first channel and said first channel pulse data is delayed a rate equal to a number of expected radar returns, and said pulse data in said second channel is delayed D from said first channel and said second channel is also delayed at said rate:
b) over sampling said pulse data and said delayed pulse data in said range bin to a desired level;
c) zero filling said pulse data and said delayed pulse data to said desired level to increase pulse data and delayed pulse data frequency samples;
c(i) multiplying said pulse data and said delayed pulse data by a weighting function obtaining a spectrum of said pulse data and said delayed pulse data;
d) said data is delayed a number of times equal to the expected number of said returns and each set of said delayed data is processing "M" data points in each simultaneous apertures of data, a portion of the beam width from the transmission array on each side;
e) determining by processing another frequency sample of precise peak of frequency;
f) determining range by processing another range sample precise range;
g) repeating steps a) through d) to process another linear array when precise amplitude and phase between linear arrays due to height of a radar return is to be measured;
h) delaying said pulse data and said delayed pulse data to determine an amplitude and phase change due to frequency to calculate horizontal velocity and vertical tangential velocity;
i) delaying said pulse data and said delayed pulse data to determine an amplitude and phase change due to range to calculate an unambiguously radial velocity;
j) delaying a change in phase and amplitude change due to height to calculate a vertical tangential velocity; and,
k) comparing said radar returns to a database of expected radar returns and adaptively processing radar returns that do not correspond to the expected radar returns to identify said non-corresponding radar returns as indicative of clutter, a stationary target having moving elements, a land sea interface, clutter discretes, and antenna sidelobe returns without utilizing clutter cancellation.

8. The method of claim 2 further comprising the steps of:
a) receiving pulse data in a first channel and a second channel at a predetermined frequency, wherein said pulse data 1 to M is received in said first channel and
said first channel pulse data is delayed a rate equal to a number of expected radar returns, and said pulse data in said second channel is delayed D from said first channel and said second channel is also delayed at said rate:
b) over sampling said pulse data and said delayed pulse data in said range bin to a desired level;
c) zero filling said pulse data and said delayed pulse data to said desired level to increase pulse data and delayed pulse data frequency samples;
c(i) multiplying said pulse data and said delayed pulse data by a weighting function obtaining a spectrum of said pulse data and said delayed pulse data;
d) said data is delayed a number of times equal to the expected number of said returns and each set of said delayed data is processing "M" data points in each simultaneous apertures of data, a portion of the beam width from the transmission array on each side;
e) determining by processing another frequency sample precise peak of frequency;
f) determining range by processing another range sample precise range;
g) repeating steps a) through d) to process another linear array when precise amplitude and phase between linear arrays due to height of a radar return is to be measured;
h) delaying said pulse data and said delayed pulse data to determine an amplitude and phase change due to frequency to calculate horizontal velocity and vertical tangential velocity;
i) delaying said pulse data and said delayed pulse data to determine an amplitude and phase change due to range to calculate an unambiguously radial velocity;
j) delaying a change in phase and amplitude change due to height to calculate a vertical tangential velocity; and,
k) comparing said radar returns to a database of expected radar returns and adaptively processing radar returns that do not correspond to the expected radar returns to identify said non-corresponding radar returns as indicative of clutter, a stationary target having moving elements, a land sea interface, clutter discretes, and antenna sidelobe returns without utilizing clutter cancellation.

9. The method of claim 2 further comprising:
employing an electronic scanned array and as few as one linear array and few as one pulse mounted on a moving platform in line with said platform motion and a unique space time adaptive system to detect returns and measure their parameters including velocity, azimuth and range accurately with said clutter and other said returns detected in the same range Doppler bin, where there is no said clutter cancellation of any kind is required such as said clutter covariance matrix, said clutter training data with or without knowledge aided said clutter, comprising the steps of:
a) receiving data transmission is a minimum of said one pulse of a pulsatory nature;
b) optionally over sampling in said range to desired level for all said data;
c) optionally zero fill said data to desired level to attain close frequency samples or all said data;
d) said data is delayed a number of times equal to the expected number of said returns and each set of said delayed data is processed wherein the improvement comprises:
e) each said data is delayed a number of times equal to the expected number of returns, each is multiplied by a weighting function and processed with a technique such as FFT for obtaining spectrum of said data;
f) in each said range Doppler bin processed there is thresholded to detect the presence of significant said returns, if so, contains an addition of all said returns and information such as range, radial velocity and azimuth, wherein this determination constitutes sets of simultaneous equations solved directly, with no clutter cancellation of any kind required, for each said return to determine its said velocity, azimuth and range;

g) if the number of said returns is three or less the solution is easily obtained analytically;
h) processing said data and said data delayed determining the total phase response of all returns from which is also calculated the return vectors;
i) determining the total phase response of all returns from which is also calculated the return vectors;
j) processing adjacent range azimuth bins and determining precise range;
k) optionally processing adjacent azimuth bin and Doppler bin where mover and clutter is processed with the same results in determining a solution's precise azimuth;
l) optionally processing other linear arrays where mover and clutter are to be processed with same results in determining solutions and determining precise height;
m) processing a significant channel later as in steps i), j) and k) and obtain respectively azimuth change, and height change which determines azimuth change;
n) from unambiguous azimuth change there is determined azimuth;
o) from azimuth and total velocity determined the radial velocity is calculated;
p) thereby attaining the precise range, azimuth and height;
q) optionally processing another pulse if another pulse is obtained and obtaining another close solution;
r) optionally changing transmission frequency to avoid jamming and correlating results, wherein the transmission frequency is changed enough to avoid jamming, but not enough to affect the operation of system;
s) if there are significant returns of said returns, zero velocity and said return is said clutter, then non zero velocity of said return(s) are post processed to determine the type of said return such as mover, sidelobes, land sea interface, jamming, rotational motion targets, noise, jamming, others; and,
t) whereby the return identification and accurate parameters of said returns have been determined without any clutter cancellation at all.

10. The method of claim 1 further comprising the steps of:
a) transmitting required pulses;
b) processing many said N channels with as few as one or two pulses at a time; and,
c) attaining additional said channel data.

11. The method of claim 10 further comprising the steps of:
a) receiving channel data in a first channel 1 to M and a second channel at a predetermined frequency, wherein said pulse 1 to pulse 2 of said first channel data is delayed a rate equal to a number of expected radar returns, and said channel data in said second channel is delayed D from said first channel and said second channel is also delayed at said rate;
b) over sampling said channel data and said delayed channel data in said range bin to a desired level;
c) zero filling said channel data and said delayed channel data to said desired level to increase channel data and delayed channel data frequency samples;
c(i) multiplying said channel data and said delayed channel data by a weighting function obtaining a spectrum of said channel data and said delayed channel data;
d) thresholding, in each range Doppler bin, said channel data and said delayed channel data for significant radar returns for a determination of the parameters including radial velocity, range, and azimuth without utilizing clutter cancellation;
e) determining Doppler peak by processing another space frequency sample;
f) determining range by processing another range sample;
g) repeating steps a) through f) to process another linear array for measuring height of a radar return;
h) delaying said channel data and said delayed channel data to determine an amplitude and phase change due to space frequency to calculate horizontal velocity
i) delaying said pulse data and said delayed pulse data to determine an amplitude and phase change due to range to calculate a radial velocity;
j) delaying a change in phase and amplitude change due to height to calculate a vertical tangential velocity; and,
k) comparing said radar returns to a database of expected radar returns and adaptively processing radar returns that do not correspond to the expected radar returns to identify said non-corresponding radar returns as indicative of clutter, a stationary target having moving elements, a land sea interface, clutter discretes, and antenna sidelobe returns without utilizing clutter cancellation.

12. The method of claim 10 further comprising the steps of:
a) receiving data in a first channel and a second channel data;
b) receiving said channel data 1 to N received in channel 1;
c) receiving said time pulse data in channel 2 space delayed, wherein said delay is equal to the number of radar returns detected in a range azimuth bin;
d) over sampling said channel data and said delayed channel data in said range bin to a desired level;
e) zero filling said pulse data and said delayed data to said desired level to increase channel data and delayed channel data frequency samples;
f) multiplying said channel data and said delayed channel data by a weighting function, obtaining a spectrum of said channel data and said delayed channel data;
g) thresholding, in each range Doppler bin, said channel data and said delayed channel data for significant radar returns for a determination of the parameters including radial velocity, range, and azimuth without utilizing clutter cancellation;
h) if the number of said returns is three or less the solution is easily obtained analytically but if there is a sum of greater than three returns, since said solution is long and complicated an assist is utilizable by the association of determinations of the solutions in adjacent said range Doppler bins as being the same with said range Doppler under processing and where there is known said clutter return, its respective radial velocity is zero;
i) determining Doppler azimuth bin by processing another frequency sample;
j) determining range by processing another range sample;
k) repeating steps a) through f) to process another linear array for measuring height of a radar return;
l) delaying said channel data and said delayed channel data to determine an amplitude and phase change due to frequency to calculate horizontal velocity;
m) delaying said pulse data and said delayed pulse data to determine an amplitude and phase change due to range to calculate an unambiguously radial velocity;
n) delaying a change in phase and amplitude change due to height to calculate a height; and,
o) comparing and radar returns to a database of expected radar returns and adaptively processing radar returns that do not correspond to the expected radar returns to identify and non-corresponding radar returns as indicative of clutter, a stationary target having elements, a land sea interface, clutter discretes, and antenna sidelobe returns without utilizing clutter cancellation.

13. The method of claim 10 further comprising the steps of:
- a) interleaving said received data pulses synchronously with at least one interleaved channel at a predetermined frequency wherein said channel data is delayed a number of times equal to an expected number of radar returns, and said delayed pulse data is processed to a number of interleaved said sets of data with a corresponding aperture change;
- b) processing said interleaved sets of channel data independently, wherein a transmission array is centered between aperture 1, and aperture 2, said interleaved channels forming a beam width portion of each side of said transmission array, and changes in receive apertures corresponding to a change in receive data in the interleaved data with aperture change;
- c) over sampling said pulse data and said delayed pulse data in said range bin to a desired level;
- d) zero filling said channel data and said delayed channel data to said desired level to increase said channel data and said delayed channel data frequency samples;
- e) delaying at least one interleaved channel a number of times equal to an expected number of radar returns, wherein said at least one interleaved pulses is multiplied by a weighting function and spectrum processed;
- f) thresholding, in each range Doppler bin, said pulse data and said delayed pulse data for significant radar returns for a determination of the parameters including radial velocity, range, and azimuth without utilizing clutter cancellation;
- g) if the number of said returns is three or less the solution is easily obtained analytically but if there is a sum greater than three returns, since said solution is long and complicated an assist is utilizable by the association of determinations of the solutions in adjacent said range Doppler bins as being the same with said range Doppler under processing and where there is known said clutter return, its respective radial velocity is zero;
- h) processing two of said data and said data delayed, thereby determining the total phase response of all said returns from which is also calculated said return vectors;
- i) calculation of the curve return ratio as a function of azimuth is determined, wherein the azimuth of each return may be made from real data of relatively high said clutter only at a number of azimuths of the receive antennas or optionally there is determined a prior from said measured antenna patterns;
- j) taking the ratio of the respective of said relatively high said clutter only return vectors and from a prior calculation of the curve return ratio as a function of azimuth there is compared to the ratio calculated from a solution of odd and even sets of data to determine the azimuth of each return, from which the velocity of each said return is determined;
- k) determining peak Doppler by processing another frequency sample;
- l) determining range by processing another range sample;
- m) repeating steps a) through f) to process another linear array when height of a radar return is to be measured;
- n) delaying said channel data and said delayed channel data to determine an amplitude and phase change due to frequency to calculate horizontal velocity;
- o) delaying said pulse data and said delayed pulse data to determine an amplitude and phase change due to range to calculate precise range;
- p) delaying a change in phase and amplitude change to determine height;
- q) comparing said radar returns to a database of expected radar returns and adaptively processing radar returns that do not correspond to the expected radar returns to identify said non-corresponding radar returns as indicative of clutter, a stationary target having moving elements, a land sea interface, clutter discretes, and antenna sidelobe returns without utilizing clutter cancellation; and,
- r) if more than dual channel is available, process each said dual channel and correlate.

* * * * *